United States Patent [19]
Markle et al.

[11] Patent Number: 5,470,945
[45] Date of Patent: Nov. 28, 1995

[54] THERMALLY REVERSIBLE ISOCYANATE-BASED POLYMERS

[75] Inventors: Richard A. Markle; Phyllis L. Brusky, both of Columbus; George E. Cremeans, Groveport; Joel D. Elhard, Hilliard; Donald M. Bigg; Sylvester Sowell, both of Columbus, all of Ohio

[73] Assignee: Battelle Memorial Institute, Columbus, Ohio

[21] Appl. No.: 193,029

[22] PCT Filed: Aug. 4, 1992

[86] PCT No.: PCT/US92/06493

§ 371 Date: Feb. 3, 1994

§ 102(e) Date: Feb. 3, 1994

[87] PCT Pub. No.: WO91/11476

PCT Pub. Date: Aug. 8, 1991

Related U.S. Application Data

[63] Continuation-in-part of Ser. No. 851,840, Mar. 16, 1992, abandoned, which is a continuation of Ser. No. 651,020, Feb. 4, 1991, Pat. No. 5,097,010, and Ser. No. 740,335, Aug. 5, 1991, Pat. No. 5,239,039, which is a continuation-in-part of Ser. No. 475,112, Feb. 5, 1990, abandoned, said Ser. No. 651,020is a continuation-in-part of Ser. No. 475,112.

[51] Int. Cl.[6] .................................................. C08G 75/00
[52] U.S. Cl. .................... 528/390; 528/44; 528/73; 525/195; 525/215; 525/304; 525/328.3; 525/420
[58] Field of Search ............................. 528/390, 44, 73; 525/195, 215, 304, 328.3, 420

[56] References Cited

U.S. PATENT DOCUMENTS

| | | | |
|---|---|---|---|
| 2,777,831 | 1/1957 | Seeger et al. | 528/83 |
| 2,876,725 | 3/1959 | Buck et al. | 113/120 |
| 2,982,754 | 5/1961 | Sheffer et al. | 528/45 |
| 3,115,479 | 12/1963 | Windemuth et al. | 528/49 |
| 3,215,668 | 11/1965 | Bissinger et al. | 528/73 |

(List continued on next page.)

FOREIGN PATENT DOCUMENTS

| | | | |
|---|---|---|---|
| 0249809 | 12/1987 | European Pat. Off. | C08G 69/44 |
| 0259968 | 3/1988 | European Pat. Off. . | |
| 2023697 | 11/1970 | Germany | C08G 22/10 |
| 3723610 | 2/1988 | Germany | C07C 125/075 |
| 2108137 | 5/1983 | United Kingdom . | |
| 2123841 | 7/1983 | United Kingdom . | |

OTHER PUBLICATIONS

Wagner, K. B. et al., "Thermally Reversible Urethanes", Polymer Preprints, vol. 30, No. 1 (Apr. 1989), pp. 287–288.

Caraculacu, G. et al., "Poly(urthane–parabanic acid)s", Makromol. Chem., vol. 185, (1984), pp. 1079–1039.

Caraculacu, G. et al., "Copolymer of Poly(parabanic acid) and Polyimide", Journal of Polymer Science: Polymer Letters Edition, vol. 21, 277–280 (1983).

Patton, T. L., "Poly(iminoimidazolidinediones) and Poly(parabanic acids)", Polymer Reprints, vol. 12, No. 1, (Mar. 1971), pp. 162–169.

(List continued on next page.)

*Primary Examiner*—Paul R. Michl
*Assistant Examiner*—Duc Truong
*Attorney, Agent, or Firm*—Klaus H. Wiesmann

[57] ABSTRACT

Thermally-reversible polymer compositions are obtained by reacting compounds with isocyanate and labile-hydrogen functionality. Aromatic polyimide, aromatic polycarbonate, polyarylsulfide, aromatic polyester with liquid crystal property, and polyarylimidazolidine oligomers are incorporated into the isocyanate or labile hydrogen compounds to give high-performance characteristics. Such thermally-reversible isocyanate-based polymer compositions with high-performance characteristics are useful, among other things, as finish surface coatings on composite materials such as polypropylene and polyethylene terephthalate. Novel phenolic-hydroxyl terminated polyarylsulfide and polyarylimidazolidine oligomers and their preparation are also described.

10 Claims, 15 Drawing Sheets

U.S. PATENT DOCUMENTS

| | | | |
|---|---|---|---|
| 3,267,083 | 8/1966 | Imhof | 525/320.2 |
| 3,503,927 | 3/1970 | Chang et al. | 528/65 |
| 3,513,131 | 5/1970 | Marin et al. | 528/73 |
| 3,547,897 | 12/1970 | Patton | 528/44 |
| 3,578,727 | 5/1971 | Battersby et al. | 528/45 |
| 3,591,562 | 7/1971 | Patton | 528/53 |
| 3,624,045 | 11/1971 | Stivers | 22/4 |
| 3,635,905 | 1/1972 | Patton | 528/53 |
| 3,644,569 | 2/1972 | Pletsch et al. | 528/49 |
| 3,661,859 | 5/1972 | Patton | 528/67 |
| 3,684,769 | 8/1972 | Abbott et al. | 22/12 |
| 3,734,896 | 5/1973 | Patton | 528/48 |
| 3,759,873 | 9/1973 | Hudak | 528/60 |
| 3,847,878 | 11/1974 | Hanson et al. | 528/73 |
| 3,888,964 | 6/1975 | Bain et al. | 528/390 |
| 3,912,754 | 10/1975 | Findeisen et al. | 528/44 |
| 3,925,462 | 12/1975 | Graff | 560/26 |
| 3,933,758 | 1/1976 | Patton | 528/53 |
| 3,933,759 | 1/1976 | Hobschele | 528/65 |
| 3,987,016 | 10/1976 | Haddad et al. | 528/374 |
| 4,028,311 | 6/1977 | Patton | 528/44 |
| 4,046,749 | 9/1977 | Hauskins | 528/481 |
| 4,048,253 | 9/1977 | Ooba et al. | 525/440 |
| 4,064,086 | 12/1977 | Cowsar et al. | 528/73 |
| 4,064,107 | 12/1977 | Stackman et al. | 528/68 |
| 4,104,443 | 8/1978 | Latta et al. | 428/474 |
| 4,166,873 | 9/1979 | Gilliam et al. | 428/35 |
| 4,176,223 | 11/1979 | Irwin | 528/170 |
| 4,201,353 | 5/1980 | Henry et al. | 528/85 |
| 4,201,853 | 5/1980 | Henry et al. | 528/85 |
| 4,205,150 | 5/1980 | Marubashi | 526/252 |
| 4,221,887 | 9/1980 | Brenner et al. | 525/332 |
| 4,289,813 | 9/1981 | Blomeyer et al. | 427/385.5 |
| 4,330,453 | 5/1982 | Patton | 528/44 |
| 4,330,636 | 5/1982 | Christman et al. | 528/44 |
| 4,338,422 | 7/1986 | Jackson, Jr. et al. | 525/461 |
| 4,352,858 | 10/1982 | Stanley | 428/423.1 |
| 4,354,008 | 10/1982 | Skoultchi | 525/370 |
| 4,360,638 | 11/1982 | Bartman | 524/286 |
| 4,417,043 | 11/1983 | Coswell et al. | 528/176 |
| 4,423,182 | 12/1983 | Bartman | 524/367 |
| 4,471,106 | 9/1984 | Luecke et al. | 528/205 |
| 4,503,285 | 3/1985 | Darms et al. | 174/68.5 |
| 4,524,104 | 6/1985 | Nagio et al. | 428/341 |
| 4,539,384 | 9/1985 | Krishman et al. | 528/79 |
| 4,579,930 | 4/1986 | Kramer et al. | 528/71 |
| 4,608,418 | 8/1986 | Czerwinski et al. | 524/296 |
| 4,619,975 | 10/1986 | Matzner et al. | 525/437 |
| 4,623,731 | 11/1986 | Ivanou et al. | 548/374 |
| 4,657,989 | 4/1987 | Evans | 525/464 |
| 4,659,762 | 4/1989 | Jenkins | 524/331 |
| 4,659,789 | 4/1987 | Katto et al. | 525/537 |
| 4,668,744 | 5/1987 | Matzner et al. | 525/397 |
| 4,687,725 | 8/1987 | Parker et al. | 521/106 |
| 4,687,785 | 8/1987 | Parker et al. | 521/106 |
| 4,690,856 | 9/1987 | Ito et al. | 428/215 |
| 4,695,612 | 9/1987 | Takekoshi et al. | 525/433 |
| 4,699,974 | 10/1987 | Evans | 528/354 |
| 4,722,993 | 2/1988 | Hisgen et al. | 528/183 |
| 4,725,384 | 2/1988 | Du Vernet | 260/104 |
| 4,727,131 | 2/1988 | Kock et al. | 528/183 |
| 4,728,713 | 3/1988 | Hisgen et al. | 528/183 |
| 4,728,714 | 3/1988 | Hisgen et al. | 528/183 |
| 4,733,993 | 2/1988 | Hisgen et al. | 528/183 |
| 4,734,470 | 3/1988 | Kawabata et al. | 525/537 |
| 4,744,852 | 5/1988 | Augustin et al. | 156/327 |
| 4,748,229 | 5/1988 | Hisgen et al. | 528/183 |
| 4,760,117 | 7/1988 | Evans et al. | 525/394 |
| 4,767,877 | 8/1988 | Shannon et al. | 558/281 |
| 4,769,424 | 9/1988 | Takekoshi et al. | 525/435 |
| 4,775,719 | 10/1988 | Markeuka et al. | 525/125 |
| 4,788,261 | 11/1988 | Taguchi et al. | 525/452 |
| 4,791,187 | 6/1988 | Suling et al. | 528/60 |
| 4,808,255 | 2/1989 | Markeuka et al. | 156/307.3 |
| 4,820,368 | 4/1989 | Markeuka et al. | 156/307.3 |
| 4,837,284 | 6/1989 | Matzner et al. | 525/437 |
| 4,837,287 | 6/1989 | Matzner et al. | 525/437 |
| 4,841,009 | 6/1989 | Kelsey | 528/75 |
| 4,851,278 | 7/1989 | Enanoza | 428/195 |
| 4,863,767 | 9/1989 | Garg et al. | 428/1 |
| 4,868,268 | 9/1989 | Muller et al. | 528/76 |
| 4,882,399 | 11/1989 | Tesuro et al. | 525/523 |
| 4,895,920 | 1/1990 | Mormann et al. | 528/76 |
| 4,395,920 | 7/1991 | Mormann et al. | 528/76 |
| 5,097,010 | 3/1992 | Markle et al. | 528/390 |

OTHER PUBLICATIONS

Daccord, G. et al., "a–w–Difunctionalized Poly(p–thiophenylene) Oligomers", Polymer Bulletin (1981), pp. 459–466.

Kock, W. et al., "Models and Mechanisms of the Formation of Poly (thio–1,4–phenylene)", Makromol. Chem. vol. 184, (1983), pp. 779–793.

Lovell, P. et al., "Synthesis and Characterization of Poly(arylene sulfides)", Makromol. Chem., vol. 199, (1987), pp. 1561–1573.

Daccord, G. et al., "Oligo(thiophenylenes–1,4)a, –w–difunctionnalises, 4", Makromol., vol. 184, pp. 1869–1876, (French with English Summary).

Daccord, G. et al., "Difunctional Poly(p–phenylene sulfide) oligomers", Polymer Bulletin, vol. 6 (1982), pp. 477–484.

Lovell, P. A. et al., "Synthesis and Characterization of Poly(arylene sulfides), 7", Makromol. Chem., vol. 188, (1987), pp. 1551–1560.

Lovell, P. et al., "Synthesis and Characterization of Poly(arylene sulfides),6", Makromol. Chem., vol. 188 (1987), pp. 1537–1549.

Duda, A. et al., "Sulfur–Containing Polymers", in: Encyclopedia of Polymer Science and Engineering, vol. 16, (1989), pp. 246–368.

Sergeev, V. A. et al., "Sulfur–Containing Polymers", Vysokomol, Soedin, Ser. B, vol. 27, (1985), p. 740 (Russian: no translation).

Sergeev, V. A. et al., "Sulfur–Containing Polymers", Vysokomol, Soeding, Ser. B., vol. 29, (1987), p. 527 (Russian: no translation).

Annekova, V. Z. et al., "Sulfur–Containing Polymers". Vysokomol, Soedin, Ser. B, vol. 27, (1985), p. 346 (Russian: no translation).

Garbarczyk, J., "Molecular and Crystal Structure of Bis(4–mercaptophenyl)Sulfide as a model compound for Poly(1,4–phenylenesulfide)", Makromol. Chem., vol. 187, (1986), pp. 2489–2495.

Daccord, G. et al., "Oligo(thiophenylenes–1,4) a,–w–difunctionnalises, 3", Makromol. Chem., vol. 184 (1983), pp. 1861–1867 (French with English summary).

Sergeev, V. A. et al., "Synthesis and Properties of Sulfur–Containing Oligodiamines and Epoxy Polymers bases on them". Vysokomol.

Soedin, Ser. A., vol. 25, No. 6, (1983), pp. 1311–1315 (Russian with Abstract Chemical Abstracts, vol. 99, No. 12, Abstract No. 89006w).

Chemical Abstracts, vol. 101, No. 10, Abstract No. 73274f, Japan Toshiba Corp., "Polysulfide–Polycarbonated", JP 59–4,621 A2.

Chemical Abstracts, vol. 102, No. 22, Abstract No. 185966k, Toray Industries, Inc., "Poly(phenylene sulfide) Composition", Jpn. Kokai Tokkyo Koho, JP 59-204,657, A2, 20 Nov. 1984, Japan Patent Application.

Chemical Abstracts, vol. 99, No. 2, Abstract No. 6117; Koch, W. et al., "Models and Mechanism of the Formation of Poly(thio-1,4-phenylene)", Makromol. Chem. 184(4), 779-92, (1983).

Chemical Abstracts, vol. 84, No. 24, Abstract No. 165535a, Hawkins, R. T. "Chemistry of the Cure of Poly(p-phenylenesulfide)", Macromolecules, vol. 9, No. 2, (1976), pp. 189-194.

Chemical Abstracts, vol. 78, No. 22, Abstract No. 136845x, Montaudo, G. et al., "Bridged Polyaromatics, Synthesis and Isomorphous Properties of Polymers and Oligomers containing Oxygen, Sulfur or Methylene Bridges", J. Polym., Chem. Ed., vol. 11, No. 1, (1973), pp. 65-79.

Chemical Abstracts, vol. 104, No. 18, Abstract No. 150209c, Liang, Y., "Thermoset Polymer Production", 115.4, 563, 509, Jan. 7, 1986.

Chemical Abstracts, vol. 102, No. 24, Abstract No. 204835k, Wejchan-Judek, M. et al., "A New Method of Curing Poly(phenylene sulfide)", Polym. Degrad. Stab., vol. 11, No. 1, (1985), pp. 26-55.

Chemical Abstracts, vol. 108, No. 12, Abstract No. 95043b, Bizzari, C. et al., "Synthesis of Intramolecularly Cyclized Poly(phenylenesulfieds) of the Thianthrene-type", J. Polym. Sci., Part A: Poly. Chem., vol. 26, No. 1, (1988), pp. 255-265.

Chemical Abstracts vol. 91, No. 14, Abstract No. 158341a, Sergeev, V. A. et al., "Poly(acylene-sulfides)", U.S. 4,675, 597; Jul. 30, 1979; USSR Patent.

Chemical Abstracts, vol. 99, No. 12, Abstract No. 89006w, Sergeev, V. A. et al., "Synthesis and Properties of Sulfur-Containing Oligodiamines and Epoxy Polymers Based on them", Vysokomol, Ser. A., vol. 25, No. 6, (1983), pp. 1311-1315.

Chemical Abstracts, vol. 67, 1967, Abstract No. 91314c, Dieterich, D., (Bayer), "Polyurethanes", GB 1,808,590; Aug. 23, 1967, British Patent.

Bruma, M. et al., "Ordered Polyesterimides", Revue Roumaine de Chimie, vol. 30, (1985), pp. 239-244.

Kaicheldorf, H. et al., "New Polymer Synthensis, 7: Synthesis and Characterization of Oligomeric and High Molecular Weight Poly(4-hydroxybenzoate)", Makromol. Chem., vol. 184, (1983), pp. 475-496 (p. 483 missing).

Derwent Abstract, JP63-161-020A; Jul. 4, 1988; Nipon Ester "Random Copolyester with Thermotropic Liquid Crystal Property-includes Units Obtained from Aromatic Di-Tri-and Tetra-Carboxylic Acids, and Aromatic Phosphorous Compound", Japanese Patent Application.

Chemical Abstract (unknown volume and abstract number), Cadiz, et al., "Polymers Containing Titanium II", Rev. Plastic Mod., vol. 31, No. 236, (1976), pp. 193-202.

Chemical Abstract, vol. 85, No. 10, Abstract No. 63357x, Korshak, V. V. et al., "Polyester Imides with Regular Alternation of Ester and Imide Groups", Vopr. Fiz.-Khim. Polim. vol. 1, 1972, pp. 67-73.

Derwent Abstract, 89-009936/02, EP 298,884 A; Jan. 11, 1989, European Patent Application; Quentin, J. P., "Mouldable Thermotropic Copolyesteramide".

Derwent Abstract, 89-009935/02, EP 298,883 A; Jan. 11, 1989; European Patent Application, Quentin, J. P., "Thermotropic Aromatic Copolyesteramide".

Derwent Abstract, JP 58-091-818 A; May 31, 1983; Japan Patent Application, Asani Chemical, "Fiber or Film of Polyester containing Imide Group obtained by Melting Polyester Containing Imide Units; Extruding and Heat-Treating".

Derwent Abstract, DE 3,542,796 A; Jun. 11, 1987; W. Germany; Hisgen B. et al., "Aromatic Mesomorphic Polyester-Amide-Imide(s)-from Diphthalimido-Diphenyl Compounds, Terephthalic and Isophthalic Acids, Amino-Phenols, Aminoacids Hydroxy-Benzoic Acid, etc".

Derwent Abstract, DE 3,542,798, A; Jun. 11, 1987; W. Germany; Hisgen, B. et al., "Aromatic Mesomorphic Polyesteraideimides-from Diphthalimido-Diphenyl Compounds Terephthalic and or Isophthalic Acids, Teritary Butyl Hydroquinone, aminophenols Aminocarboxylic Acids, etc".

Derwent Abstract, EP 272-992 A; Jun. 29, 1989; European Patent Application; Quentin, J. P., "Shapable Thermotropic Aromatic Copolyesteramides Containing Units of a Substituted Hydroquinone, p-Aminobenzoic Acid and Optionally other Aromatic Dicarboxylic Acids".

Derwent Abstract, DE 3,542,813 A; Jun. 11, 1987; Kock, H. J., "Aromatic Mesomorphic Polyetheresters—from Hydroxy Benzoic Acid, Terephthalic Acid, Di(-p-hydroxyphenoxy)phenyl Sulphone, Teritary Butyl Hydroquinone".

Derwent Abstract, DE 3,542,778 A; Jun. 11, 1987; Portugal, A., "Aromatic Mesomorphic Polyesterester-s-from Hydroxy Benzoic, Terephthalic Acid, Hydroquinone, Dihydroxy Diphenyl and Di(p-hydroxyphenoxy)phenyl Sulphone".

Derwent Abstract, EP 213899, A; Mar. 11, 1987; Nippon Oil, "Cholesteric Liquid Crystal Polyester-containing Units of Cyclohexane Dicarboxylic Acid, 3-methyl Adipic Acid and optionally substituted Hydroquinone".

Chattopadyay, K. B. et al., "Synthesis and Characterization of Novel Polyurethane Cationomer", Polymer Communication, vol. 30, No. 1, (Jan. 1990), unknown.

Ding, Y. S. et al., "Synthesis and Characterization of Suphonated Polyurethane Isomers Based and Toluee Diisocyanate", Polymer, vol. 30, (Jul. 1989), pp. 1204-1211.

Lee, D. et al., "Methylenebis(p-phenyl isocyanate) based Polyurethane Ionomers, I. New Small Angle X-Ray Scattering Model", Macromolecules, vol. 21 (1988), pp. 998-1004.

Bazulin, C. "Modification of Polymer Properties Through Ion Incorporation", Ind. Eng. Chem. Prod. Res. Dev., vol. 20, (1982), pp. 271-286.

MacKnight, W. J. et al., "Elastic Inomers", Rubber Chemistry and Technology, vol. 57, pp. 652-663.

Longworth, R., "Thermoplastic Ionic Polymers: Ionomers", In: Holliday, L. Ionic Polymers, (1975), Chpt. 2, pp. 69-170 (partial copy).

Phillips, P. J., "Some Electron Microscopical Investigations of Ionmomeric Materials", Polymer Letters, vol. 10, (1972), pp. 443-447 (partial copy).

Phillips, P. J., "Mechanical Nical and Thermal Properties of Phosphorylated Polyethylene", Polymer Letters, vol. 8, (1970), pp. 87-94.

Dieterich, Von. D. et al., "Polyerethan-Ionomere, Eine Nelle Klasse von Sequenzpolymeren", Angewandte Chemie, vol. 82, No. 2, (1970), (53-57 only; German).

Dieterich, D. et al., "Polyurethane Ionomers, A New class of Block Polymers", Angew. Chem. Internat. Edit., vol. 9, (1970), pp. 40-50.

Phillips, P. J. et al., "Structure and Properties of Polyethylene Modified with Phosphonic Acid Side Groups. I.

Mechanical and Thermal Studies" Thermal Studies of Polyethylene, vol. 3, No. 6, (Nov.–Dec. 1970), pp. 767–771.

Eisenbert, A., Ions in Polymers, Advances in Chemistry Series 187, includes portions of the following chapters:

Makowski, H. S. et al., "Synthesis and Properties of Sulfonated EDPM", Chpt. 1, pp. 3–19 (partial copy).

Lundberg, R. D., "A Comparison of Sulfonate and Carboxylate Ionomers", Chpt. 2, pp. 21–36 (partial copy).

Makowski, H. S. et al., "Plasticiation of Metal Sulfonate–containing EPDM with Stearic Acid Derivatives", Chpt. 3, pp. 37–51 (partial copy).

Brenner, D. et al., "Effect Counterion Structure on Ionomer Properties: Quaternary Phosphonium Countarions in Sulfonated EPDM", Chpt. 4, pp. 53–66 (partial copy).

Lundberg, R. D., "The Dual Plasticization of Sulfonated Polystyrene Ionomer", Chpt. 5, pp. 67–76 (partial copy).

Rahrig, D., "Thermal and Dynamic Mechanical Properties of Sulfonated Polypentenamers", Chpt. 6, pp. 77–89 (partial copy).

Noonan, D., "Thermally and Dynamic Mechanical Properties of Sulfonated Polypentenamers", Chpt. 6, pp. 77–89 (partial copy).

Chemical Abstracts, vol. 65, No. 17, Abstract No. 17170c, Netherlands Patent Application 6,515,558, Bayer AG, "Anion Forming Polyurethanes", NL 65 15,558; Jun. 7, 1966.

THERMALLY REVERSIBLE ISOCYANATE-BASED POLYMERS

This is a continuation-in-part of our prior application Ser. No. 07/851,840 filed Mar. 16, 1992, now abandoned, which is a continuation of Ser. No. 07/651,020 filed Feb. 4, 1992, now U.S. Pat. No. 5,097,010 and Ser. No. 07/740,335 filed Aug. 5, 1991, now U.S. Pat. No. 5,239,039, both of which are continuations-in-part of Ser. No. 07/475,112 filed Feb. 5, 1990, now abandoned; each of the prior applications is hereby incorporated herein by reference as if completely rewritten herewithin.

FIELD OF THE INVENTION

This invention relates generally to polymer compositions that are found by reacting isocyanate and labile-hydrogen functionality. More particularly the invention relates to thermally reversible polymer compositions that are capable of thermally dissociating into the reactant isocyanate and labile hydrogen functionality. Aromatic polyimide, polycarbonate, polyarylsulfide, aromatic polyester with liquid crystal property, and polyarylimidazolidine oligomers are incorporated into the isocyanate or labile hydrogen functionality to give high-performance characteristics. Such thermally-reversible isocyanate-based polymer compositions with high-performance characteristics are useful, among other things, as finish surface coatings on composite materials such as polypropylene and polyethylene terephthalate. Novel phenolic-hydroxyl terminated polyarylsulfide and polyarylimidazolidine oligomers and their preparation are also described.

BACKGROUND OF THE INVENTION

Organic polyisocyanates have been used as lacquers, films, coatings and hot-melt adhesives. Since isocyanate compounds are very reactive toward groups with an active hydrogen such as hydroxyl, carboxyl, amine and the like, it is common to control such reactivity by adding a monoblocking or masking agent to the isocyanate (U.S. Pat. No. 3,115,479 to Windermuth et al.) and then reacting the blocked isocyanate with a polyester containing free hydroxyl groups by heating the mixture to deblock the isocyanate.

As seen in U.S. Pat. No. 2,777,881, it is possible to avoid the use of blocking agents by limiting the amount of isocyanate reacted with terminal labile hydrogen groups of a polyester or polyesteramide so as to afford a material that is in an uncured state. Additional isocyanate groups then are added to the uncured product so that a subsequent irreversible cross-linking reaction with moisture can take place to produce the final cured state with appropriate physical properties.

Another solution that avoids premature introduction of moisture into the product is to use a packaging system to protect the isocyanate from moisture prior to use. *Adhesives Age*, September 1987, p. 42–43.

U.S. Pat. No. 4,166,873 to Gilliam et al discloses improved hot melt adhesives and coatings formed by adding diisocyanate to polyesters. The inventors note that the incorporation of isocyanate into the polyester molecules does not involve chain-extension or significant crosslinking. U.S. Pat. No. 2,982,754 to Sheffer et al. and U.S. Pat. No. 2,876,725 to Buck at al. (example 4) contain additional examples of polyesters modified by the addition of isocyanates.

U.S. Pat. No. 3,503,927 to Chang et al pertains to a cross-linked network structure where the cross-linking is labile to heat and provided by the reaction between a phenolic group and an isocyanate group. U.S. Pat. No. 3,684,769 to Abbott et al. pertains to thermally reversible polyester or polyether urethane polymers with thermally reversible urethane links between polymer chains. U.S. Pat. No. 4,201,853 to Henry et al reveals a thermally-reversible polymeric binder for plastic bonded explosives that reversibly dissociated below 150° C. Wagener and Muria, *Polymer Preprints*, Vol. 30, No. 1, April 1989 disclose monomeric thermally reversible urethanes whose molecular weight is a function of temperature. Although a polyurethane was prepared, no discussion or data on polymer urethane bond reversibility are given nor are suggestions made as to its applicability.

U.S. Pat. No. 4,608,418 to Czerwinski et al. illustrates an attempt to improve the performance of conventional isocyanate materials by adding a reactive plasticizer to a hot-melt composition formed from a mixture of one or more polyisocyanates and one or more hydroxyl terminated polyols and one or more chain extenders.

Prior-art isocyanate-based polymers have been low molecular weight isocyanate compositions that afford good working properties, e.g., application ease, surface wettability and penetration, leveling ability, and gap-filling capacity. Such materials are commonly moisture-cured to form substituted polyureas after being applied to give durable coating or adhesive materials. However, such materials do not have the high performance characteristics of some of the more costly high-performance polymers such as the polyimides. Typically as one attempts to improve the performance characteristics of the isocyanate-based materials using conventional techniques, high-viscosity and associated low wettability result in a loss of substrate bonding ability. Currently conventional isocyanate polymers do not allow for the high temperature processing, e.g., soldering and thermoforming, of flexible circuit boards and other components such as chips, transformers and motors. Conventional isocyanate polymers typically do not provide cracking resistance at high enduse operating temperatures such as found in high performance aircraft, automotive and computer equipment. The processibility of high performance materials that are used in high performance protective dielectric film or coating materials is more limited than desired. A need continues to exist for a better, melt-processable, high-performance materials for molding and coating applications, especially finish surface coatings on composite materials.

SUMMARY OF THE INVENTION

This invention meets these needs and solves many of these problems by preparing thermally-reversible polymer compositions that contain isocyanate-labile-hydrogen based linkages in the polymer backbone and, if necessary, a controlled number of similar crosslinking groups. These isocyanate-labile hydrogen based linkages provide cured, crosslinked, three-dimensional polymer networks that are insoluble, strong solids, at room temperature, but which become soluble, free-flowing melts at elevated temperatures. The polymers become soluble and fusible due to a thermally reversible dissociation of the isocyanate-labile hydrogen based linkage to the isocyanate and labile-hydrogen starting groups at an elevated temperature.

The isocyanate-labile hydrogen based linkage is a urethane linkage when isocyanate functionality reacts with a terminal hydroxyl functionality. A substituted urea linkage is formed when the labile hydrogen functionality is a terminal amine functionality. Other labile-hydrogen functionalities form an isocyanate adduct of the functionality. Labile-hydrogen functionalities include, but are not limited to, amides, alcohols (including phenols), amines, oximes, triazoles, imidazoles, imidazolines and iminodiazolidinediones.

Generally both aromatic and aliphatic isocyanate and labile-hydrogen functionality form urethane or other bonds that are reversible at some elevated temperature. Typically this temperature is significantly higher for the aliphatic product than for the aromatic product. Intermediate reversing temperatures can be achieved by using a mixed aliphatic and aromatic product. When high performance polymers are desired, an oligomer such as an aromatic polyester with liquid crystal character, a polycarbonate, a polyarylsulfide, a polyimide, a polyarylimidazolidine including poly(parabanic) acid, a polyarylsulfone or equivalent high-performance functionalty is incorporated into the isocyanate or labile-hydrogen compounds.

As used here the term oligomer or prepolymer is defined as a low molecular weight compound capable of further polymerization. When used in terms of high-performance functionality (e.g., aromatic polyester with liquid crystal character, aromatic polycarbonate, polyarylsulfide, aromatic polyimide, polyarylimidazolidine including poly(parabanic) acid, polyarylsulfone and so forth), the term oligomer typically includes about 1 to 20 repeat units of such high performance functionality. For the case of a single repeat unit, the single repeat unit has at least two functional groups that are the same. For example, the condensation of a diacid with two hydroxy groups to produce two polyester units would be considered as an oligomer with a single repeat unit. As used here, the term prepolymer typically refers to commercially available isocyanate and labile hydrogen compounds while oligomers are usually prepared. However this distinction is not limiting and serves only as a convenient way of categorizing the materials used in practicing this invention.

Often it is desirable to block the isocyanate functionality prior to its reaction with the labile hydrogen functionality so as to prevent unwanted irreversible reactions with moisture and other reactive hydrogen contaminants. As a result, improved handling and stability of the isocyanate functionality is obtained. By using a volatile blocking agent such as phenol, the blocked isocyanate can be reacted with the labile hydrogen functionality by heating the two reactants so as unblock the isocyanate by vaporizing the phenol leaving the unblocked isocyanate to react with the labile hydrogen functionality.

By controlling the stoichiometry of the reactant labile-hydrogen functionality and the isocyanate functionality, it is possible to obtain a polymer with isocyanate end groups. By using a nonvolatile blocking group in the correct stoichiometry, it is possible to control the reactivity and characteristics of the final polymer product. Provided there are no interfering reactions with the nonvolatile blocking group, it may be added at any stage of the reaction sequence.

Various characteristics may be incorporated into the polymer composition by using oligomers with specific properties. For example, aromatic polycarbonates may be used to provide inherent toughness and impact resistance. Moreover, it has been found that a thermally-reversible polymer composition with polycarbonate forms a class "A" finish surface, i.e., suitable for exterior finish applications such as automotive finishes, when applied to polypropylene and polyethylene terephthalate sheet composites. Furthermore the thermally-reversible polymer adheres tightly to the composites, a characteristic not previously known.

By controlling the degree of polymerization of an aromatic polyester oligomer, a melt liquid crystal property can be obtained. Such a liquid crystal property provides solid state anchoring or "virtual crosslinks" so as to minimize the number of actual three dimensional covalent crosslinks that need to be used. Polyimides are used to provide high melting and liquid crystal features.

Polyphenylenesulfides have exceptional strength and rigid, heat stable polymer chains that provide improved hardness, toughness, and solvent resistance to the polymer composition. Although hydroxyl end groups are preferably used as the active or labile-hydrogen end groups, other end groups such as amines, oximes, triazoles, imidazoles and imidazolines may also be used. By combining an aryldihalide and sodium sulfide nonahydrate in a non-aqueous solvent such as 1-methyl-2-pyrrolidinone and driving off the water of hydration, a polyarylsulfide oligomer is formed without the explosive and unstable conditions that arise when sodium sulfide are used.

A polyarylimidazolidine oligomer may be used to afford high temperature termal stability. By using an initial excess of cyanide to isocyanate, gel formation is avoided in preparing the polyarylimidazolidine oligomers that have about 1 to 20 repeat units with 3 to 10 repeat units preferred.

To provide ambient or low temperature flexibility and toughness, flexible aliphatic polyester, polyether or polycarbonate prepolymers can be included in the polymer composition. For example, polyesters formed from adipic or sebacic acid, dimer acids, $\alpha,\omega$-butane, pentane or hexane diols, hydrogenated (saturated) phthalic acids, other simple diols and polyglycols such as polypropylene glycols can be used.

Melt reversibility is enhanced by incorporating ionic functionality into the polymer composition that is capable of forming thermally-reversible ionic bonds. Typically such thermally-reversible ionic functionality can be achieved by using a functionality such as an aliphatic carboxylate, sulfonate, or phosphonate that is capable of forming ionic bonds with preferably a multivalent cation such as zinc, magnesium, calcium or nickel.

BRIEF DESCRIPTION OF THE DRAWINGS

FIG. 1 shows data from $-50°$ C. to $100°$ C. for composition H-a after about 10 minutes mixing at $200°-210°$ C.

FIG. 2 shows data from $100°$ C. to $200°$ C. for composition H-a after about 10 minutes mixing at $200°-210°$ C.

FIG. 3 shows data from $100°$ C. to $220°$ C. for composition H-b (tin catalyst added) after about 10 minutes mixing at $200°-210°$ C.

FIG. 4 shows data from $100°$ C. to $220°$ C. for composition J after 25 minutes mixing at $200°-210°$ C.

FIG. 5 shows data from $100°$ C. to $220°$ C. for composition J after 75 minutes mixing at $200°-210°$ C.

obtained with Mettler FP2 hot stage and Olympus BH microscope with 40× ULWD (ultralong working distance) lens.

Figure 7B:
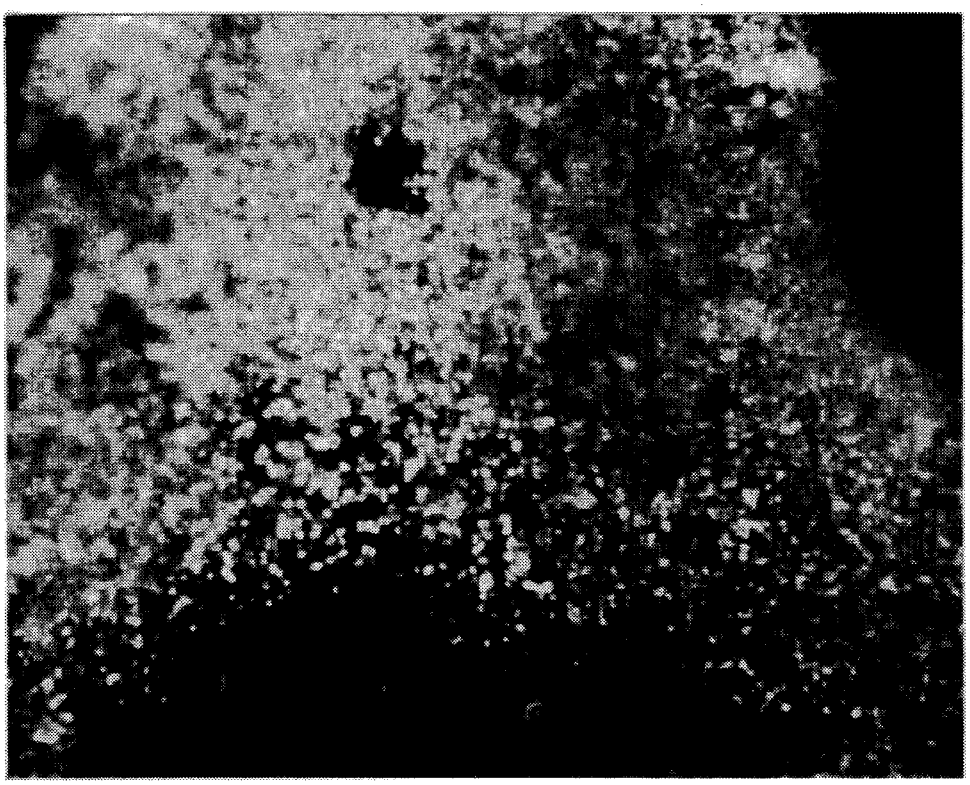
Figure 7A:

FIGS. 7(a) and 7(b) show the liquid crystalline region of the phenolic-hydroxyl terminated biphenylene sulfide oligomer (Example 20) at ~200° C. Plane polarized optical micrographs (400×) obtained with Mettler FP2 hot stage and Olympus BH microscope with 40× ULWD (ultralong working distance)lens.

Figure 8:
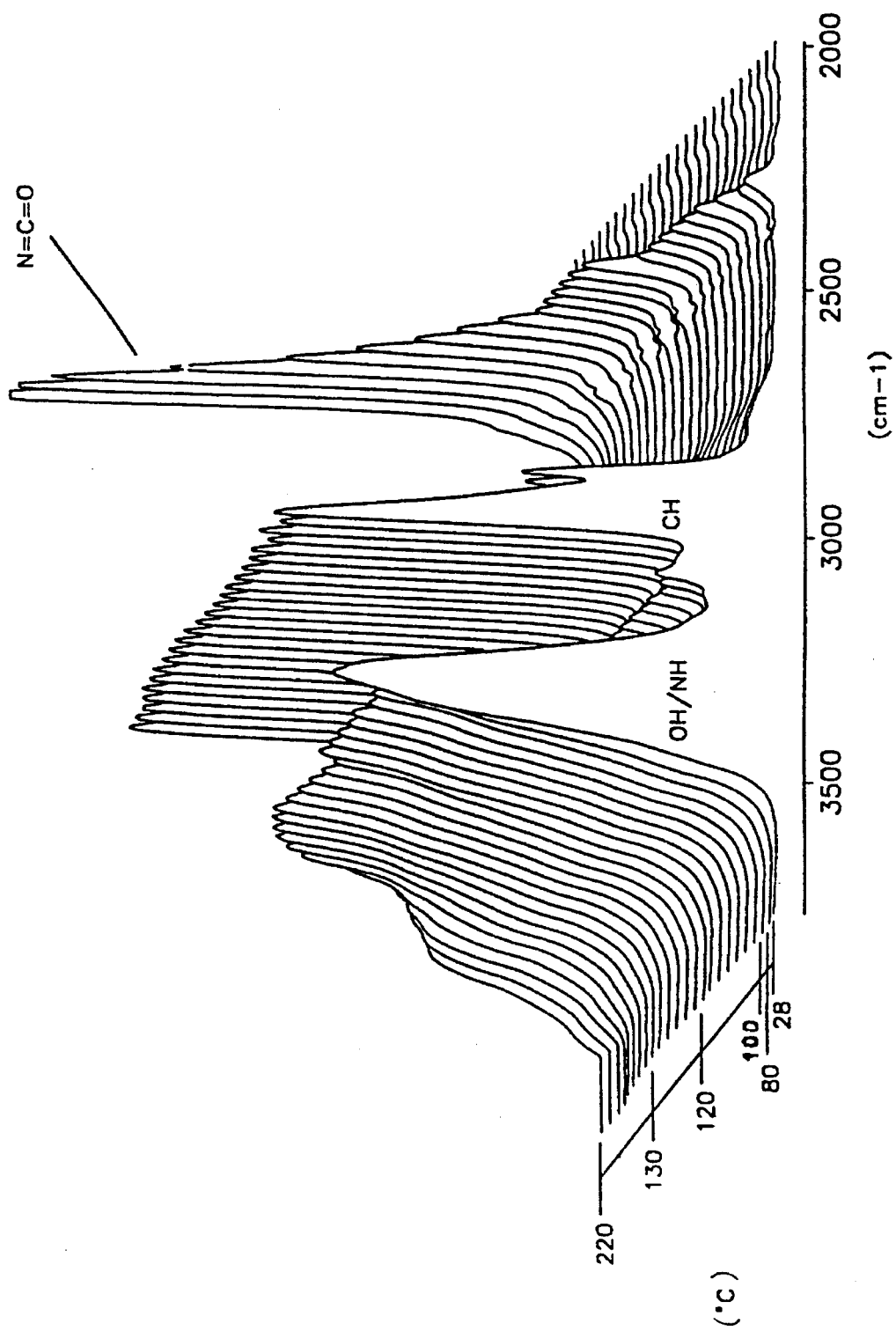

FIG. 8 shows a series of spectra of NDI polyurethane obtained during temperature rise from 28° C. to 220° C. Sample was held at 100° C. and 120° C. for approximately 30 minutes before raising to 220° C. Temperature was then dropped to <100° C. in less than 1 minute. Data are normalized to the CH stretch.

Figure 9:
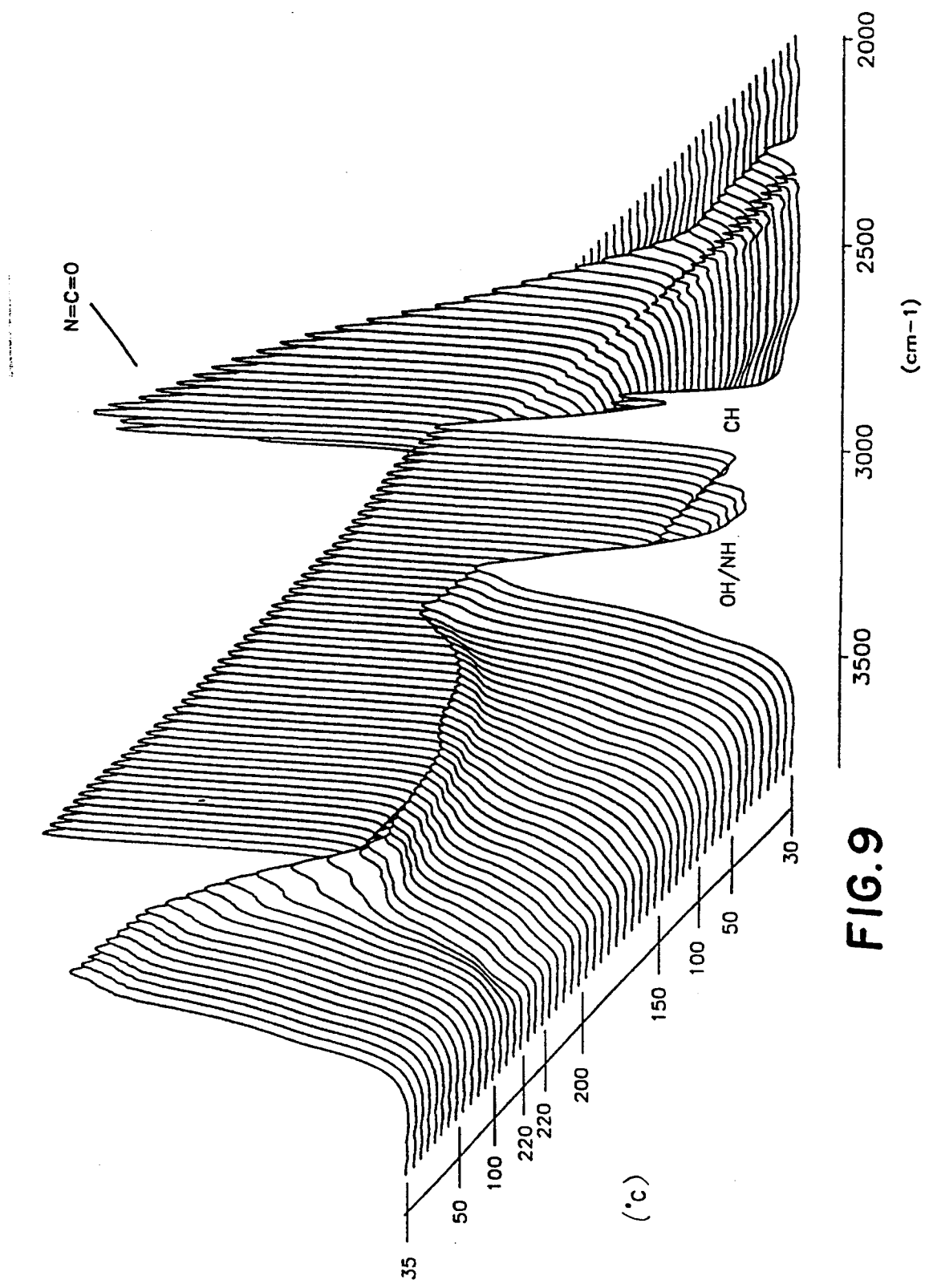

FIG. 9 shows a second heating cycle of the same sample of NDI polyurethane as in FIG. 8.

Figure 10:
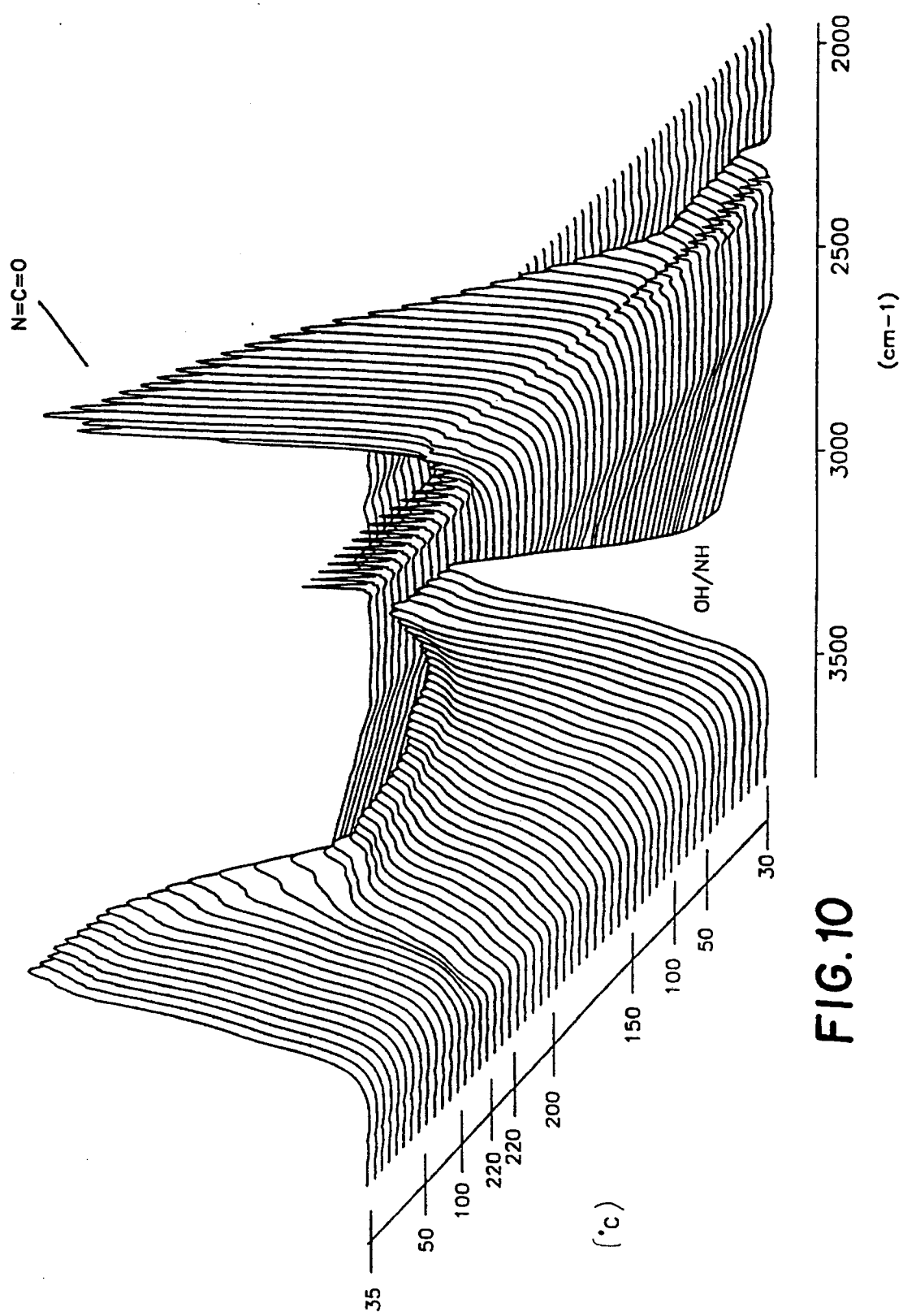

FIG. 10 shows the same data as FIG. 9 except that CH stretching bands are removed for clarity.

Figure 11:
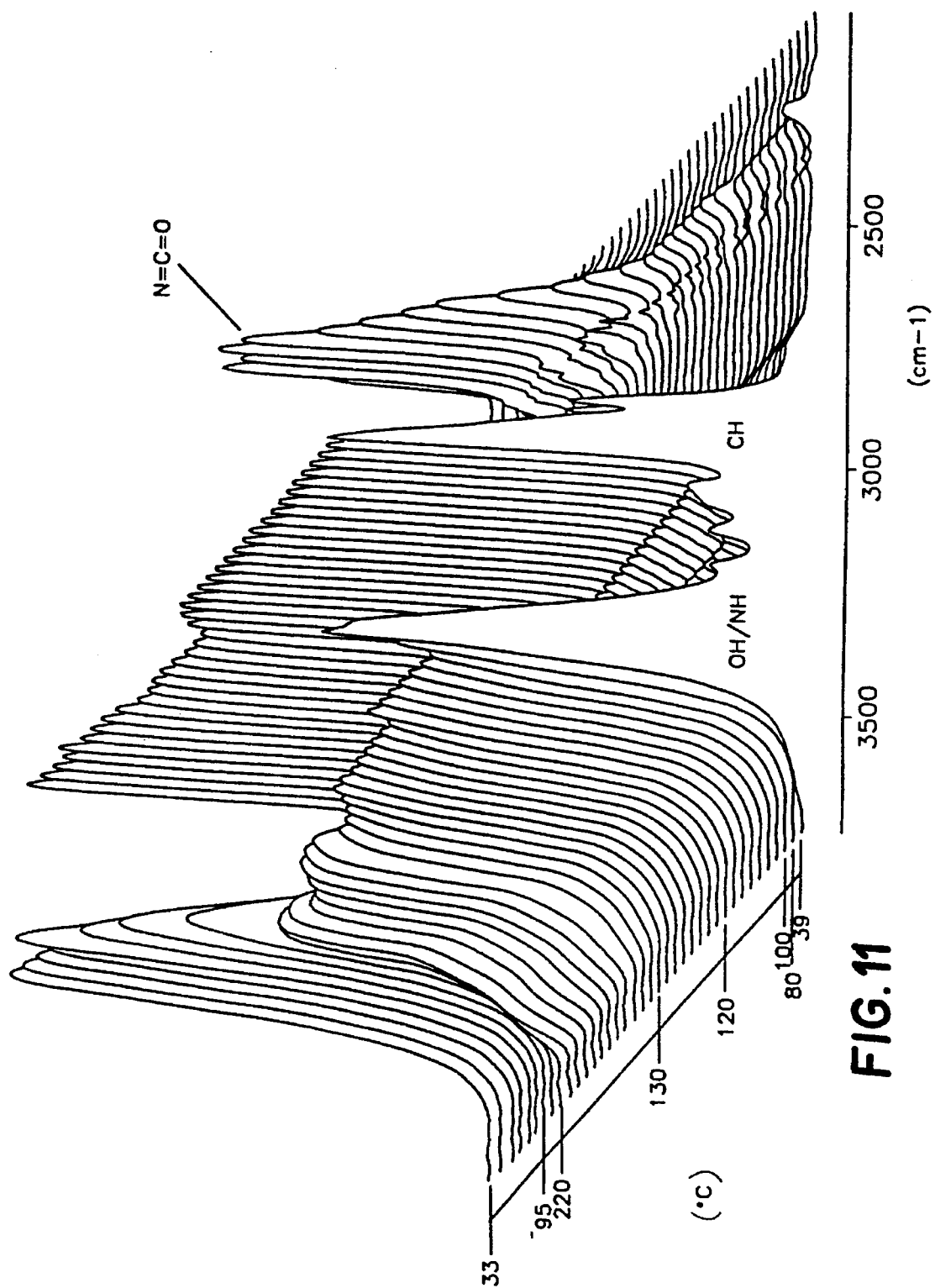

FIG. 11 shows a series of spectra MDI polyurethane obtained during temperature rise and drop from 39° C. to 220° C. to 33° C. Sample was held at 100° C. and 120° C. for approximately 30 minutes before raising to 220° C. Temperature was then dropped to <100° C. in less than 1 minute. Data are normalized to the CH stretch.

Figure 12:
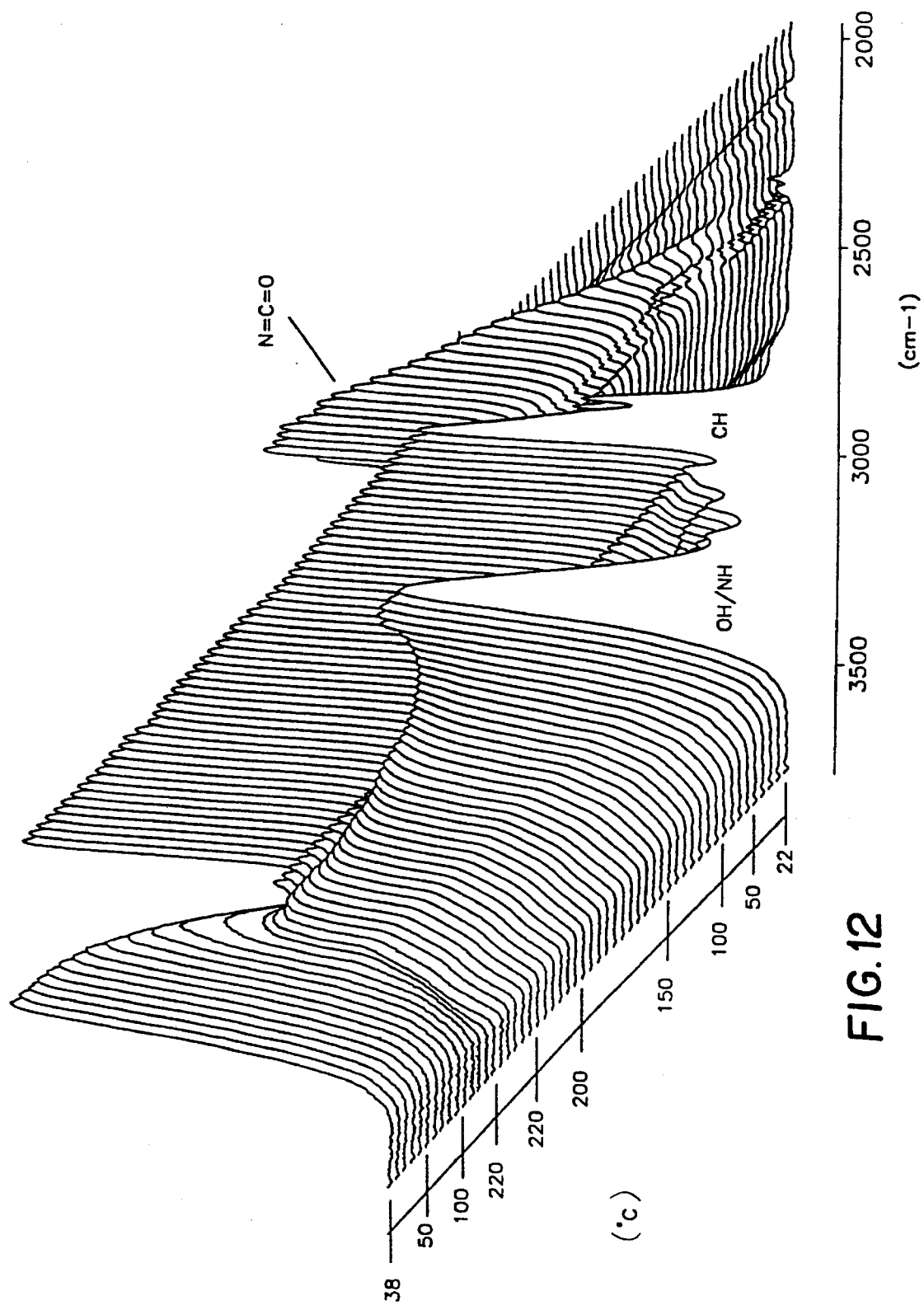

FIG. 12 shows a second heating cycle of the same sample of MDI polyurethane as in FIG. 11.

Figure 13:
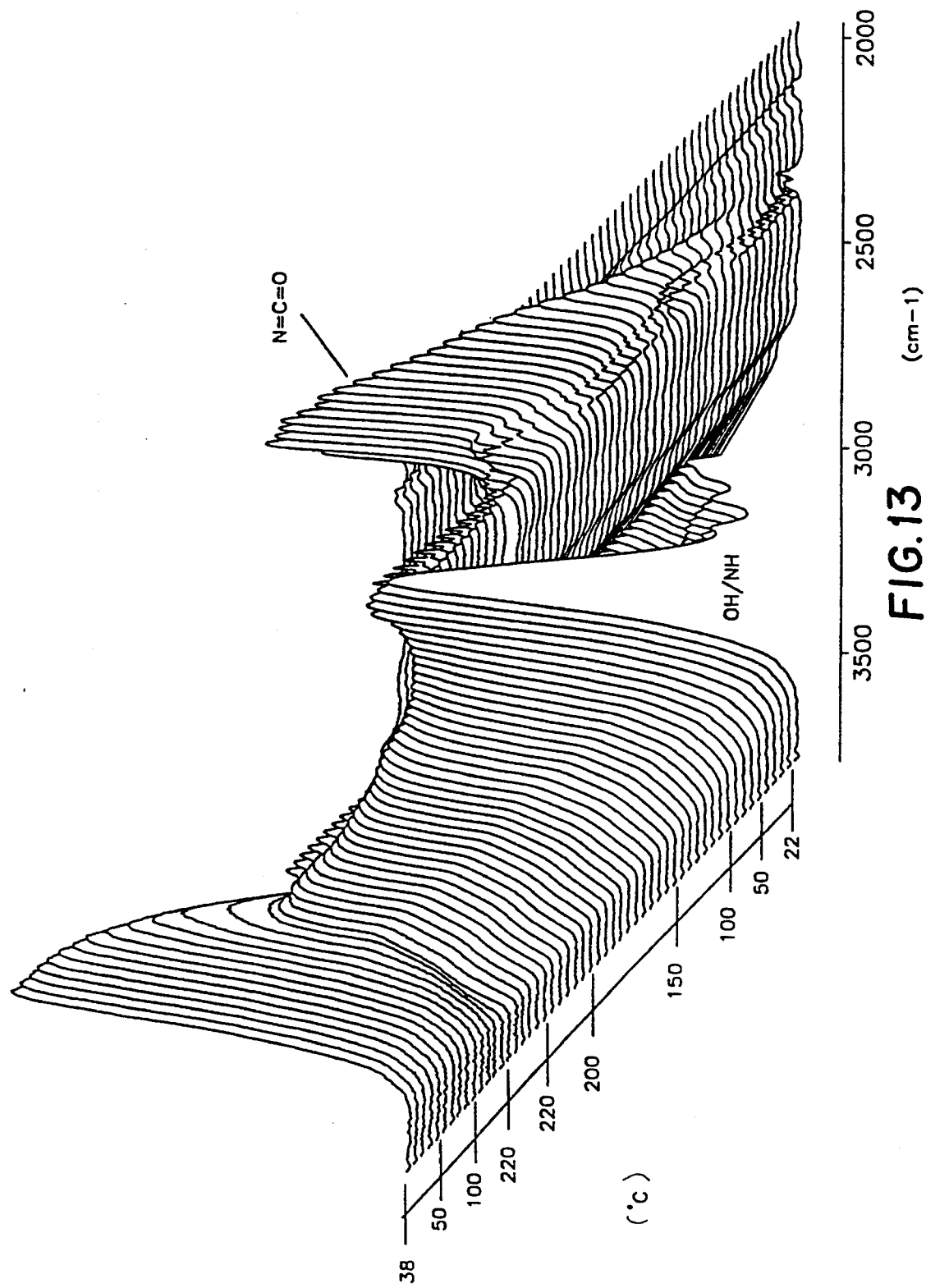

FIG. 13 shows same data as FIG. 12 except that CH stretching bands are removed for clarity.

Figure 14:
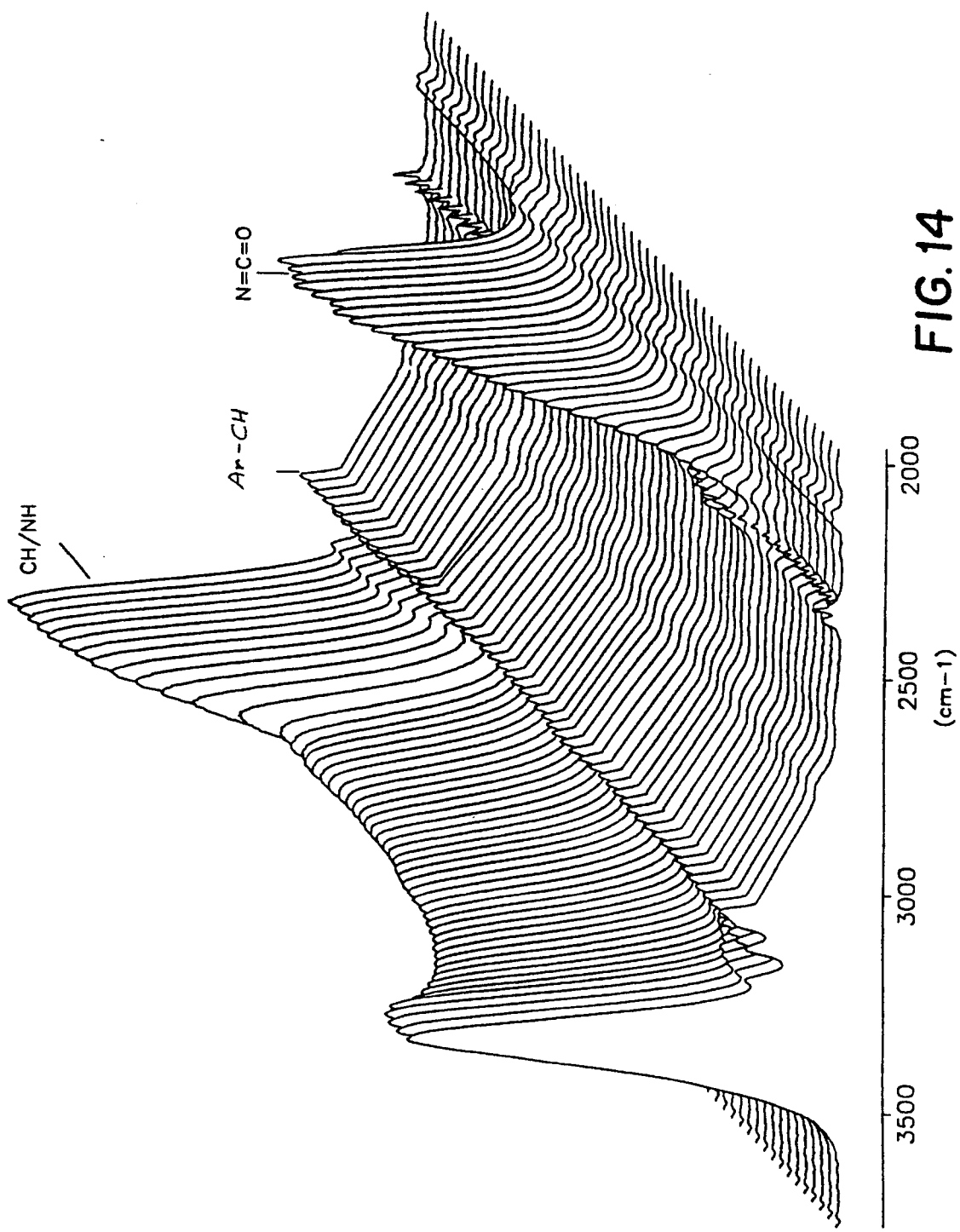

FIG. 14 shows same data as FIG. 13 except at a different angle of view showing aromatic C—H bands (Ar—CH).

Figure 15:
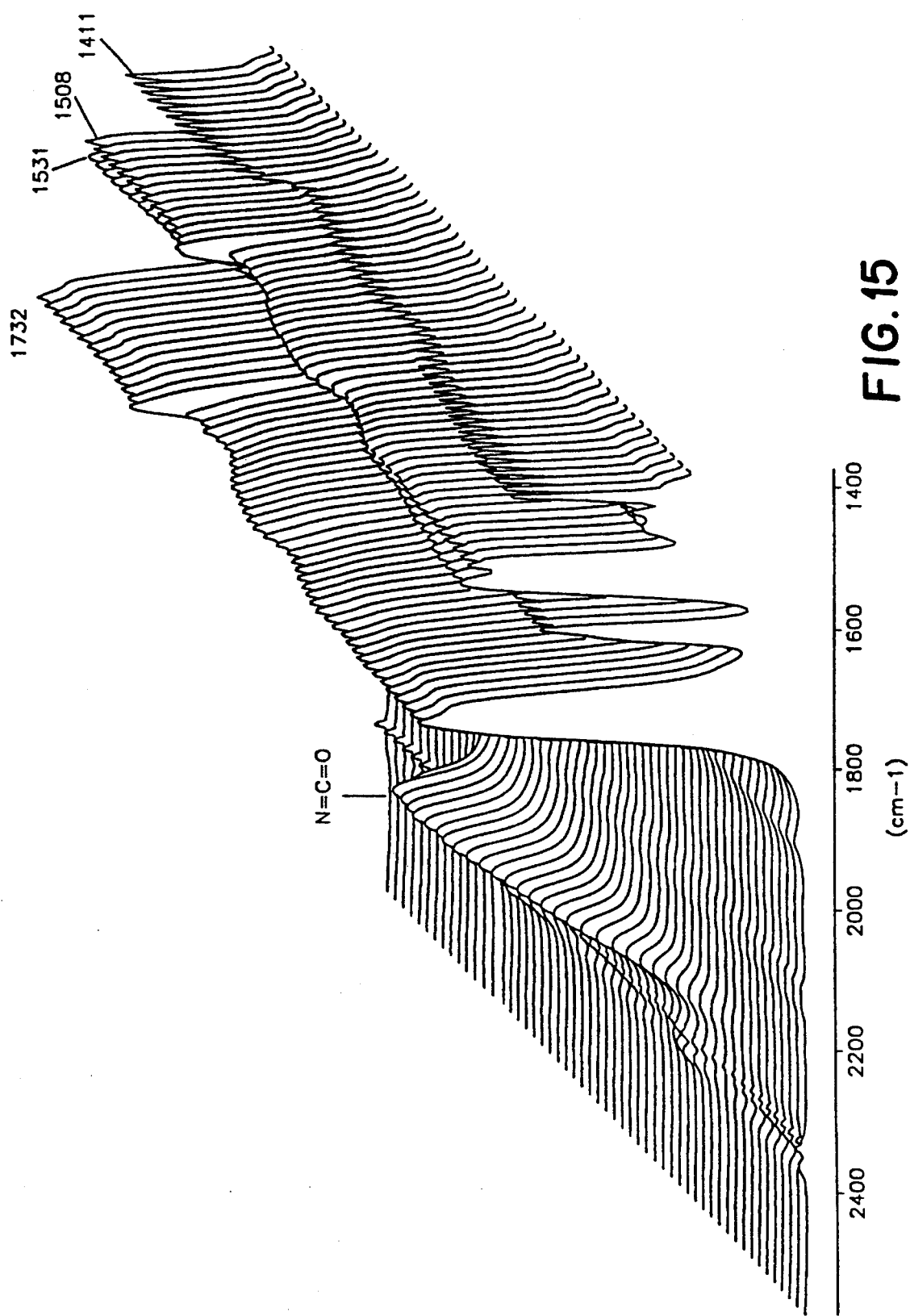

FIG. 15 shows same data as FIG. 11–14 but displaying a different region of the spectrum. Note the dramatic changes in the ester carbonyl (1732 cm$^{-1}$) and amide (1508/1531 cm$^1$) bands during the temperature drop.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

The benefits and potential benefits of the thermally-reversible polymer composition arise from the basic property of this invention, that is, the ability of the polymer composition to thermally dissociate into its reactant isocyanate and labile-hydrogen functionalities. This basic property allows the composition to flow at a comparatively low temperature while exhibiting high strength, good surface adhesion, low temperature flexibility, relatively fast development of strength, relatively good solvent resistance, good tear resistance, good impact resistance, and high abrasion resistance.

Generally the formation of the compositions of this invention requires reacting high performance oligomers possessing appropriate reactive end groups, i.e., isocyanate and labile-hydrogen functionality capable of forming a isocyanate-labile hydrogen based linkage that is capable of thermal dissociation into the starting materials. Essentially stoichiometric amounts of isocyanate and labile-hydrogen functionality are used.

Two types of structures are prepared. One consists of linear isocyanate-labile hydrogen based linkage in which no trifunctional isocyanates (or labile-hydrogens) are used. Such polymeric compositions have "virtual crosslinks," i.e., crystalline aggregates that act like crosslink sites, based on liquid crystal oligomers. The second type of polymeric composition is a crosslinked isocyanate-labile hydrogen based linkage based on a combination of a diisocyanate-labile hydrogen linear linkage and preferably a component of triisocyanate or a tris-labile hydrogen or both. Both types of structures may also contain ionic functionality capable of forming thermally-reversible ionic bonds.

The thermally-reversible polymer compositions may also be considered as having three building blocks: 1) an isocyanate linking group, 2) a high performance aromatic oligomer backbone group, and 3) a toughening aliphatic prepolymer backbone group.

The isocyanate linking group includes the trifunctional isocyanate crosslinker that is preferably reacted only with the aromatic oligomer backbone group. Various balanced stoichiometry combinations of these three sequences can be combined to produce thermally-reversible polymer compositions that are crosslinked to a controlled extent with aromatic isocyanate-labile hydrogen linkages, or are not covalently crosslinked, but depend on "virtual" crystalline polymer crosslinks for high performance.

Although phenolic hydroxyl is preferably used as the labile-hydrogen functionality, it is noted that other moieties also furnish labile-hydrogen functionality. Such moieties include, but are not limited to, aromatic amines or diamines, aromatic oximes and bis-, bi-, or dioximes, aromatic triazoles and bis- or ditriazoles, and aromatic imidazoles and imidazolines and bis- or diimidazoles and imidazolines. Less preferred are the aliphatic analogs of these compounds and primary amines where excessive cross linking may be undesirable.

Polyisocyanate reactants used in this invention include aromatic, aliphatic, cycloaliphatic or aralkyl polyisocyanates containing from about 6 to 100 carbon atoms. When a linear composition is sought, the polyisocyanate functionality should be about 2. The following polyisocyanates are expected to be useful: 1) aromatic isocyanates and prepolymers based on the following materials: 4,4'-diphenyl methane diisocyanate (MDI), 4,4',4"-triphenyl methane triisocyanate, 1,4-Phenylene diisocyanate (DPDI), 1,3-phenylene diisocyanate, xylene diisocyanates such as 5,6-dimethyl-1,3-phenylenediisocyanate and 2,4-dimethyl-1,3-phenylenediisocyanate and other aromatic isocyanates based on other backbones such as naphthalene and 2) aliphatic isocyanates and prepolymers based on the following representative materials: 1,3-cyclohexylene diisocyanate, 4,4'-methylene-bis(cyclohexylisocyanate). A wide variety of polyisocyanates are known in the art as shown in, for example, U.S. Pat. No. 4,608,418 to Czerwinski et al., which is hereby incorporated herein by reference.

The high-performance oligomer backbone group includes, but is not limited to, polycarbonates, aromatic polyesters, polyimides, polyarylimidazolidines (including polyparabanic acids), and polyarylenesulfides with phenolic hydroxyl or other labile-hydrogen end-group functionalities. Generally a labile-hydrogen functionality of about two is preferred.

When thermoplastic sheet composite parts are formed in a mold, dimensional changes between the fiber or other reinforcements and the polymer causes surface roughness. As such the composite is not of class "A" surface finish quality, that is, the composite is not suitable for exterior finish applications such as automotive finishes. To remedy this problem, coatings are used to fill in the depressions in the composite. The coatings must have low viscosity, good adhesion to the composite, and not solidify in an uneven manner. Prior to the present invention, no coatings were known that gave good adhesion to polypropylene and polyethylene terephthalate thermoplastic sheet composites. However, the thermally-reversible polymers of this invention adhere tightly to the composite and have a low viscosity that provides good coverage over the molded part.

Preferably the composition meeting this need is a polycarbonate oligomer with phenolic-hydroxyl end groups that forms a thermally-reversible urethane linkage with diphenylmethane diisocyanate (MDI). Trimethylolpropane is used to form thermally-reversible cross-links with the diisocyanate and polycarbonate oligomer. Polycaprolactone diol, p-phenylphenol, and bis-hydroquinone isophthalic acid diester may also be incorporated into this composition.

The polycarbonate oligomer can be prepared from bisphenol A and phosgene in a suitable organic solvent using a controlled excess of hisphenol A to produce phenolic hydroxyl end groups. The solvent should be anhydrous, polar solvent capable of dissolving the reactants and product, e.g., methylene chloride. Water is removed with a suitable drying agent such as $CaH_2$. Suitable polycarbonates include those based on or containing in addition to hisphenol A, bisphenol F, 4,4'-dihydroxybenzophenone, 4,4'-dihydroxydiphenylsulfone, hydroquinone, resorcinol, phenolphthalein or 4,4'-biphenol.

Aromatic polyester oligomers are based, for example, on 4- and 3-hydroxybenzoic acid, hydroquinone, resorcinol, 4,4'-biphenol, terephthalic acid, isophthalic acid and the 1,5-disubstituted naphthalenes, in which both groups are either hydroxyl or carboxyl, or one is hydroxyl and the other is carboxyl. The phenol (aromatic hydroxyl) groups are present in the reaction mixture, for example, a melt, predominantly in the form of the acetate ester obtained by reaction with acetic anhydride. Generally about half of the oligomer will contain 4-hydroxybenzoic acid derived moieties. The remainder can be derived from any of the other monomers, so long as the reaction mixture composition is such that the acetoxy and hydroxy to carboxylic acid group ratio will result in a hydroxy-terminated oligomer with a degree of polymerization in the range of 1–20 and more preferably in the range of 1–10. Further the monomer mixture must be selected so that the oligomer will be obtainable as a melt under an inert atmosphere such as nitrogen or argon at temperatures that can be varied between about 200° C. and an upper temperature at which essentially no thermal degradation occurs, i.e., about 300° C. or above.

Illustrative of the polyimides are those based on pyromellitic dianhydride (PMDA) and other commercially available aromatic dianhydrides and aromatic diamines such as p-phenylenediamine, 4,4'-diaminodiphenylether and benzidine. Additional, nonpara-substituted diamines such as m-phenylenediamine and 3,3'-diaminodiphenylether may also be used to lower the melting point of the oligomer.

Polyarylimidazolidines containing imidazolidine moieties such as 4-imino-1,3-imidazolidine-2,5-dione-1,3-diyl; 5-imino-1,3-imidazolidine-2,4-dione-1,3-diyl; 1,3-imidazolidine- 2,4,5-trione-1,3-diyl; and mixtures thereof and their preparation are described in U.S. Pat. Nos. 3,591,562 and 3,933,758 to Patton which are hereby incorporated herein by reference. Isocyanates based on p-phenylenediisocyanate, MDI, and the other isocyanates listed above and in the Patton patents are reacted in a nonaqueous (anhydrous) solvent with hydrogen cyanide including hydrogen cyanide providers such as acetone cyanohydrin, using a suitable catalyst such as cyanide ion from a cyanide salt, preferably an alkali metal cyanide such as sodium cyanide and a tertiary amine without reactive hydrogen such as triethylamine and an excess of isocyanate to provide first stage isocyanate-terminated oligomers of a controlled degree of polymerization (DP). Any solvent that dissolves the reactants, the products, or both may be used. Anhydrous solvents are required since water reacts with the isocyanate group. Preferably the solvent is an aprotic dipolar solvent such as 1-methyl-2-pyrrolidinone suitably dried such as with a molecular sieves. The isocyanate terminated oligomer can then be blocked with phenol or reacted with any of a number of phenolic hydroxyl terminated oligomers.

To avoid undue cross-linking between the imino hydrogen and isocyanate with resultant gel formation, it has been found desirable to initially use an excess of hydrogen cyanide to isocyanate. After the initial exothermic reaction begins to cool, a stoichiometric amount of isocyanate sufficient to react with the excess of hydrogen cyanide and one hydroxyl group of a dihydroxyl end-capping group is added to the reaction followed immediately by the addition of the dihydroxyl end capping group. The iminoimidazolidinedione ring(s) in the blocked or reacted oligomer can be hydrolyzed under appropriate conditions with a properly, water-diluted, mineral acid such as sulfuric acid or hydrochloric acid to provide the parabanic acid ring oxygen, i.e., 1,3-imidazolidine-2,4,5-trione, and the ammonium salt of the mineral acid. Generally the polyarylimidazolidines have a degree of polymerization (DP) of about one to about twenty with a lower DP of about four preferred for better product melt processability.

Illustrative polyarylsulfide oligomers suitable for the practice of this invention can be prepared by the condensation of dihaloaryl compounds with sodium sulfide. Labile-hydrogen functionality such as found in halophenolic compounds are used to control the molecular weight of the oligomer and to provide hydroxyl (labile-hydrogen) end capping groups. Sodium sulfide nonahydrate is preferred to sodium sulfide since the latter is unstable and can explode upon percussion or rapid heating. By generating the sodium sulfide in situ and driving off the waters of hydration, the reaction can be safely conducted in an open system, and the reaction progress followed by monitoring the volatile byproducts.

Examples of useful polyarylsulfides include those containing any $C_6$–$C_{14}$ group such as, but not limited to, biphenyl, phenyl ether, anthracene, or anthraquinone and may contain pendant hydroxyl functionality. Biphenyl backbone groups are preferred, not only because they may be readily incorporated synthetically, but because even low molecular weight para-hydrocarbon disubstituted biphenyl compounds show liquid crystal properties. Polyarylsulfides that exhibit liquid crystalline behavior are preferred, since they possess better melt-processing characteristics (lower viscosity and high shear thinning) relative to comparable non-liquid crystalline materials.

Both lower cost dichloro- and higher reactivity dibromoaryl compounds can be used. Representative examples of haloaryl compounds include 4,4'-dibromobiphenyl; 1,5-dichloroanthraquinone; 4,4'-bromophenyl ether; 9,10-dibromoanthracene; 2,4 dibromophenol while 4-bromo (or chloro) phenol can serve as halophenolic end cappers. Non-aqueous solvents capable of dissolving the product are used with the preferred reaction solvent being 1-methyl-2-pyrrolidinone due to its solvency strength, relatively high boiling point and miscibility with product precipitation media such as water, methanol or mixtures thereof.

Toughening prepolymers provide ambient or low temperature flexibility and toughness to the final polymer composition. A wide variety of flexible prepolymer materials may be used including polycaprolactone diols such as Union Carbide PCP, polytetramethylene ether glycols such as DuPont Teracol and polyaliphatic carbonate diols such as PPG Duracarb. Other toughening prepolymers include hydroxy-ended aliphatic polyesters such as adipic acid or sebacic acid polyesters with $\alpha,\omega$,-butane, pentane or hexane diols, saturated phthalic acid-based polyesters (long, or non-drying alkyds) with any of the simple diols and simple polyether glycols such as polypropylene glycols.

Additives as are commonly added to polyurethane products such as antioxidants, UV stabilizers, colorants, fillers, etc., can be added to the polymer composition of the present invention in conventional amounts.

The polymer composition of this invention can be coated onto a suitable substrate by applying such composition to the substrate and then heating the covered substrate to a temperature sufficient to form a bond. Operative methods for covering a surface include powder coating and applying a film to the substrate. In powder coating, the composition is ground into a powder with particle sizes less than about 250 μm (microns) and applied to a substrate either by electrostatic spray or by fluidized bed. The covered substrate then can be baked at a temperature sufficient to form a uniform fused coating bonded to the substrate. In another method, a film of the polymer material can be placed on the substrate and then baked. Alternatively, the thermally reversible material can be applied to a heated substrate such that bonding occurs as the material is applied to the substrate. When used as a hot melt adhesive, the polymer composition can be applied between two substrates and the two substrates heated to form a bond. Alternatively the polymer composition can be applied to at least one heated substrate followed by pressing the second substrate to the first. When thermal conductivity is not a significant factor, the heated polymer components can be applied without substrate heating.

One of the objects of this invention was to prepare polyurethane polymer compositions based on aromatic diisocyanates that provide a good balance of easy melt processibility, especially at higher temperatures where aromatic urethane bond reversibility occurs, and excellent physical properties over a broad temperature range. For example, it was desired to obtain good adhesive strength at temperatures of 120°–150° C. or higher. Aromatic ester and polycarbonate diol oligomers that melt at temperatures $\geq 180°$ C. and have the potential to provide such properties have been designed and synthesized.

Polycarbonate oligomers were prepared and are represented by the acronym sequence DP1-C-[DP2-C]$_n$DP1 where DP1 is an aromatic diphenol, C is carbonate functionality, DP2 is selected from the group of diphenols consisting of aromatic diphenols that may be the same as DP1 and aromatic-aliphatic diphenols and wherein C is carbonate functionality derived from a carbonyl and the oxygen moiety on seperate phenol units of DP1 and DP2 and n is about 1–20.

Phenolic hydroxy terminated polyesters of aromatic or aliphtic esters were prepared and are represented by the acronym sequence PH-[DHA-DAH]$_n$-DHA-PH where PH is a phenolic acid ester segment, DHA is an aromatic or aliphatic dihydroxy or di acid ester group or a mixed hydroxy and acid ester segment, DAH is an aromatic diacid ester or dihydroxy or mixed hydroxy and acid ester segment selected so that DHA and DAH combine to be linked by an ester functionality, PH combines with the terminal group of the DHA-DAH sequence to form an ester functionality and n is about 1–20. It is to be understood that various combinations of reactants can be used to obtain the ester functionality such as the reaction of an acid with a hydroxy group and that such combinations are considered as equivalents to the above described sequence.

Preparation of the bis-hydroquinone ester of isophthalic acid (HQ/IPA/HQ) and a polycarbonate (PC) oligomer are described in the attached experimental procedures. The aromatic ester oligomers were designed to provide strength, stiffness (high modulus) and temperature resistance. The polycarbonate oligomers were designed to provide strength and broad temperature range toughness. The differential scanning calorimetry (DSC) melting points of the oligomers are summarized in Table 1.

To further moderate flexibility and toughness, especially at low temperature, low melting aliphatic polyester polyols were utilized. Finally crosslinking was introduced by selective incorporation of aromatic triisocyanates or aliphatic triols. The latter would function by providing internal aromatic triisocyanate production. The aromatic urethane crosslinks were designed to provide enhanced strength, resistance to creep under stress and solvent/chemical resistance. Yet at elevated temperatures, these bonds reverse allowing the composition to be more readily melt processed. Overall compositions with relatively low melt viscosity at high temperature (e.g., 50–1,000 Pa.s (500–10,000 poise) at 200° C.) and excellent or superior strength, toughness and solvent resistance at lower temperatures (from about –40° C. to about 120° C.) are provided.

These polymers are useful as hot melt adhesives, coatings, melt processible polymers for part fabrication (injection, transfer, other thermoplastic processes), composite fabrication by melt impregnation, prepregging followed by thermal forming, pultrusion, and so on.

Adhesive component materials and their equivalent weights are listed in Table 2. Adhesive samples were hand mixed by adding the polyol components to a 180 cc electrolytic (deep) beaker and melting/stirring under an argon flush using a Wood's metal bath set at 180° to 220° C. (Table 3). The preparation of composition C (Example 9) is described as an example for all preparations. The melt mixing was done at ~180° C. when no polycarbonate oligomer (Example 6, degree of polymerization (DP9), bisphenol A/phosgene oligomer with phenol end groups) was used. However, the mix had to be heated to ~210° C. to comelt the polycarbonate oligomer. A stainless steel spatula was used. Once comelted, all the polyol mixtures were clear, easily stirred melts.

The resulting melts were then cooled to about 100° C. and the isocyanate components added, then the mixture heated to higher temperatures, e.g., 150°–210° C. as needed, to provide a melt with acceptable viscosity. The amount of isocyanate was adjusted so that the equivalents of OH and NCO groups were essentially equal in each case. Hence high molecular weight mixed aliphatic-aromatic polyurethanes were formed on completion of reaction between the OH and NCO groups. An end capper (p-phenyl phenol) that is relatively nonvolatile (b.p. >300° C.) was added in the range of 0.1 to 0.05 equivalents to limit linear polyurethane molecular weight to ~100,000±50,000 and provide stabilized, nonfunctional polymer chain ends.

In some cases (Compositions A–E; Table 3), only linear polymers were expected since only difunctional polymer building units were used. In the remaining compositions (F–K), trifunctional aromatic isocyanates (CB75) or a triol (TMP) that results in in-situ aromatic triisocyanate formation were used. Hence these compositions are crosslinked below their melting points. Therefore the actual molecular weights depend on the purity and the degree of difunctionality of the difunctional components, the extent of end capping by p-phenyl phenol, the degree of crosslinking, and the degree of dissociation (or reversal) of the urethane bonds. The last two factors depend greatly on the temperature.

The thermal transitions for the compositions were determined by differential scanning calorimetry (DSC). These data are listed in Table 4. All the compositions have a second order (glass) transition temperature at ~44°–49° C. They show very broad melting transitions starting at temperatures ranging from as low as about 135° C. to about 181° C. They all show complete melting between about 192° C. and 227° C.

The compositions containing crosslinkers (samples F–K) show a moderate shift upward in initial melting point (~10°–25° C.). When a tin catalyst (dibutyl tin dilaurate, 0.1 weight percent) is added to a composition, a further modest increase in initial melting point (~30 degrees, composition H-b vs H-a) is observed. Clearly the compositions containing crosslinking groups are thermally reversed to the non-crosslinked state above their melting temperatures.

At ambient temperature, compositions A–E are readily soluble in N-methyl pyrrolidone (NMP). Composition F (1 equivalent percent isocyanate crosslinker) showed very slight evidence of crosslinking (very small amount of highly swollen gel in NMP). Compositions G-K (~10 equivalent percent isocyanate crosslinking groups) did not dissolve in NMP. Rather a slightly to moderately swollen gel was observed in NMP. Hence these compositions are rather thoroughly crosslinked at this temperature. The gels swelled considerably more upon heating to 100° C. but still did not dissolve. At ~120°–130° C., the gels began to break up and solubilize.

The dynamic (oscillatory) rheologic response of selected compositions was determined using the Rheometrics Dynamic Mechanical Spectrometer RMS 605 at a shear rate of 1 Hz/sec. The dynamic viscosity (R) or $\eta^*$ [Pa.s] (poise), the loss shear modulus G" [g/cm$^2$] (dyne/cm$^2$) and the storage modulus G' [g/cm$^2$] (dyne/cm$^2$) were determined as a function of temperature. The viscosity and storage shear modulus should be greater than about $10^e$ for useful physical strength to be observed. The viscosity should be less than about 1000 Pa.s (10,000 poise) for reasonable melt processibility. Hot melt adhesive application is best in the 0.5–50 Pa.s (5–500 poise) range. The most desirable viscosity will depend on several factors including, but not limited to, the method of hot melt application, the nature of the surfaces to be bonded, and their temperatures.

Composition H (actually H-a) and its replicate (J) exhibit these characteristics well and show excellent adhesive properties (described below). The rheometrics curves for H-a (FIG. 2) and H-b (FIG. 3; with a tin catalyst) were measured after about 10 minutes mixing at about 200°–210° C. Composition J (H-a replicate) was measured after mixing 25 and 75 minutes at 220° C. The rheometric plots are shown in FIGS. 1–5.

Figure 2:
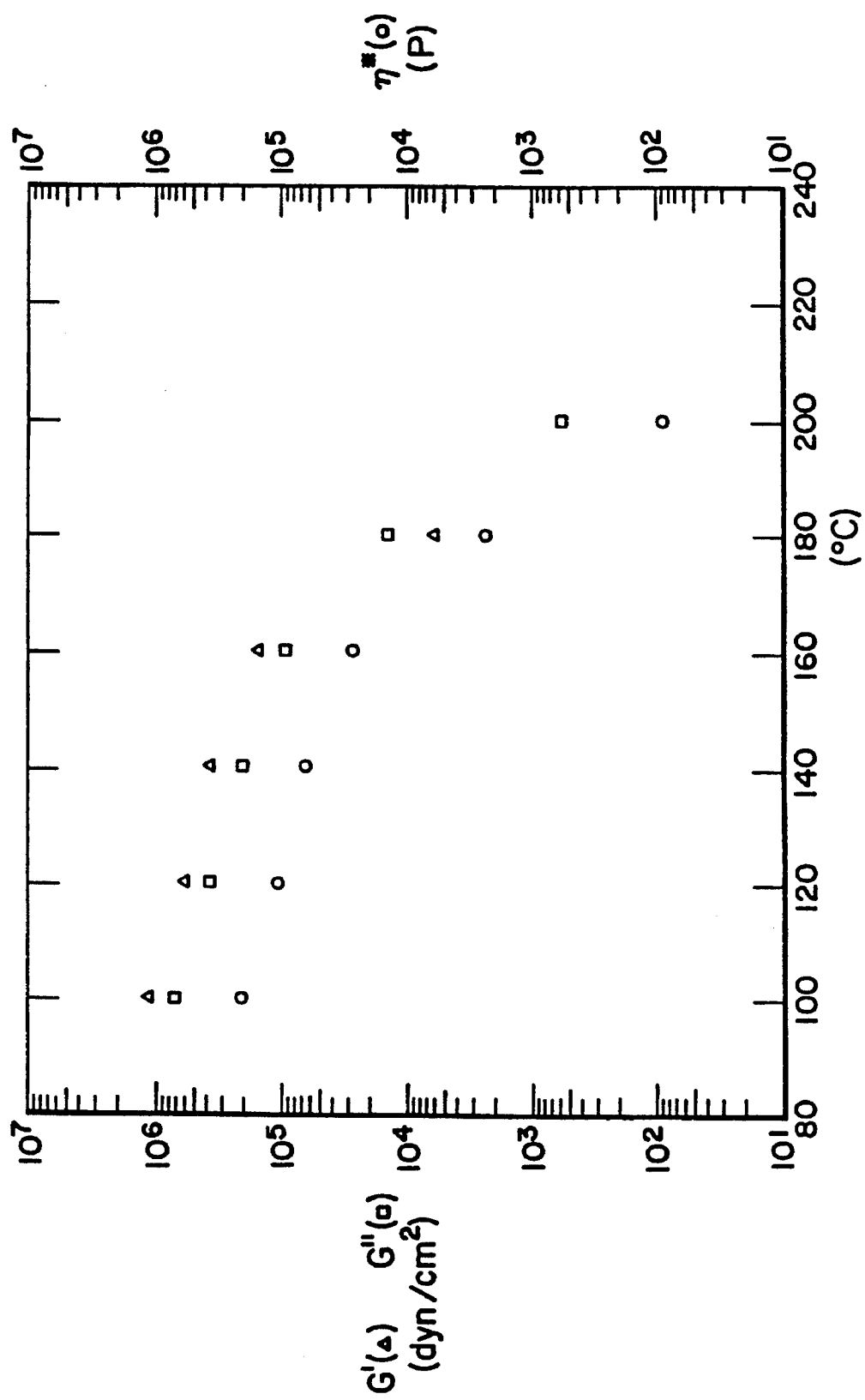
Figure 3:
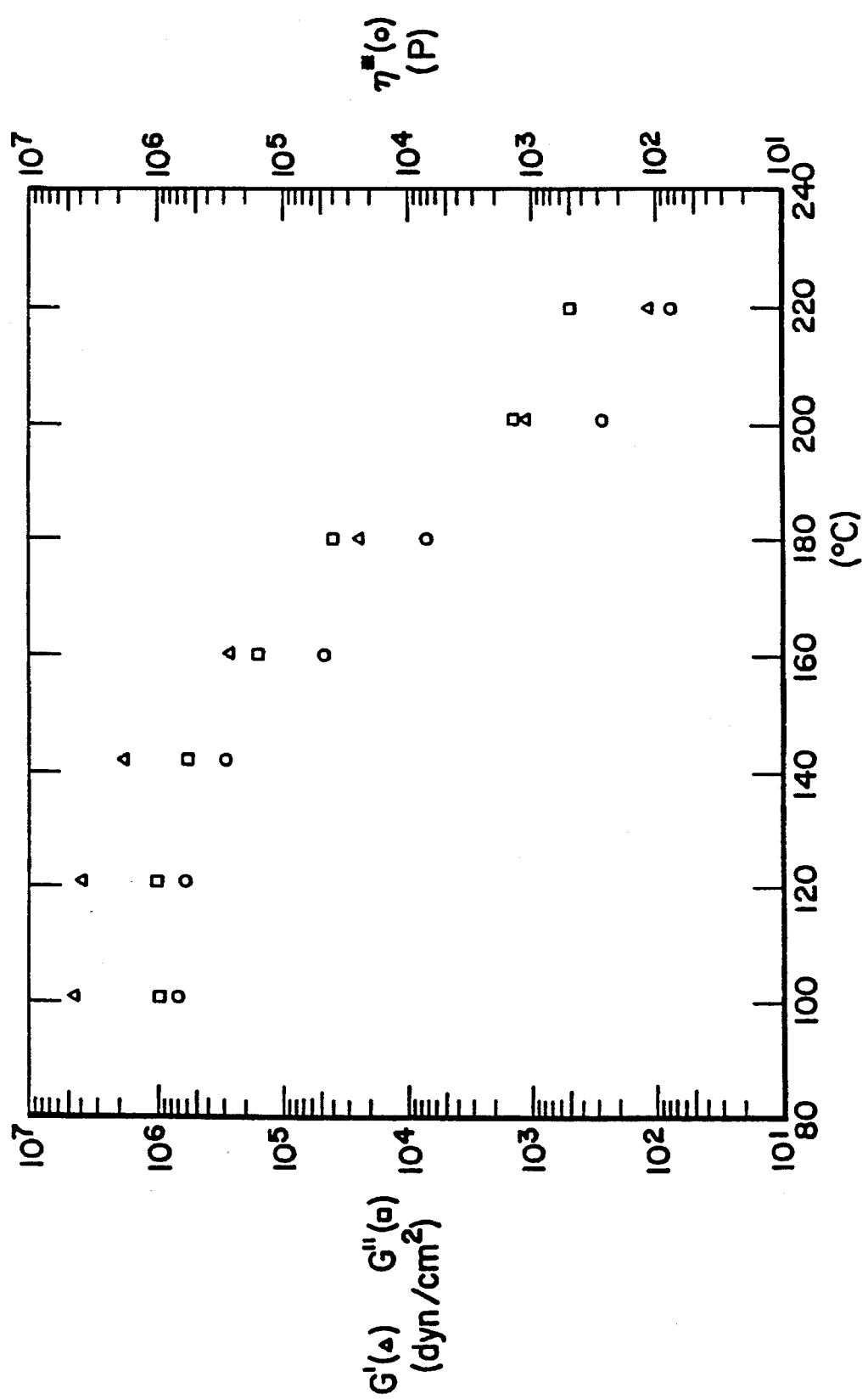
Figure 4:
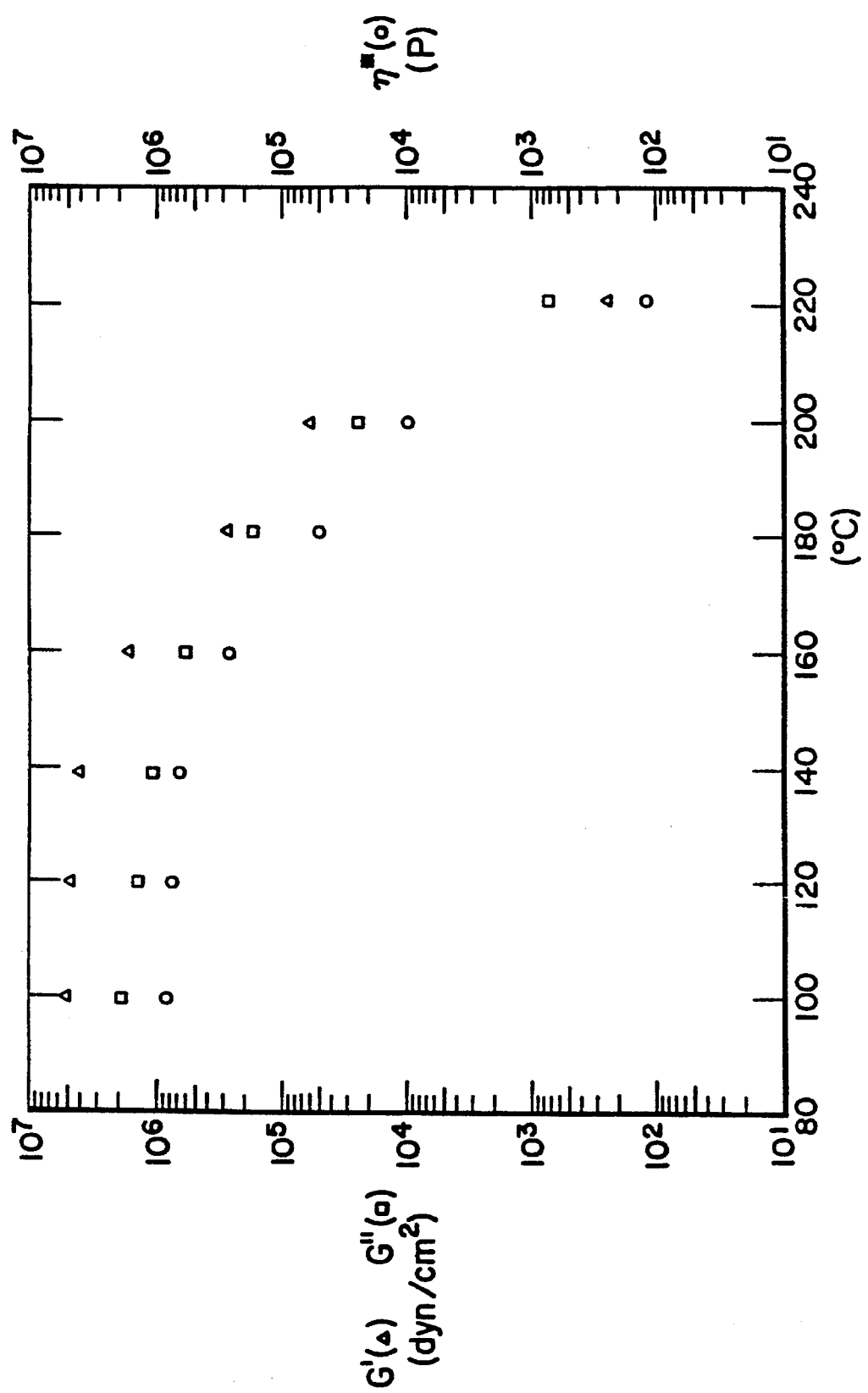
Figure 5:
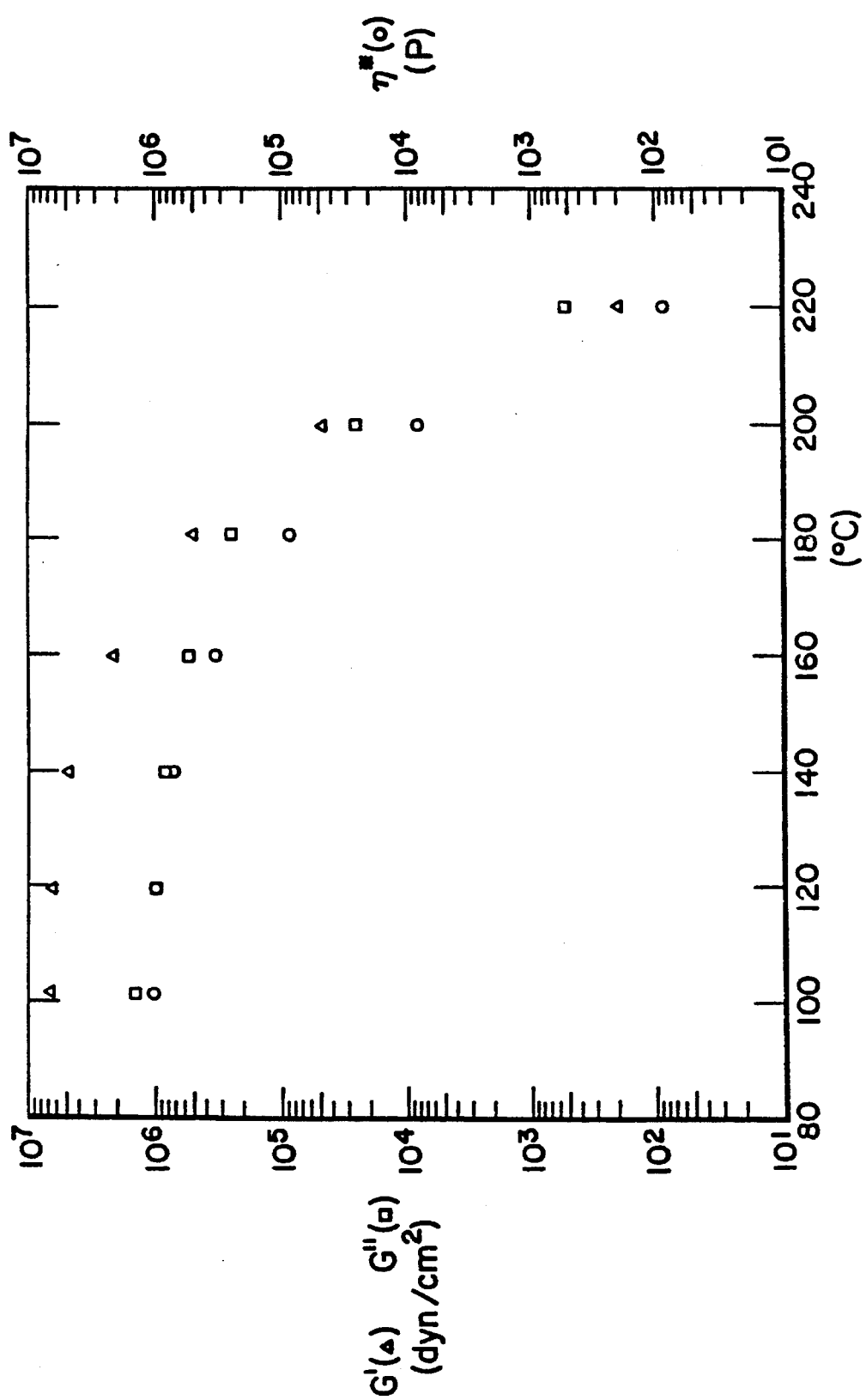

The compositions represented by H-a and J had a viscosity of about 200 Pa.s (2000 poise) at 180° C. and 9 Pa.s (90 poise) at 200° C. after 15 minutes (FIG. 2). This increased to about 1000 Pa.s (10,000 poise) at 200° C. (10 Pa.s; 100 poise at 220° C.) after 25 minutes (FIG. 4). It was measured as 800 Pa.s (8,000 poise) at 200° C. (9 Pa.s; 90 poise at 220° C.) after 75 minutes (FIG. 5). Hence it was essentially unchanged between 25 and 75 minutes. Composition H-b showed greater viscosity at 10–15 minutes than H-a but less than J at 25 minutes. The shape of the curve indicates that the tin catalyst serves to speed up the thermal process but not change it. It is believed that the leveling off of the dynamic rheological parameter between 25–75 minutes indicates that equilibrium molecular weight for 210°–220° C. is reached and maintained. Hence a reproducible viscosity processing characteristic composition is obtained during this period.

Composition H-a was also measured by dynamic oscillatory mechanical spectrometry from −50° C. to 100° C. (FIG. 1) as well as from 100° C. to 200° C. (FIG. 2). The storage shear modulus (G") decreased rather sharply (from ~3×10$^5$ to 1×10$^5$ g/cm$^2$ (~3×10$^8$ to 1×10$^8$ dyne/cm$^2$)) over the temperature range from about −15° C. to about 3° C. (transition range, centered at about 6° C.). It then decreased quite slowly (semi-plateaued) to about 60° C. It then showed a sharper decrease or transition (from about 5×10$^4$ (5×10$^7$) to about 1.5×10$^3$ g/cm$^2$ (1.5×10$^6$ dyne/cm$^2$)) over the 60°–80° C. range. It then decreased slowly again (semi-plateaued) from about 1.5×10$^3$ (1.5×10$^6$) to 4×10$^2$ g/cm$^2$ (4×10$^5$ dyne/cm$^2$)) over the temperature range from about 80° C. to about 130°–140° C. It then began to decrease more rapidly to a very low value or near zero by 200° C.

The behavior of both the storage and the loss shear modulus from −50° to 60° C. is indicative of a very tough, resilient composition. Values in the range of 10$^8$–10$^9$ dyne/cm$^2$ for the storage shear modulus are considered very good for mechanical performance (e.g. an adhesive under load), especially in resistance to cracking during thermal cycling or under high strain rate loading. This is especially important over this lower temperature range. This is believed to be related to either the covalent urethane crosslinking or to the polycarbonate component, or to a combination of these factors. The transition at about 60° C. may be related to a softening temperature of the polycaprolactone component. The second, more rapid, decrease in storage shear modulus, from 130°–140° C. to 200° C. appears to be related to the reversal of the aromatic urethane bonds, especially those forming the crosslinked network.

Figure 1:
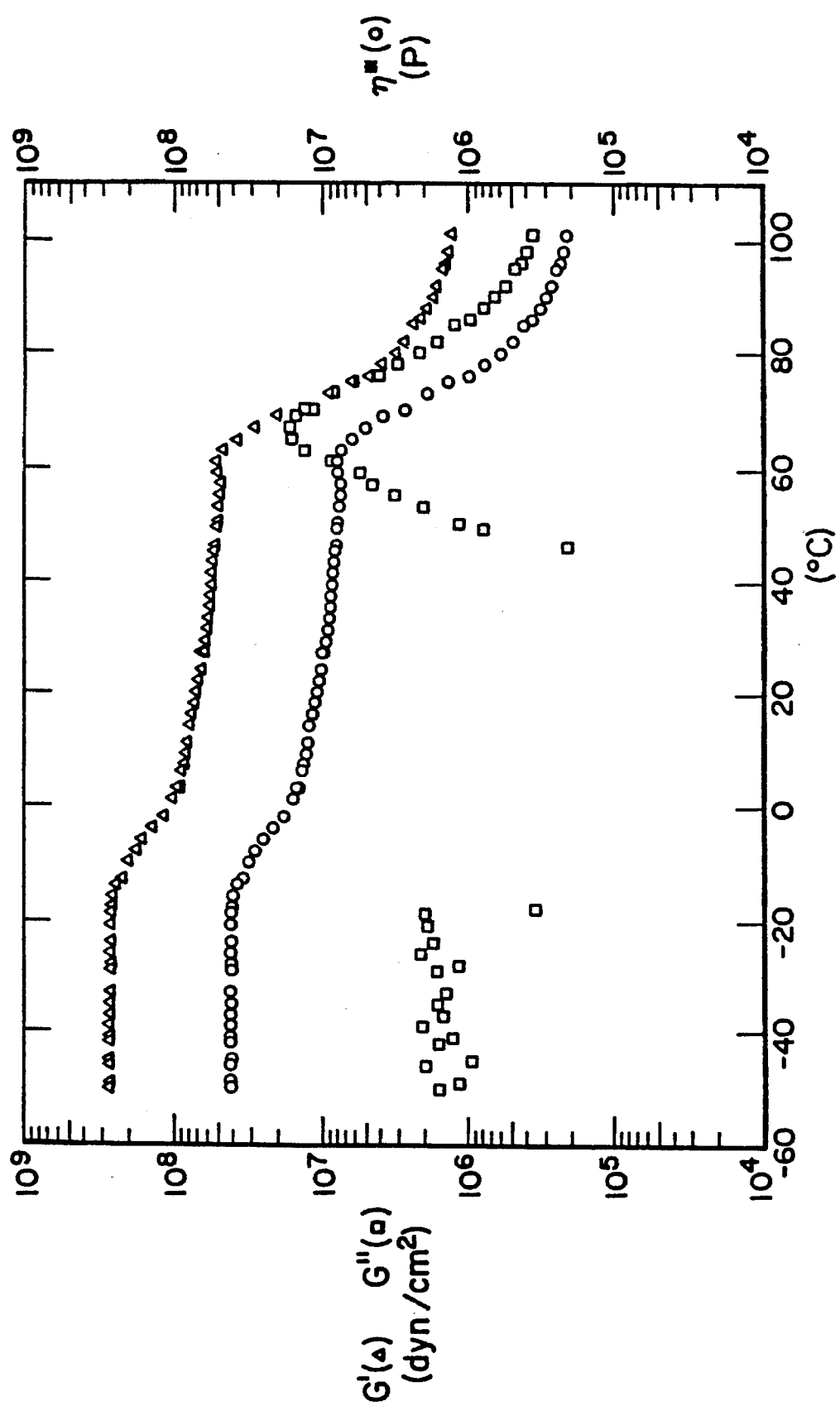
FIGS. 1–5 are Rheometric plots of the dynamic viscosity $\eta^*$, in poise (Pa.s), the storage shear modulus G', and the loss shear modulus G" determined as a function of temperature (oscillation mode) using a Rheometrics Dynamic Mechanical Spectrometer RMS 605.

The storage shear modulus values for composition J, after 25 minutes and 75 minutes of heating at 200°–210° C. (FIGS. 4 and 5) show a second plateau from 100° to 140° C. much better, and at somewhat higher level (~7–5×10$^3$ g/cm$^2$; ~7–5×10$^6$ dyne/cm$^2$) than is seen in composition H-a (FIG. 1). These data indicate some additional reaction, i.e. urethane bond formation, may have occurred upon further heating. They more clearly indicate possible urethane bond reversal, in particular the crosslinking bonds, above about 140° C.

The tensile lap shear strengths for the compositions are given in Table 5. The compositions based on the aromatic polyester oligomer HQ/IPA/HQ and the polycaprolactone diol (PCP 530) showed good room temperature strength, $1.21$–$1.52\times10^7$ Pa (1800–2200 psi). Composition C was sufficiently strong and adherent to result in some bending of the metal tab end as the adhesive sample was broken with cohesive failure. The composition based on the polycarbonate diol (PC) provided higher strength, $1.90\times10^7$ Pa (2760 psi) and considerably enhanced elongation or ductility. The adhesive samples extended about 40–50 percent before failure and the steel pieces were bent appreciably by bond failure. Bond failure was cohesive.

Hybrid compositions (D,E) containing about 8 weight percent of the diol as PC and 32 weight percent as the aromatic ester oligomer (HQ/IPA/HQ) or 40 weight percent of the diols as combined aromatic polyester and polycarbonate, showed enhanced room temperature strength, $1.93\times10^7$ Pa (~2800 psi) and very good elongation or ductility (about 30 percent sample extension before failure). Again cohesive failure occurred and considerable steel bending was observed.

Compositions in which the TDI/TMP based crosslinker CB75 was used in addition to the hybrid aromatic polyester/polycarbonate combination, showed intermediate but very good strength, $1.62$–$1.64\times10^7$ Pa (2350–2378 psi). Elongation (ductility) was intermediate between compositions C and D, and E.

Composition H (and its replicate J) showed the highest lap shear strength of, $2.07$–$2.21\times10^7$ Pa (3000–3200 psi), the extensibility or ductility of these bonds was again intermediate between C and D, and E. Composition K was a repeat of J with NDI in place of MDI. A somewhat lower strength (2200) and slightly lesser ductility was observed than for K.

Compositions H and J were then tested at $-35°\pm5°$ C., $120°$ C. and $130°$ C. For comparison, commercial hot melt adhesives PE6300HM and Unirez 2643, known to show good strength from $-40°$ C. to moderately high temperatures (~$100°$ C.) were also tested. The preparation and testing of the specimens is summarized above and in Table 3.

Composition J (MDI-based) showed excellent low temperature adhesive strength, $2.08\times10^7$ Pa (3023 psi). It lost no strength and in fact was somewhat stronger at $-35°\pm5°$ C. than at $23°$ C. It was stronger than, and also more extensible (ductile) than, the commercial polyester hot melt. Composition K (NDI-based) was not quite as strong as J or the commercial adhesives at $-35°\pm5°$ C. but still had fairly good strength.

Both experimental adhesives were clearly superior to the commercial adhesives at $120°$ C. The NDI-based adhesive is clearly better than the MDI-based adhesive at higher temperatures. It still showed $4.44\times10^6$ Pa (644 psi) at $130°$ C., while adhesive J was too weak to test at this temperature.

Hence these new adhesives based on hybrid compositions of aromatic polyester/aromatic polycarbonate diols, combined with an aliphatic polyester diol, and aromatic isocyanates, show a remarkable broad range of useful adhesive properties in this structural strength range.

TABLE 1

DIFFERENTIAL SCANNING CALORIMETRY[a]
OLIGOMER MELTING RANGE

| Example | Oligomer Structure[b,c] | DSC Melting, °C. |
|---|---|---|
| 7 | HQDA/IPA/HQDA | 156–161 |
| 5 | HQ/IPA/HQ | 220–225 |
| 8 | PHBA/HQ/IPA/HQ/PHBA | 298–312 |
| 6 | BPA-C(BPA-C)$_9$-BPA | 198–215 ($T_g$ 101) |

[a]Perkin Elmer 7 Series Thermal Analyzer, 10° C./minute, 7–8 mg sample
[b]Acronyms for components reacted together to produce the oligomer are used to depict the oligomer structure:
HQDA = hydroquinone diacetate
HQ = hydroquinone, IPA = isophthalic acid, TPA = terephthalic acid
PHBA = para hydroxybenzoic acid
BPA = bisphenol A (4,4'-isopropylidenediphenol)
C = carbonate derived from phosgene (P)
[c]Structures of Examples 5, 7 and 8 are all phenolic hydroxyl terminated aromatic ester oligomers based on the above (acronym) summarized structures. Example 9 is a bisphenol A phenolic hydroxyl terminated oligomer with a degree of polymerization (DP) of 9 (based on 10/9 BPA/P mole ratio).

TABLE 2

ADHESIVE COMPONENT EQUIVALENT WEIGHTS

| Component[a] | Equivalent Weight | |
|---|---|---|
| | OH | NCO |
| PCP530 | 265 | — |
| HQ/IPA/HQ | 174.2 | — |
| PP | 170.2 | — |
| TMP | 44.7 | — |
| PC | 1258. | — |
| CB75 | — | 323 |
| MDI | — | 125.1 |
| NDI | — | 105.1 |

[a]For definition of components, see Table 3.

TABLE 3

HOT MELT ADHESIVE COMPOSITIONS AND LAP SHEAR STRENGTH[a]

| Composition Number | PCP530[b] | HQ/IPA/HQ[c] | PPP[d] | PC[e] | CB75[f] | TMP[g] | MDI[h] | NDI[i] | Lap Shear Strength[j] lb/in$^2$ (Pa × 10$^7$) |
|---|---|---|---|---|---|---|---|---|---|
| A | 3.315 | 2.134 | 0.0425 | — | — | — | — | 2.645 | 1820(1.25) |
| B | 5.660 | — | 0.0425 | 4.330 | — | — | 3.140 | — | 2760(1.90) |
| C | 3.315 | 2.129 | 0.0425 | — | — | — | 3.140 | — | 2288(1.58) |
| D | 3.207 | 1.696 | 0.0360 | 0.433 | — | — | 2.814 | — | 2800(1.93) |
| E | 3.207 | 1.696 | 0.0360 | 0.433 | — | — | 2.802 | — | 2790(1.92) |
| F | 3.280 | 1.696 | 0.0360 | 0.433 | 0.073 | — | 2.802 | — | 2575(1.78) |
| G | 3.280 | 1.696 | 0.0360 | 0.433 | 0.786 | — | 2.560 | — | 2350(1.62) |
| H | 3.280 | 1.696 | 0.0180 | 0.580 | — | 0.101 | 3.116 | — | 3200(2.21) |
| I | 3.280 | 1.148 | 0.0180 | 4.540 | — | 0.101 | 3.116 | — | 2820(1.94) |
| J | 3.280 | 1.696 | 0.0180 | 0.580 | — | 0.101 | 3.116 | — | 3007(2.07) |
| K | 3.280 | 1.696 | 0.0180 | 0.580 | — | 0.101 | — | 2.617 | 2203(1.52) |

TABLE 3-continued

HOT MELT ADHESIVE COMPOSITIONS AND LAP SHEAR STRENGTH[a]

| Composition Number | PCP530[b] | HQ/IPA/HQ[c] | PPP[d] | PC[e] | CB75[f] | TMP[g] | MDI[h] | NDI[i] | Lap Shear Strength[j] lb/in² (Pa × 10⁷) |
|---|---|---|---|---|---|---|---|---|---|

[a]All components in g. Equal equivalent amounts of hydroxyl and isocyanate groups used in each composition. Compositions prepared by hand melt blending of diol/polyol/aromatic polyphenol components under an argon blanket, followed by addition of the aromatic di- or trisocyanates. The preparation of composition C in described in Example 9.
[b]PCP 530 = polycaprolactone diol, hydroxy equivalent weight 265
[c]HQ/IPA/HQ = bishydroquinone diester of isophthalic acid, preparation described in Example 5, hydroxy equivalent weight 174.2.
[d]PPP = 4-phenylphenol (p-phenylphenol), hydroxy equivalent weight 170.2
[e]PC = polycarbonate based on bisphenol A and phosgene, with phenolic hydroxyl and groups and a degree of polymerization of approximately 9. Preparation described in Example 6, hydroxy equivalent weight 1258.
[f]CB75 = Mondur CB75 triisocyanate crosslinker, isocyanate equivalent weight 323 (Mobay, based on trimethylolpropane reacted with 3 moles of toluene dissocyanate, TDI, to give an aromatic triisocyanate with ortho methyl groups adjacent to each isocyanate).
[g]TMP = trimethylolpropane, hydroxy equivalent weight 44.7 (reacts in-situ with MDI to provide an aromatic triisocyanate crosslinker).
[h]MDI = (4,4' diphenylmethane diisocyanate, isocyanate equivalent weight 125.1, Dow Isonate 125M).
[i]NDI = (1,5 - naphthalene diisocyanate, isocyanate equivalent weight 105.1, Mobay Desmodur 15).
[j]Lap shear strength. Test samples assembled from 1 in × 3 in (2.54 × 7.62 cm) steel coupons (R-13) from Q panel Inc, Cleveland, Ohio. Tensile test in Instron Floor Model TTE. Results are average values for three adhesive test specimens. Hot melt composition (180–210° C.) hand applied to 1.0 × 0.5 in (2.54 × 1.27 cm) area of preheated (~180–200° C.) steel coupon. Coupons firmly pressed together and excess adhesive (exudate) scraped away. Assembled test samples then clamped together with two one-half inch (1.27 cm), spring loaded, IDL binder clips. Heat quickly (~1 min) to ~200° C. in air oven then cool to ambient. Condition at 23° C., 50 percent relative humidity for 24 hours before testing.

TABLE 4

THERMAL CHARACTERIZATION OF HOT MELT ADHESIVE COMPOSITIONS

| Composition Number | DSC[a] | |
|---|---|---|
| | $T_g$ | $T_m$ |
| C | 46 | 144–220 |
| D | 44 | 144–220 |
| E | — | 140–227 |
| F | 44 | 155–222 |
| G | | 165–215 |
| H-a[b] | 46 | 150–209 |
| H-b[c] | 48 | 181–202 |
| I | 49 | 135–193 |
| J | 50 | 150–215 |
| K | 43 | 160–203 |

[a]Perkin Elmer 7 Series Thermal Analyzer, 7–8 mg sample, 10° C./min. Compositions measured after about 10 minutes at 200–210° C.
[b]Composition H as mixed.
[c]A portion of composition H removed immediately after mixing 1–2 minutes and 0.1 parts by weight dibutyl tin dilaurate catalyst added, then heated another ~10 min. This shifts the melting point up about 30° C.

TABLE 5

LAP SHEAR STRENGTH[a]

| Sample Number | Description | Test Temp. °C.[b] | Maximum Load, lbs[c] (N × 10³) | Lap Shear Strength, psi (Pa × 10⁷) |
|---|---|---|---|---|
| Unirez 2643[d] | Commercial Polyamide | −35 ± 5 | 560 (2.49) | 1120 (0.772) |
| | | | 560 (2.49) | 1120 (0.772) |
| | | | 600 (2.67) | 1200 (0.827) |
| PE6300HM[e] | Commercial Polyester | −35 ± 5 | 573 (2.55) | 1147 (0.791) |
| | | | 1025 (4.56) | 2050 (1.41) |
| | | | 1060 (4.72) | 2120 (1.46) |
| | | | 1150 (5.12) | 2300 (1.59) |
| J[f] | (IPA/HQ)/PC/ PCL/TMP + MDI | −35 ± 5 | 1078 (4.80) | 2157 (1.49) |
| | | | 1875 (8.34) | 3750 (2.59) |
| | | | 2060 (9.16) | 4120 (2.84) |
| | | | 600 (2.67) | 1200 (0.827) |
| K[g] | (IPA/HQ)/PC/ PLC/TMP + NDI | −35 ± 5 | 1511 (6.72) | 3023 (2.08) |
| | | | 300 (1.33) | 600 (0.414) |
| | | | 400 (1.78) | 800 (0.552) |
| | | | 275 (1.22) | 550 (0.379) |

TABLE 5-continued

LAP SHEAR STRENGTH[a]

| Sample Number | Description | Test Temp. °C.[b] | Maximum Load, lbs[c] (N × 10³) | Lap Shear Strength, psi (Pa × 10⁷) |
|---|---|---|---|---|
| Unirez 2643 | Commercial Polyamide | 23 | 325 (1.45)<br>725 (3.22)<br>700 (3.11)<br>750 (3.34) | 650 (0.448)<br>1450 (1.00)<br>1400 (0.965)<br>1500 (1.03) |
| PE6300HM | Commercial Polyester | 23 | 725 (3.22)<br>650 (2.89)<br>775 (3.45)<br>565 (2.51) | 1450 (1.00)<br>1300 (0.896)<br>1550 (1.07)<br>1130 (0.779) |
| J[f] | See above | 23 | 663 (2.95)<br>1500 (6.67)<br>1700 (7.56)<br>1300 (5.78) | 1326 (0.914)<br>3000 (2.07)<br>3400 (2.34)<br>2620 (1.81) |
| K[g] | See above | 23 | 1503 (6.69)<br>975 (4.34)<br>1500 (6.67)<br>837 (3.72) | 3007 (2.07)<br>1950 (1.34)<br>3000 (2.07)<br>1660 (1.14) |
| Unirez 2643 | Commercial | 120 | 1102 (4.90)<br>3 (0.0133)<br>7 (0.0311)<br>4 (0.0178) | 2203 (1.52)<br>6 (0.00414)<br>14 (0.00965)<br>8 (0.00552) |
| PE6300HM | Commercial | 120 | 4.6 (0.0205)<br>6 (0.0267)<br>4 (0.0178)<br>10 (0.0445) | 9.3 (0.00641)<br>12 (0.00827)<br>8 (0.00552)<br>20 (0.0138) |
| J[f] | See above | 120 | 6.7 (0.0298)<br>280 (1.25)<br>130 (0.578)<br>155 (0.689) | 13.3 (0.00917)<br>560 (0.386)<br>260 (0.179)<br>310 (0.214) |
| K[g] | See above | 120 | 188 (0.836)<br>775 (3.45)<br>575 (2.56)<br>500 (2.22) | 377 (0.260)<br>1550 (1.07)<br>1150 (0.793)<br>1000 (0.689) |
| K[g] | See above | 130 | 617 (2.74)<br>400 (1.78)<br>315 (1.40)<br>250 (1.11) | 1234 (0.851)<br>800 (0.552)<br>630 (0.434)<br>500 (0.345) |
| | | | 322 (1.43) | 644 (0.444) |

[a]Adhesive samples prepared using 1 × 3 in. (2.54 × 7.62 cm) steel coupons (R-13, Q Panel Inc., Cleveland, Ohio). Hot melt composition (~200° C.) applied to 1.0 × 0.5 in. (2.54 × 1.27 cm) area of preheated (~150–200° C.) steel coupon. Clamped with small springline clamps and allowed to cool slowly. Conditioned at 23° C. for 24 hours then at test temperature for ten minutes prior to testing.
[b]Tested with Instron Floor Model TTE Cold (−35 ± 5° C.) test specimens prechilled in −40° C. isopropanol (chilled with dry ice and tested immediately). Heated samples (120° C., 130° C.) tested in Instron temperature control cabinet after equilibrating 10 min. All samples tested at 0.2 in/min (0.51 cm/min) have separation rate to break. Maximum load at break for three samples per test set and the mean value are listed (0.5 in² (3.23 cm²) area).
[c]Cold (−35 ± 5° C.) test specimens prechilled.
[d]Union Camp commercial polyamide hot melt adhesive.
[e]H. B. Fuller commercial polyester hot melt adhesive.
[f]Aromatic/aliphatic polyester-polycarbonate diols plus 10 equivalent percent trimethylol-propane (TMP) crosslinker, and 0.05 equivalent percent p-phenyl (PPP) for end capping groups, reacted with diphenyl methane diisocyate (MDI) in nearly 1/1 equivalent ratio of aliphatic and aromatic (phenol) hydroxyl/isocyanate groups. IPA/HQ = bis-hydroquinone/isophthalic acid diester diol, PC = hydroxyl (phenol) capped bisphenonal A/phosgene polycarbonate oligomer with degree of polyermization = 9, PCL = PCP530 (polycaprolactone diol, MW 530).
[g]Aromatic/aliphatic polyester - polycarbonate diols, plus 10 equivalent percent trimethylolpropane (TMP) crosslinker, and 0.05 equivalent percent p-phenylphenol (PPP) for end capping groups, reacted with 1,5-naphthalene diisocyanate, or NDI, in nearly 1/1 equivalent ratio of aliphatic and aromatic (phenol) hydroxyl/isocyanate groups, same polyester and polycarbonate diol oligomers as in adhesive J.

The following examples are disclosed to further teach the practice of the invention and are not intended to limit the invention as it is delineated in the claims.

EXAMPLE 1

To a clean flame-dried 250 ml Pyrex round-bottom flask was added 5.2 g (0.040 eq) Isonate 143L (80% diphenylmethane diisocyanate and 20% of its triisocyanate cycloadduct) from Upjohn's polymer chemicals and 3.8 g (0.040 eq) of phenol. The flask contents were gradually heated in an oil bath to 160° C. under argon to obtain a uniform melt. Molten Niax polyol PCP-0200 (5.3 g, 0.020 eq) was gradually blended into the melt and the flask temperature maintained at 156° C. during the addition. A yellow-white precipitate was noted after the addition which gradually remelted as the temperature was increased to 165° C. Then 2.35 g (0.020 eq) of bisphenol A was melt blended into the melt. The temperature of the mixture was gradually increased to 240° C. (464° F.) to drive the equilibrium of the phenol/bisphenol A reaction in favor of reacting with bisphenol A and thus distilling off phenol. During this increase in temperature the melt became an orange-gold viscous liquid and most probably a prepolymer. In this way 2.0 g of phenol was distilled from the prepolymer melt over a 20 minute period. The product was a clear viscous melt which solidified when cooled to an insoluble, tough plastic with good adhesion to steel.

EXAMPLE 2

Example 2 was done in the same manner as Example 1, using Niax polyol PCP-0260 (30.0 g, 0.020 eq) instead of PCP-0200. No precipitate was noted during this procedure. The resulting hot melt of this experiment qualitatively seemed to produce better bonding properties than the product of Example 1. This is most likely due to an increase in the molecular weight of the polycaprolactone diol used and thus an increase in the strength and toughness of the crosslinked polyurethanepolyester product.

Examples 1 and 2 were carried out using Upjohn's polyisocyanate Isonate 143L (80% diphenylmethane diisocyanate and 20% of its triisocyanate cycloadduct) and Union Carbide's Niax polyols PCP-0200 and PCP-0260 (polycaprolactone diols of varying DP). These proved quite successful. Initially, two equivalents of the Isonate 143 L were blocked with two equivalents of phenol at 160° C. to protect the isocyanate groups against hydrolysis. The phenol could then be selectively removed as needed by reaction with the aliphatic polydiols or by equilibration with polyphenols. Thus, molten PCP-0200 (Example 1) or PCP-0260 (Example 2) were gradually added to the blocked Isonate 143L/phenol product and the temperature maintained at 160° C. Then with stirring, one equivalent of bisphenol A (relative to the aromatic phenol urethane groups) was added and the temperature of the mixture was gradually increased to about 240° C. to drive the equilibrium of the phenol/bisphenol A reaction in favor of reacting with bisphenol A and removing phenol by distillation. The removal of nearly one equivalent of phenol in Examples 1 and 2 produced a bisphenol A extended, phenol end-capped Isonate 143L-PCP polyesterpolyurethane block copolymer.

EXAMPLE 3

The resulting melts of Examples 1 and 2 were tee];ed as reactive hot melt adhesives by application to pairs of steel coupons. The melts were observed to have instant tack to steel and aluminum substrates and developed qualitatively good adhesive and cohesive strengths as they cooled and resolidified. However, it was qualitatively easier, using the hand assembly procedure, to obtain good flow-out to a thin adhesive layer of the molten adhesive between the pieces of metal, if the metal was preheated to about 50°–60° C. Consequently, the test adhesives were applied to approximately 6.4 cm$^2$ (1 in.$^2$) overlapping areas of trichloroethane degreased 2.5×12.7 cm (1 in.×5 in.) steel coupons cut from Q-panels and previously heated on a hot plate to about 60° C. The coupons were overlapped with slight pressure for 10 seconds and allowed to cool to room temperature. A very strong (qualitative) bond resulted. The bond was still strong and unchanged after 40 days at room temperature and moisture.

EXAMPLE 4

Retained samples of the neat polymer product from Examples 1 and 2 exposed to room air and moisture for 40 days remained tough and pliable. Small (0.2–0.4 g) samples gave a free-flowing, moderate viscosity, liquid at 204° C. (400° F.). This product swelled (several volumes) but did not dissolve in methyl cellosolve acetate or trichloroethylene at room temperature. These results show that the adhesive is still crosslinked, strong, and tough at room temperature, but readily depolymerized to uncrosslinked, relatively low molecular weight fragments at about 204° C. (400° F.).

EXAMPLE 5

Preparation of Bis-Hydroquinone Ester of Isophthalic Acid

Two hundred fifty ml of dry (H$_2$O<0.001%) dimethyl acetamide (DMAC; Dimethylacetamide; Aldrich 21,707-2) and 43.5 g (44.5 cc; 0.525 moles) dry (over CaH$_2$) pyridine (Aldrich 36,057-0) were added to a flame dried 2 liter, 3 neck round bottom flask equipped with a Trubore stirrer (Teflon paddle), inert gas (argon) inlet and outlet, thermometer, and stoppered pressure equalizing addition funnel. While stirring slowly with an argon flush, vacuum dried (60° C., 24 hr, 0.5 Torr) crystalline hydroquinone (99%; Aldrich 1,790-2; 220.2 g; 2.00 mole) was added slowly enough to prevent clumping. The isophthaloyl chloride (IPC; Aldrich 36,0570-0 as received; 50.8 g; 0.250 moles) was dissolved separately in 300 ml additional dry dimethyl acetamide in a flame dried 500 ml round bottom flask, also under argon flushing. The IPC/DMAC was gently heated on a heating mantle while hand slurrying to dissolve. The clear light yellow solution was then placed in the dropping funnel and added to the rapidly stirred HQ solution over a 45 minute period. The temperature quickly rose to about 55° C. then stabilized until the IPC addition was complete. There was no precipitate (pyridine hydrochloride) at this point. A small aliquot of this solution when cooled to –5° C. exhibited crystallization of water soluble pyridine hydrochloride. However, the entire reaction mixture was precipitated in 4 liters of distilled water. Surprisingly, this provided insoluble product diester and solubilized the unreacted HQ and the pyridine hydrochloride. The light yellow precipitate was easily filtered using a 25–50 μm fritted glass Buchner funnel and aspirator vacuum. It was washed thoroughly with distilled water, air dried overnight in a thin layer in a pyrex baking dish, then vacuum dried to provide 69 g of light yellow, powdery solid with a Fisher-Johns hot stage melting point of 221°–222° C. This was a 79 percent recovery based on a theoretical yield of 87.6 g of the bis-hydroquinone ester of isophthalic acid. DSC thermal analysis (7.5 mg, Perkin Elmer 7 Series Thermal Analyzer, 10° C./min) showed a melting exotherm at 220°–225° C. The proton NMR spectrum was determined using a Brucker high resolution NMR.

There are 14 total proton assignments, with 2 phenolic protons (14.8 percent theoretical). Found were 12.90 percent phenolic protons at δ 9.50 (ppm). This was in good agreement with the expected total.

EXAMPLE 6

Preparation of Phenolic-hydroxyl Terminated Bisphenol A/Phosgene Polycarbonate Oligomers The 4,4'-isopropylidenediphenol (Bisphenol A)(BPA; Aldrich 13,302-7, 99.4%; 45.3 g, 0.2000 mole; vacuum dried at 60° C., 0.2 Torr for 4 hours) was added to a flame dried, argon purged, 300 ml, 3 neck round bottom pyrex flask fitted with an inert (argon) gas inlet and outlet, flame dried dropping funnel and Trubore stirrer with Teflon blade. Ninety ml of dry methylene chloride ($CH_2Cl_2$; Burdick and Jackson 300-4, dried over $CaH_2$) followed by 52.0 ml dry triethylamine (Aldrich 13,206-3; dried over $CaH_2$; 0.187 mole) were added through the dropping funnel. The dropping funnel was rinsed with 10 ml more $CH_2Cl_2$. The BPA was dissolved by stirring slowly for 30 minutes at room temperature. A slight positive argon pressure was maintained (1 bubble of gas per 2 or 3 seconds through a mineral oil filled gas outlet bubble tube). A 50 cc hypodermic syringe was predried (disassembled, 1 hour in air oven at 110° C.) and cooled to room temperature in a desiccator containing Drierite. It was reassembled and rinsed and conditioned with some phosgene in toluene, which was ejected and discarded. The syringe was loaded and 50 cc phosgene solution (Fluka 79380, 20% in toluene; 1.93 molar, 2% HCl impurity) was delivered to the dropping funnel. The syringe was loaded again and an additional 43.3 cc of the phosgene solution delivered for a total of 93.3 cc (17.8 g, 0.180 mole). Twenty-five ml of $CH_2Cl_2$ was layered on the phosgene solution and then added with rapid dropwise addition to the rapidly stirred hisphenol A solution. A precipitate appeared after about 7 ml of the phosgene solution was added. As the addition continued, the reaction mixture began to heat up. The flask was cooled with a water/ice bath to keep it near room temperature. All phosgene solution was added after about 33 minutes. The dropping funnel was rinsed into the reaction flask with an additional 25 ml $CH_2Cl_2$. The reaction mixture was a slightly viscous moderately thick slurry. It was left stirring slowly overnight at room temperature. The slurry appeared unchanged the next morning. It was easily filtered through a "C" fritted glass Buchner funnel providing a clear light yellow solution and a fine white precipitate. The precipitate was washed three times with ~50 ml portions of $CH_2Cl_2$ and air dried. Obtained were 36.7 g water soluble white powder (72 percent recovery based on theoretical pyridine hydrochloride yield of 50.9 g). The missing salt was presumed dissolved in the oligomer solution.

The polycarbonate oligomer solution was concentrated to ~200 ml and precipitated in a ten fold excess (~2 liters) of reagent grade methanol by slow hand addition (~45 minutes) to the rapidly hand-stirred methanol. A fine white precipitate that readily separated to give a cloudy supernatant liquid was obtained. This was filtered through number 2 Whatman filter paper on a Buchner funnel. It was washed four times with 50 ml portions of fresh methanol and air dried overnight. It was then vacuum dried at room temperature for two days. Obtained were 43.1 g of white powder. This is an 87.5 percent recovery based on a theoretical oligomer yield of 50.2 g. Apparently some pyridine hydrochloride and product oligomer either were dissolved in, or colloidally dispersed in, the methanol filtrate.

The oligomer melted at ~205°–215° C. on a Fisher-Johns hot stage melting point apparatus. DSC thermal analysis showed a $T_g$ (endotherm) at 101° C. and a melting exotherm of 198°–215° C. Proton NMR analysis in deuterated DMSO gave a spectrumconsistent with a DP9 polycarbonate oligomer with phenolic hydroxyl end group protons (δ, ppm 9.2). This is based on the presence of 60 methyl protons, 80 aromatic protons and 2 hydroxyl protons. Theoretical hydroxyl protons, 1.42%; found 1.48%.

EXAMPLE 7

Preparation of Bis-Paraacetoxyphenyl Ester of Isophthalic Acid

The isophthalic acid (IPA; Aldrich 99% as received; 96.6 g, 0,576 mole) and the hydroquinone diacetate (HQDA; Frinton Labs 96% as received; 465.65 g, 2.304 mole) were added to a 3 neck, 3 liter flask fitted with a Trubore stirrer (Teflon paddle), inert gas (argon) inlet purge tube and argon outlet (through a mineral oil bubble tube to visualize gas purge rate), and Claisen head with two thermometers, one with adjustable height (for insertion in the melt during the reaction), and one at the distillation exit to measure distillation temperature. A water cooled distillation condenser was connected to the Claisen head to condense acetic acid byproduct. The mixture was heated to the melting temperature (~160°–170° C.) using a Glasscol 3-liter heating mantle. The temperature under the heating mantle (between the mantle surface and the flask surface) was monitored with two thermocouples, one under the bottom center of the flask and one about half way up one side of the heating mantle/ reaction flask interface. The temperature of the reaction mixture was controlled by using the thermometer in the melt as the measuring/temperature controller via an $I^2R$ Thermowatch L8-2000 SS capacitance controller (capacitor band adjusted on a mercury thermometer to the desired control temperature). This was held constant at 230° C. The temperatures under the bottom and at the side of the flask/mantle interface were observed closely, and maintained at 242°±3° C. and 232°±3° C. respectively throughout the reaction period by using a Variac set at 30–50 volts. The coreactants were melted over a 45 minute period of slow heatup from ambient temperature to ~167° C., while purging the melt with argon gas. Over the next hour, the melt temperature was raised to 230° C. (mantle/flask bottom 230° C., side 221° C.). While stirring vigorously, and continuing a slow argon purge (~1 bubble per sec). Acetic acid was distilled steadily for approximately 4 hours 15 minutes. Recovered were 68.2 g of byproduct acetic acid, or 98.7 percent of the theoretical yield of 69.1 g.

The product was a light tan solid containing a large amount (~232.8 g) of excess, unreacted HQDA. Since HQDA solubility in methanol ($CH_3OH$) is ~6.3 weight percent at 23° C., ≥4.7 liters of $CH_3OH$ should dissolve all unreacted HQDA. Therefore, the product was crushed into a fine powder and washed with 2.8 liters of methanol by slurrying the powder in the methanol for several hours and suction filtering through a 25–50μ frit. It was then treated similarly four more times, using 1.2 liters of methanol per trituration. Hence, the product was washed with a total of 7.6 liters of methanol, or 2.9 liters more than the amount required to dissolve 233 g. The solid product was dried and yielded 192 g (76.8 percent of theoretical) of HQDA/IPA/ HQDA. The light tan solid melted at 140°–155° C. on a Fisher Johns hot stage melting point apparatus. The melting point determined by DSC was 156°–161° C. Proton NMR was run in DMSO. The spectrum is in good agreement with the expected bis-paraacetoxy ended aromatic ester.

EXAMPLE 8

Preparation of PHBA/HQ/IPA/HQ/PHBA Phenolic-hydroxyl Terminated Oligomer

The bis-paraacetoxyphenyl ester of isophthalic acid (67.46 g, 0.1553 mole) from Example 7 was added to a three neck, three liter flask fitted with a Trubore stirrer (Teflon paddle), inert gas (argon) inlet purge tube and argon outlet (through a mineral oil bubble tube to visualize gas purge rate) and Claisen head with two thermometers (one with adjustable height for insertion in the melt during the reaction, and one at the distillation exit to measure distillation temperature). A water cooled distillation condenser was connected to the Claisen head to condense byproduct acetic acid. The solid isophthalic acid bis-ester was heated to its melting temperature of about 155° C. over a 25 minute period, while purging the flask with a vigorous stream of argon, using a Glasscol 3-liter heating mantle. Then the p-hydroxybenzoic acid (PHBA; Aldrich $H_{2,005}$-9, 99%; 43.33 g, 0.1533 mole) was added. The melt (pot) temperature was raised to 225° C. over an 18 minute period. Acetic acid distillation started.

The temperature under the heating mantle (between the mantle surface and the flask surface) was monitored with two thermocouples, one under the bottom center of the flask and one about half way up one side of the heating mantle/reaction flask interface. The temperature of the reaction mixture was controlled by using the mercury level of the thermometer in the melt as the measuring/temperature controller via an $I^2R$ Thermowatch L8-2000 SS capacitance controller. This was held constant at 225° C. The temperatures under the bottom and at the side of the flask/mantle interface were observed closely, and maintained at 215°±3° C. respectively throughout the reaction period by using a variac set at 30–45 volts.

Acetic acid was slowly distilled over a four hour period, with 15.4 gm (15.4/18.7×100=82.4 percent of theoretical) collected. During the last hour, the rate of acetic acid distillation fell to nil. PHBA is known to thermally decarboxylate slowly at the temperature of this reaction to provide $CO_2$ and unreactive phenol and it was concluded this side reaction had occurred to some extent. Hence, another additional 25 g of PHBA was added and the reaction continued at a melt (pot) temperature of about 220° C. for ~4 hours and an additional 2.6 g acetic acid were collected. However, the acetic acid evolution had again essentially ceased. Another 25 g PHBA were added and the reaction continued for another two hours and another 1.0 g of acetic acid was collected before evolution ceased, to give a total of 18.9 g. This is 100.8 percent of theoretical (18.9/18.75×100=100.8 percent). Hence, the reaction to convert the bisacetoxyphenyl ester to the bis-hydroxyphenyl tetraester went essentially to completion. The pot temperature was raised to ~235°–240° C., the distillation condenser cooling water shut off and the argon purge increased greatly. Much of the byproduct phenol was then distilled, 41.1 gm collected, or 82 percent of the 50.3 g expected from thermal dissociation of the 0,214 mole of excess PHBA used. The crude product yield of bis-phenol terminated tetraester was 101.77. If unaccounted phenol (~9.2g) is subtracted, this gives 92.57 g. This compares very well with the theoretical or expected yield of 91.7 g. The extra 0.9 g is attributed to a small amount of the excess PHBA still being present (not decomposed to $CO_2$ and phenol).

A large portion (95.91 g) of this crude product was washed thoroughly (triturated 24 hours) with two liters of methanol to dissolve the phenol and unreacted PHBA. The slurry was suction filtered on a 25°–50 µm glass fritted Buchner funnel. The light tan powder was vacuum dried 18 hours at 66° C. and 30 in Hg in a vacuum oven. The dry powder weighed 79.85 g (83.3 percent recovery, or 16.7 percent removed by the methanol wash). The Fisher Johns hot stage melting point was ~280°–300° C. DSC melting characterization using the Perkin Elmer 7 Series thermal analyzer (7.5 mg sample, 10° C./min) showed melting at 298°–312° C.

EXAMPLE 9

Hot Melt Adhesive Composition C

The polycaprolactone diol (PCP-530; Aldrich 18,940-5; 3.315 g (0.0250 eq), paraphenylphenol (PPP; Aldrich 13,434, 97%; 0.0425 g, 0.0050 eq) and bishydroquinone isophthalic acid diester oligomer (HQ/IPA/HQ, phenol end groups from Example 5; 2.129 g, 0.0245 eq) were melted together while hand mixing with a stainless steel spatula in a 180 ml electrolytic (deep) beaker under an inert gas (argon) blanket at about 150° C. The diphenylmethanediisocyanate (crystalline MDI, Isonate 125M, Dow, mp 37° C.; 3.140, 0.0500 eq) was added while the melt was stirred at ~150° C. It was quickly incorporated in the melt and the viscosity increased to a fairly high level in about five minutes. The melt was heated to 180° C. and the viscosity decreased to a very easily stirred level. Adhesive specimens were then hand assembled by applying melted adhesive to 0.5×1.0 inch areas (1.27×2.54 cm) on the ends of 1×3×0.032 inch (2.54×7.62×0.0813 cm) dull finish steel ¼ hard (R-13) coupons (Q Panel Inc., Cleveland, Ohio). The steel test coupons had been hand cleaned/degreased first with a kimwipe soaked with toluene, then one soaked with methyl alcohol, and preheated on a hot plate set at ~180° C. surface temperature. The test samples were adjusted to give 0.5 in$^2$ (3.23 cm$^2$) contact area, firmly pressed together by hand, the excess adhesive exudate scraped away and the assembled test specimen clamped together with two, one-half inch (1.27cm), spring loaded, IDL binder clips. One clip was placed on each side of the overlapped bond area. The partially cooled samples were then placed in a 200° C. air oven briefly (3–5 minutes) to insure that the adhesive had flowed and contacted all the metal surfaces. The samples were then allowed to cool to ambient temperature and placed in a constant temperature/humidity (73 F, 20% relative humidity) room to condition for 24 hours prior to testing.

EXAMPLE 10

Hexanediamine Polyimide Composition

Meltable polyimide oligomers with phenolic hydroxyl end groups were prepared based on flexibilized aromatic dianhydrides (DA), aromatic or aliphatic diamine couplers (DAm) and aromatic amine phenol endcappers (AP). For example, oxydiphthalic anhydride (ODPA, Oxychem, Occidental Chemical Corp.; 0.0200 mole) and a 4-aminophenol (4AP; 0.0200 mole) endtapper to provide 4-hydrophenylimide oligomer end groups were used to form an oligomer that was based on linking the ODPA with a flexible aliphatic linking group (1,6-hexanediamine (HDA); 0.0100 mole). This oligomer is structurally described by the following acronym sequence (4AP/ODPA/HDA/ODPA/4AP). It has four imide and two aromatic ether linking groups. It has a molecular weight of 754.9 and a phenolic hydroxyl equivalent weight of 377.4 and a melting range of 180°–190° C.

EXAMPLE 11

Oxydianiline Polyimide Composition

A second oligomer was prepared in which the HDA of Example 10 was replaced with ODA (4,4'-oxydianiline). This oligomer is structurally described by the following acronym sequence (4AP/ODPA/ODA/ODPA/4AP). It has four imide and three aromatic ether linking groups. It is an all aromatic 4-hydroxyphenyl-terminated oligomer with a molecular weight of 968.9 and a phenolic hydroxyl equivalent weight of 484.5. It melted at 260°–275° C.

EXAMPLE 12

Polyimide Adhesive Composition

Two hot melt adhesive compositions were prepared using the 4-phenolic hydroxyl ended polyimide oligomer from Example 10. The first composition was based on composition H. The same formulation and procedures were used except that 4,298 g (0.004868 moles) of the polyimide oligomer were used in place of the HQ/IPA/HQ aromatic ester oligomer (Example 5). The composition increased rapidly in viscosity when the MDI was added and the melt was stirred while heating at ~150° C. Within five minutes the melt started to solidify and had to be heated to ~220° C. to reduce the melt viscosity to an acceptable level to apply as a hot melt adhesive. Three adhesive samples were assembled by applying the heated melt to the preheated (~180° C.) steel coupons (1 in×3 in; 2.54×7.62 cm). The coupons were quickly pressed together and adjusted to provide 0.5 in$^2$ (3.23 cm$^2$) of adhesive bonded overlap area. They were clamped together as before and allowed to cool. They were tested at 23° C. and 50 percent relative humidity (after 24 hours conditioning under these conditions) in the Instron. The three samples tested 2.16, 2.25 and 2.15×10$^7$ Pa (average 2.19×10$^7$ Pa) (3140, 3260 and 3120 psi (average 3173 psi)). The steel coupon ends were bent. The breaks were cohesive and ductile, that is about 40 percent elongation was observed at failure. Hence, the polyimide oligomer provides a tough, very strong adhesive bond quality to the reversible polyurethane adhesive.

EXAMPLE 13

Polyimide Adhesive Composition

The second hot melt composition containing the same polyimide oligomer (Example 10) was a repeat of Example 12 except that the polycarbonate oligomer was omitted and replaced with an additional amount of the polyimide oligomer. Hence, the composition contained only PCP530 (1.640 g), PPP (0.0090 g), PI from Example 10 (2.218 g), TMP (10.0507 g) and MDI (1.558 g). The mixture increased in viscosity more rapidly than the prior polyimide-containing hot melt (Example 12). It also had to be heated to 220° C. to melt the adhesive for application to preheated (180° C.) steel coupons. Again three test samples were hand assembled, clamped together, cooled and tested at 23° C. after 24 hours conditioning at 23° C. and 50% relative humidity. The lap shear strength test results were 2.34, 2.52, 2.51×10$^7$ Pa (average 2.46×10$^7$ Pa) (3400, 3652 and 3642 (average 3564 psi)). Again the steel coupon ends were bent. Hence, this was the strongest adhesive (room temperature) prepared. It was comparable in toughness (~40 percent elongation) to the prior composition. Hence, the polyimide component provided comparable toughness, but with higher strength, than the prior composition that also contained polycarbonate oligomer.

EXAMPLE 14

Tetraphenol Ionic Crosslinker

A meltable zinc dicarboxylate salt was synthesized from a bisphenol containing a carboxylic acid group and zinc diacetate by a thermally driven disproportionation reaction. Byproduct acetic acid was evaporated as it formed driving the formation of the dibisphenol zinc dicarboxylate to completion. Thus 5.726 g (0.0200 moles) of 4,4'-bis (4-hydroxyphenyl) valeric acid (Aldrich B4,770-7, 95%) and 2.195 g (0.0100 mole) of zinc diacetate dihydrate (Aldrich 22,335-2, 98%) were added to a 180 ml electrolytic beaker. An argon gas flush was directed over the contents to displace air (oxygen). The beaker was placed in molten woods metal in a bath thermostatically controlled at 195°–200° C. The contents were hand stirred with a stainless steel spatula. The bisphenol (m.p. 167°–170° C.) melted quickly and a slurry of the zinc diacetate was observed. Very quickly boiling commenced and acetic acid began to distill off rapidly. It was swept from the reaction zone with a vigorous argon purge. In ~15 minutes, the slurry became a clear red, slightly viscous melt and the distillation of acetic acid ceased. The clear melt solidified to 6.42 g of a clear, hard, red glassy solid at room temperature. The theoretical yields were 1.20 g (0.02 moles) of acetic acid, 0.18 g water (0,0100 mole) and 6.54 g of zinc dicarboxylate salt of the bisphenol carboxylate compound. Hence, a near theoretical yield of zinc salt product was obtained (6.42/6.54×100=98.2 percent of theoretical).

EXAMPLE 15

Ionic Crosslinker Adhesive Composition

Hot melt adhesive compositions were prepared using the zinc dicarboxylate salt of 4,4'-bis(4-hydroxyphenyl) valetic acid of Example 14 in place of trimethylolpropane (TMP) as the trifunctional crosslinker. Composition H was repeated using 0.240 g (0.00151 equivalents of phenolic hydroxyl groups) of the zinc salt. Hence, 3.280 g PCP 530, 0.0180 g PPP, 1,696 g of the aromatic bis-hydroquinone ester of isophthalic acid (Example 5), 0.580 g of the polycarbonate oligomer of Example 6, and the 0.240 g of the zinc compound were melted together in a 180 ml electrolytic beaker, while stirring under argon with a stainless steel spatula, at ~210° C. The clear, thin melt was cooled to ~130° C. and 3.026 g of MDI added. The mixture was heated to ~150° C. then to ~180° C. while stirring over an ~10 minute period. The viscosity increased steadily. It was then heated to ~210° C. where a thin melt was obtained. Four lap shear test samples were hand prepared, as before, by applying adhesive to the steel tab ends preheated to ~180° C. on a hot plate. The test specimens were clamped, heated five minutes at ~200° C. in an air oven, cooled, and conditioned at 23° C. and 50 percent relative humidity for four hours. They were then tested in the Instron machine. Obtained were values of lap shear strength of 2.59, 2.07, 2.69, and 2.08×10$^7$ Pa (3760, 3000, 3900 and 3150 lbs/in$^2$) at 23° C. The breaks were cohesive and quite ductile (~40 percent elongation). The average value was 2.30×10$^7$ Pa (3332 lbs/in$^2$). This compares very favorably with the results for composition H.

The adhesive was, however, found to be soluble in NMP at room temperature. This result was unexpected any may be due to the highly polar nature of NMP and possible water content in the solvent used for test. The water and polar environment may facilitate bond reversal.

EXAMPLE 16

Scale-up Preparation of Bis-Hydroquinone Ester of Isophthalic Acid

In order to provide an additional quantity of oligomer, a 1.5 fold larger scale production of the bis-hydroquinone ester of isophthalic acid was undertaken. The experimental apparatus and details were essentially identical to those described in Example 5.

Figure 6B:
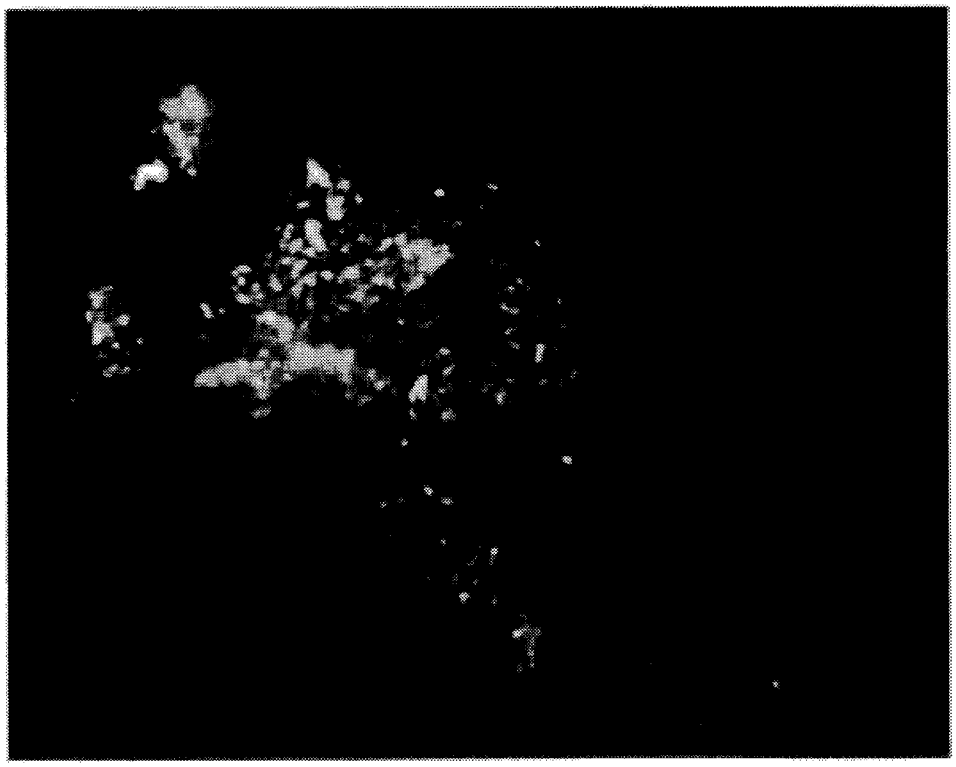
FIGS. 6(a) and 6(b) show the liquid crystalline region of the bis-hydroquinone ester of isophthalic acid (Example 16) at $211°$ C. Plane polarized optical micrographs (400×)
Figure 6A:
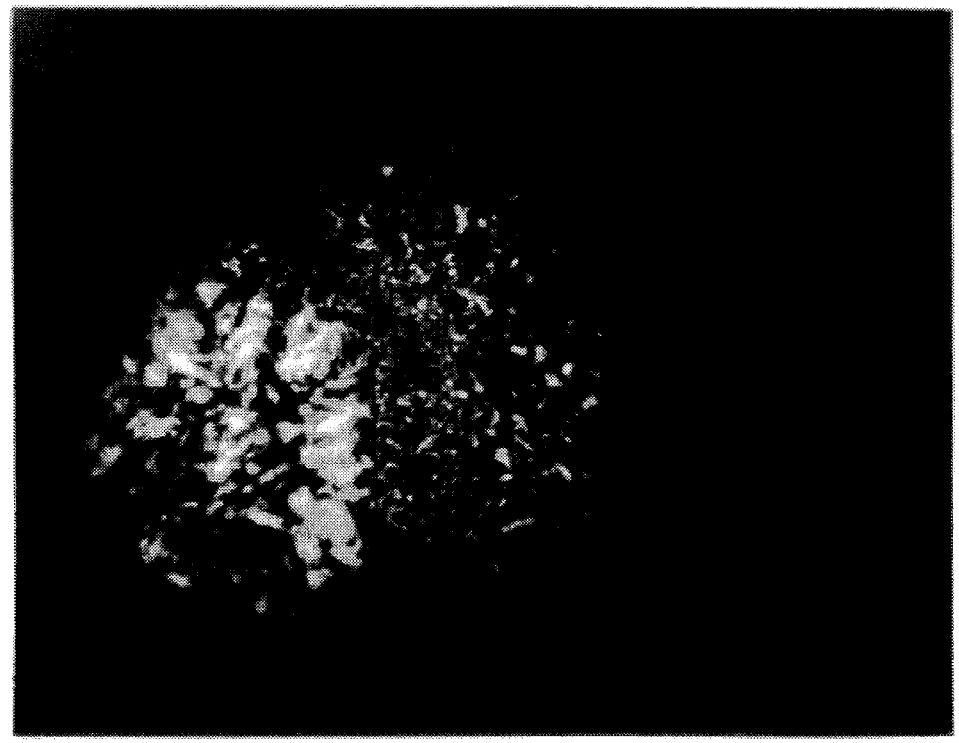

Three hundred seventy-five milliliters of dry ($H_2O<0.001\%$) dimethylacetamide (DMAC; Aldrich 21,707-2) and 65.3 g dry (over $CaH_2$) pyridine (Aldrich 36,057-0; 66.7 cc.; 0.825 moles) were added to a hot-air gun dried 3 1, 3 neck round bottom flask equipped with a stoppered pressure equalizing addition funnel, Trubore stirrer (Teflon paddle), inert gas (argon) inlet and outlet, heating mantle with $I^2R$ Thermowatch controller, and external thermocouple monitor thermometer to measure pot temperature. While stirring slowly with an argon flush, hydroquinone (HQ; 99%; Aldrich 1,790-2; 327.0 g; 3.0 moles) was added over a 5 minute period. The mixture was then heated to ~50° C. where all the hydroquinone dissolved. A solution of isophthaloyl chloride (IPC; Aldrich 36,0570- 0 74.6 g; 0.375 moles) in 450 ml additional dry dimethylacetamide was prepared in a 1-liter erlenmeyer flask. Gentle heating was required to completely dissolve the isophthaloyl dichloride. The solution was transferred to the 1-liter dropping funnel and added dropwise (~5 drops/second) to the rapidly stirred (50° C.) HQ solution over a 1.5 hour period. The reaction mixture was then slowly heated to ~82° C. where the pyridine appeared to reflux. After an additional 2 hours, the heating mantle was turned off and the solution allowed to cool overnight under an argon flush prior to precipitation. The reaction mixture was precipitated by slowly pouring the solution into 15 l distilled water in a 3.785 l (5 gallon) pail equipped with a Talboy stirrer and stainless steel dual blade Jiffy mixer. The white suspension was stirred for an additional 30 minutes, then allowed to settle (digest) for ~2 hours. The precipitate was then filtered with a Büchner funnel and no. 4 Whatman filter paper, and washed with an additional 1800 ml distilled water. A solubility check of the product showed it to be soluble in methanol, ethanol, and isopropanol, and insoluble in methylene chloride and toluene. The product was transferred to an evaporating dish, dried overnight in a vacuum oven (762 mm; ~30 in Hg vacuum, 65° C.), then ground with a mortar and pestle, returned to the vacuum oven for another day (<0.5 wt. % loss) and placed in a jar. The final washed, dried, ground product yield was 103.9 g or 79.1 percent recovery (identical to the smaller scale batch-Example 5) based on 131.4 g theoretical yield of the bis-hydroquinone ester of isophthalic acid. DSC thermal analysis showed a melting exotherm at 215° C. Optical microscopic analysis using polarized light showed an initial melting point of 211° C., a liquid-crystalline region between 211° and 219° C. illustrated in FIGS. 6(a) and 6(b), and a complete melt occurring at 223° C.

EXAMPLE 17

Preparation of Phenolic-Hydroxyl Terminated Bisphenol A/Phosgene Polycarbonate Oligomers In order to provide an additional quantity of oligomer for hot melt adhesive formulation, a 4.5 fold larger-scale preparation of the phenolic-hydroxyl terminated bisphenol A/phosgene polycarbonate oligomer was undertaken. The experimental apparatus and details were essentially equivalent to those described in Example 6. The 10× flask volume scale-up (300 ml to 3 l) allowed a doubling of the solvent (methylene chloride) used which provided better mixing and heat transfer. The following was added to a 3 liter, 3 neck round bottom flask equipped with a Trubore stirrer (Teflon paddle), inert gas (argon) inlet and outlet with flowmeter: 4,4'-isopropylidenediphenol (hisphenol A, Aldrich 13, 302-7, 99.4%, 204.23 g, 0.90 moles); triethylamine (Aldrich 13,206-3; dried oven $CaH_2$; 234.5 ml, 1.70 moles); and methylene chloride ($CH_2Cl_2$; Burdick and Jackson 300-4, dried oven $CaH_2$; 1350 ml). The flask was surrounded by a water/ice bath to control pot temperature.

The Phosgene solution (Fluka 79380, 20% in toluene; 1.93 molar, 2% HCl impurity, 365.14 g, 0.810 moles) was added dropwise (~5 drops/second) over a one hour period, using an ice bath to maintain the pot temperature at 23°±1° C. Precipitate was noted after about 55.5% of the solution had been added. The reaction mixture was stirred for an additional 2.5 hours at which point it appeared to be more viscous. The reaction mixture was allowed to stand overnight under an argon purge. The reaction mixture was then filtered and the precipitate washed with $CH_2Cl_2$ and dried in a vacuum oven. A total of 138.0 g of by-product triethylamine hydrochloride (or ~62.3% theoretical) was recovered. The missing salt was presumed dissolved in the oligomer solution.

The polycarbonate oligomer solution was concentrated down to ~1 l and precipitated in a ten fold excess (~10 l) of reagent grade methanol in a 3.785 l(5 gallon) pail equipped with a Talboy stirrer and stainless steel twin-rotor Jiffy mixer. The precipitate was allowed to settle and was then filtered through a Büchner funnel with No. 2 Whatman filter paper and washed with ~1 l additional methanol. The product was then transferred to an evaporating dish and dried overnight (762 mm; 30 in Hg vacuum; 65° C.). The final polycarbonate product yield was 142.57 g (63.1% theoretical). DSC thermal analysis showed a melting exotherm at 182° C.

EXAMPLE 18

Hot Melt Polycarbonate Composition L

The polycaprolactone diol (PCP-530; Aldrich 18,940-5; 3,280 g), paraphenylphenol (PPP; Aldrich 13,434, 97%; 0.0180 g), bis-hydroquinone isophthalic acid diester oligomer (HQ/IPA/HQ, phenol end groups from Example 16; 1.696 g) and polycarbonate (PC; from Example 17; 0.580 g) were melted together while hand mixing with a stainless steel spatula in a 180 ml electrolytic (deep) beaker under an inert gas (argon) blanket at about 210° C. Trimethylolpropane (TPM, 0.101 g) with a hydroxy equivalent weight of 44.7 was reacted in situ with 4,4' diphenylmethane diisocyanate (crystalline MDI, Isonate 125M, Dow, mp 37° C.; 3.116 g) with a hydroxy equivalent weight of 44.7 to give an aromatic triisocyante that was added to the previous melt while the melt was stirred at ~150° C. It was quickly incorporated in the melt and the viscosity increased to a fairly high level in about five minutes. The melt was heated to 180° C. and the viscosity decreased to a very easily stirred level. Adhesive specimens were then hand assembled by applying melted adhesive to 0.5×1.0 inch areas (1.27×2.54 cm) on the ends of 1×3×0.032 inch (2.54×7.62×0.0813 cm) dull finish steel ¼ hard (R-13) coupons (Q Panel Inc., Cleveland, Ohio). The steel test coupons had been hand cleaned/degreased first with a Kimwipe soaked with toluene, then one soaked with methyl alcohol, and preheated on a hot plate set at ~180° C. surface temperature. The test samples were adjusted to give 0.5 in$^2$ (3.23 cm$^2$) contact area, firmly pressed together by hand, the excess adhesive exudate scraped away and the assembled test specimen clamped together with two, one-half inch (1.27 cm), spring loaded, IDL binder clips. One clip was placed on each side of the overlapped bond area. The partially cooled samples were then placed in a 200° C. air oven briefly (3–5 minutes) to insure that the adhesive had flowed and contacted all the metal surfaces. The samples were then allowed to cool to ambient temperature and placed in a constant temperature/humidity (73° F.; 22.8° C., 20% relative humidity) room to condition for 24 hours prior to testing.

obtained at 177° C. (350° F) and 4.14–5.52×10$^6$ Pa (600–800) psi pressure. Temperature higher than 204° C. (400° F.) resulted in irregular coated surfaces. A thin, 4–6 mil (1.03 cm) thick coating was produced on the composites providing both a tightly-adhering, and high gloss finish.

A 5-mil (0.0127 cm) thick Kapton (DuPont polyimide) sheet between composition L and the smooth mold surface permitted the composite to release from the mold. Attempts to use thin Teflon sheets as release agents resulted in dull, irregular coatings.

To test the adhesion of the composition L to the polypropylene composite, tensile lap shear specimens were prepared by sandwiching composition L between two layers of polypropylene glass-filled composite with a 1"×1" (2.54× 2.54 cm) overlap. Test results are given in Table 6.

TABLE 6

LAP SHEAR STRENGTH OF COMPOSITION L AND COMMERCIAL (PE 6300) HOT MELT ADHESIVES WITH POLYPROPYLENE SUBSTRATES
(Adhesive Area 1" × 1" = 1 sq in.; 2.54 × 2.54 cm = 6.45 cm$^2$)

| Adhesive | Trial | Load, lbs (N × 10$^2$) | Lap Shear Strength, psi (Pa × 10$^5$) | |
|---|---|---|---|---|
| | | | Avg. | Rounded |
| Composition L | a | Broke in grips | | |
| | b | 53(2.36) | 53(3.65) | |
| | c | 83.5(3.71) | 83.5(5.76) | 59.8(4.12) | 60(4.14) |
| | d | Broke in grips | | |
| | e | 43(1.91) | 43(2.96) | |
| PE 6300[a] | a | 118(1.18) | 118(8.14) | |
| | b | 61(2.71) | 61(4.21) | 73.7(5.08) | 74(5.10) |
| | c | 42(1.87) | 42(2.90) | |

[a] Henkel (formerly H. B. Fuller) commercial hot melt adhesive

EXAMPLE 19

In-Mold Coatings to Produce Class "A" Finish on Stampable Thermoplastic Sheet Composites When thermoplastic sheet composite parts are formed in a mold, the differential changes in dimension between the glass fiber or other reinforcement and polymer causes surface roughness that is not of class "A" finish surface quality, that is, suitable for exterior finish applications such as automotive finishes. By adding a coating just after part formation, that material can replicate the smooth mold surface and fill in the depressions in the composite. To do this, the coatings must be of low viscosity, have good adhesion to the composite, and not solidify in an uneven manner. Composition L (Example 18) has these characteristics. The two polymers of interest in thermoplastic sheet composites are polypropylene (PP) and polyethylene terephthalate (PET). Both are poorly adhered to by most coatings. Therefore, conventional in-mold coatings used to provide a class "A" finish to other composites, such as those based on sheet molding compound cannot be used with polypropylene and polyethylene terephthalate composites. Composition L was found to adhere tightly to both of these materials fulfilling one of the primary requirements for the in-mold coating. No other material is known to do this to our knowledge. The polymer also has a low viscosity meaning it will flow easily to provide good coverage over the molded part.

The tight, in-mold bond on the polypropylene and polyethylene-terephthalate composites with composition L was

EXAMPLE 20

Preparation of Phenolic-Hydroxyl Terminated Biphenylenesulfide Oligomers

The following were added to a 3 liter, 3 neck round bottom flask equipped with a Trubore stirrer (Teflon paddle), inert gas (argon) inlet and outlet with flowmeter, Claisen head with both pot and distillate thermometers, water cooled distillation condenser, distillation take-off, and receiver flask: 91.74 g 4,4'-dibromobiphenyl (4,4' DBBP; Aldrich 92-86-4; 98%, 0.30 moles); 26.21 g 4-bromophenol (4-BP; Aldrich 106-41-2; 99%; 0.15 moles); 90.07 g sodium sulfide nonahydrate (Na$_2$S·9H$_2$O; Aldrich 1313-84-4; 0.375 moles); 39.75 g sodium carbonate (Na$_2$CO$_3$; Baker 3602-01; 0.375 moles); and 1.8 l of 1-methyl-2-pyrrolidinone (NMP; Aldrich 27,045-8, 99+%). The flask was surrounded by a 2-piece Glasscol spherical heating mantle with internal thermocouple leads to measure flask surface temperature, connected to independent Variac rheostats, controlled by an I$^2$R Thermowatch temperature L8-2000 SS capacitance monitor attached to the pot thermometer.

The Aquamarine blue mixture was stirred under a slow Argon purge (0.3–0.4 SCFH; 8.5–9.5×10$^{-3}$ m$^3$/hr) while heating (~40/~55 V; Top/Bottom) to the target polymerization temperature of ~165° C. As the pot temperature rose over ~108° C., condensate was noted so the Claisen adapter was insulated with glass wool, the Argon flow rate increased to ~1.0 SCFH (2.8×10$^{-2}$ m$^3$/hr), and the distillate (water from Na$_2$S·9H$_2$O) collected. The temperature was maintained at ~165° C. for 2.5 hours during which time the distillate collection rate slowed and vapor temperature dropped. The heating mantles were then removed and the flask was cooled with an air line to near room temperature. The resulting dark emerald green solution was slowly added to rapidly stirring 14 l of water/methanol (71/29, V/V) in a 5 gallon (3.785 l) pail equipped with a Trubore stirrer and stainless steel twin-rotor Jiffy mixer. The beige precipitate/ suspension was stirred for ~30 minutes, then allowed to settle overnight.

The product was recovered by filtration using a Büchner funnel and no. 4 Whatman filter paper, initially dried, then placed in a 25–50μ glass butted funnel and washed with ~500 ml methanol. The washed product was then placed in a vacuum oven (~30 in; 762 mm Hg, 65° C.) dried, ground with a mortar and pestle, returned for further drying and placed in a screw-cap amber bottle. The final washed, dry, ground product yield was 60.85 g or ~79.6 percent of the theoretical yield of 76.45 g for the DP=4 oligomer (MW= 955.3 g/mole theoretical).

Samples of the product were analyzed using Differential Scanning Calorimetry (DSC), Infrared Spectroscopy (ATR) and optical microscopic techniques. The DSC showed a single sharp peak near ~153° C., indicating a relatively pure compound. The infrared analysis showed the presence of hydroxyl end-group functionality. The optical microscopy (using polarized light) as a function of temperature indicated that the material possessed strong liquid-crystalline behavior as shown in FIGS. 7(a) and 7(b) over a broad range, from ~175° C. to over ~220° C., completely melting at ~242° C. The presence of reactive hydroxylend-group functionality was confirmed by reaction of the product with a stoichiometric amount of MDI producing a thick urethane polymer.

Hot melt adhesive test samples were prepared as described previously under Example 18, Hot Melt Polycarbonate Composition L, but with the phenolichydroxyl terminated biphenylenesulfide oligomer being substituted for the polycarbonate portion on an equivalent basis. Lap shear strength results were obtained and preliminary indicated the material to have a lap shear strength of about two times that of commercial polyester PE 6300 from Henkel (formerly H. B. Fuller).

EXAMPLE 21

Preparation of Poly 4(or 5)-imino-1,3-imidazolidine-2, 5(or4)-dione-1,3-diyl Oligomers with Phenolic Hydroxyl End Groups A 500-ml three-neck flask was fitted with a Trubore stirrer with Teflon blade (driven by a T-line laboratory electrical stirrer), an argon gas inlet and a thermometer positioned to penetrate into the reaction solution via an adapter with a gas outlet side arm. The flask was flame dried and cooled under an argon flush. Then 31.7 g (0.127 mole) of MDI (Dow Isonate 125 M) and 150 ml NMP (Aldrich 27,045-8, 99+ percent, dried over Fluka 3A type molecular sieve 69828) were placed in the . flask. The NMP was heated until the MDI all just dissolved, then cooled to near ambient. Then 8.896 g acetone cyanohydrin (Aldrich A1,000-0 dried over same Fluka molecular sieve) were added by syringe. The 1.0 cc of triethylamine (TEA; Aldrich 13,206-3 dried over the Fluka molecular sieves) was added by syringe, followed by 2.5 cc of a solution of NaCN (0.2000 g/100 ml NMP, same NMP as above). Immediately an exotherm was noted. The temperature of the well stirred solution rose from 28° C. to 43.8° C. over the next 1 hr 17 min. The reaction flask was insulated with Pyrex wool during this period. The temperature then began to drop. After about 15 min, it was 43.0° C. Then 4.65 g (0.0422 mole) of Aldrich H1, 790-2 hydroquinone, 99 percent, was added and dissolved in 25 ml of the same dry NMP. It was added all at once. The temperature immediately began to rise again. In 7 min, it had reached 47.0° C. At this point, the viscosity increased very rapidly and the initially moderately viscous, clear light yellow solution gelled to a very stiff gel which could not be stirred. The gel was left to stand overnight under the Ar flush. The next morning the gel had completely disappeared. The mixture had spontaneously reverted to a clear easily stirred moderate viscosity liquid. A small sample of this solution when precipitated in methanol, washed with methanol and dried, melted to a clear moderate viscosity liquid at 270°–295° C. Apparently a crosslinking reaction of terminal isocyanate groups with pendant imino (=NH) sites produced a branched oligomer which crosslinked when chain extended with the hydroquinone. However, unreacted hydroquinone hydroxyl groups then may have displaced these crosslinking urea linkages to form more stable urethane bonds. Hence the final product may have assumed the nearly linear oligomer structure that the 6/5 MDI/HCN mole ratio was chosen to provide. The end groups are presumed to be p-hydroxyphenyl groups from end-capping of the terminal isocyanates with hydroquinone. This is a unique, difunctional phenolic end-group oligomer.

EXAMPLE 22

Preparation of Polyparabanic Acid Oligomer With Phenolic Hydroxyl End Groups

A similar reaction to Example 21 was carried out using the same reagents and apparatus. However, an excess of the HCN provider (acetone cyanohydrin) was used in a first stage reaction. Hence 8.511 g (0.1000 mole) of acetone cyanohydrin were added to a solution of 12.151 g (0.0485 mole) MDI in 150 cc NMP. To this were added 0.5 cc of the dry TEA, followed by 2.0 ml of the 0.2000 g/100 ml solution of NaCN in NMP. An immediate exotherm was noted. In 15 min the temperature had climbed from 28° C. to 53.5° C. It then started to fall and reached 47° C. after another 10 min. Then 25.026 g (0.1000 mole) MDI in 100 cc warm NMP and 11.011 g (0.0500 mole) hydroquinone in 50 cc warm NMP were added separately, the MDI first all at once, followed by the HQ, all at once, about 2 mins later. Another exotherm occurred with the temperature rising to 58° C. in about 10 min. The yellow clear solution increased in viscosity initially, then fell again to a moderate level. No gel formation was noted. The mixture was stirred overnight under argon at a moderate rate while maintaining the temperature at 45° C. The product solution was perhaps slightly less viscous but otherwise unchanged. It was precipitated in ~3 liters of methanol in a Waring blender run at moderate speed and filtered on a coarse (~25 μm) fritted funnel. It was washed seven times in the blender with about 600 ml portions of methanol, until the methanol wash demonstrated no turbidity when dropped into tap water. A small portion was dried (0.7 g) and the melting point of the imino-group containing oligomer measured on the Fisher Johns melting point hot stage. It melted at 240°–250° C.

The remainder of the oligomer was redissolved in about 350 ml of NMP in the blender. Then 11 g of concentrated HCl, diluted with an equal volume of distilled water, was added to the rapidly stirred yellow, clear solution. Copious precipitation of NH$_4$Cl occurred immediately and the solution became a clear, green color. The amount of HCl used was slightly in excess of the amount theoretically required (~9.8 g) to convert the C=NH groups to —C=O groups, white providing NH$_4$Cl by-product. The clear supernatant was then precipitated in distilled water and filtered through the 25 ∞m frit. The white powder was washed three times with water, three times with methanol and three times with 30°–60° C. pet ether and air dried. The slightly yellowish-white powder melted (Fisher Johns) at 220°–230° C. DSC analysis indicated a melting point of ~207° C. Hot melt adhesive test samples were prepared as described under Example 18, Hot Melt Polycarbonate Composition L, but with the polyparabanic acid oligomer with phenolic hydroxyl end groups being substituted for the polycarbonate portion on an equivalent basis. Lap shear strength results were obtained and preliminary results indicated the material to be comparable to commercial polyester adhesives such as PE 6300.

EXAMPLE 23

Test Specimen Assembly Procedure

Tensile lap shear specimens prepared in the prior Examples involved hand applying a small quantity of the melted (~200°–210° C. heated pot) adhesive to the ends of preheated tensile shear coupons (Q Panel R-13 carbon steel or stainless steel). The coupons were usually heated on a hot plate set at ~180°–200° C. prior to the melt application. The adhesive was applied to about two-thirds of the marked 3.23 cm$^2$ (0.5 in$^2$) area on the end of the first coupon then the second heated coupon was hand overlapped and the two were pressed and moved adequately to wet the second coupon and spread the adhesive over the 3.23 cm$^2$ (0.5 in$^2$) area between the coupons. They were then clamped together with two IDL spring loaded clamps (⅜ in; 0.95 cm), one on each side of the bonded joint, and placed in a circulating air oven at 200° C. for 5–10 minutes to ensure complete wetting and bonding of the metal. The clamped sample was then removed from the oven and allowed to cool to ambient temperature. Exudate occurred at the exposed edges. This was hand removed while still hot (molten) to avoid extraneous effects during subsequent tensile testing. Once cooled, this adhesive exudate is so strong and tough that it is extremely difficult, if not impossible, to cut away by hand.

To provide uniform bond thickness and area, avoid the exudate problem and speed up the test specimen assembly rate, two approaches were studied: 1) the application of small weighed pieces to preheated coupon ends hand manipulated to give the 3.23 cm$^2$ (0.5 in$^2$) bond and 2) fabrication of a controlled thickness film adhesive with application of cut-to-size strips of film to cold metal tabs, bonding by clamping with IDL clamps, as above, with heating under controlled conditions.

This work was done using a replicate of hot melt adhesive composition H (Table 3). It quickly became evident that the second approach was much easier to accomplish and gave a well controlled basis in the lab. Film preparation was carried out at 365° F. (185° C.) by pressing a weighed quantity (generally 1 g) of the adhesive between films of 5 mil (0.127 mm) Teflon in a preheated compression mold. A Hunter 30-ton (2.7 c10$^4$ kg) hydraulic press with parallel platens and an applied force of 12,000 pounds (5.3×10$^4$N) (film area ~8 in$^2$; 51 6 cm$^2$ ~1500 psi; 1.03×10$^7$ Pa) provided a film with a thickness of 3±1 mil (0.076±0.025mm). The above mentioned work in which adhesive samples were assembled using weighed chunks of adhesive to give controlled thickness bond lines had indicated that about 2–3 mil (0.051–0.076 mm) thick bonds are apparently needed to provide complete coverage of this 3.23 cm$^2$ (0.5 in$^2$) area and an apparent leveling off of the attainable strength. Adhesive quantities greater than this results in exudate during the 5–10 minute 200° C. "seasoning". Hence, film with this thickness (3±1 mil; 0.076±0.025 mm) was prepared and used to fabricate the large number of adhesive samples used in the exposure tests.

In order to determine whether the film fabrication time or thermal quench method had any effect on the adhesive bond formation process or bond strengths, films were made by pressing for 1, 7 and 15 minutes at 185° C. and by subjecting 1 minute pressings to both very rapid and slow (annealing) type quenches. Then adhesive samples were assembled and tested at ambient temperature (Table 7). It appears that these variations do not have an effect on adhesive sample preparation or on the tensile properties obtained. The grand average for all 24 test samples is 2.09×10$^7$ Pa (3032 psi) tensile shear strength. However, except for two test samples in each of the first two sets which range from 1.32×10$^7$ to 1.83×10$^7$ Pa (1920 to 2650 psi), the remaining 20 test samples are tightly grouped around 2.21×10$^7$ Pa (2.15–2.29×10$^7$ Pa, average 2.21×10$^7$ Pa) (3200 psi (3120–3320 psi, average 3204 psi)). Inspection of the pulled test specimen surfaces showed that cohesive failure occurred in every case and that the four lower testing samples had patches of incomplete coverage indicating that their lower test values were nonrepresentative. Also, all 20 of the higher strength samples exhibited steel coupon deformation (bending, stretching) indicating that the adhesive bond strength exceeds the yield strength of the steel. Hence, it is concluded that there is no effect on bond strength of the film molding time or thermal quench method. Also, the true bond strength attainable under these bonding conditions can probably be considered to be 2.21×10$^7$±6.89×10$^5$ Pa (3200±100 psi) with a high degree of reliability. These results suggest that adhesive film or controlled thickness could be extruded on a commercial basis for actual use as an adhesive strip. Complex shapes could be stamped or cut out and the scrim re-extruded with no net loss of product.

TABLE 7

EFFECT OF ADHESIVE FILM[a] FABRICATION CONDITION[b] ON THE LAP SHEAR STRENGTH OF 0.5 IN$^5$ BONDED SAMPLES(c)

| Sample | Adhesive Film Preparation | | Sample psi (Pa × 10$^7$) |
|---|---|---|---|
| | Time, min | Type Quench | |
| 1 | 1.0 | Rapid | 2040(1.41) |
| | | | 1980(1.37) |
| | | | 3260(2.25) |
| | | | 2060(1.42) |
| | | | 3120(2.15) |
| | | | 3260(2.25) |
| | | | 3150(2.17) |
| | | | Average 2696(1.86) |
| 2 | 7.0 | Rapid | 1920(1.32) |
| | | | 3210(2.21) |
| | | | 2650(1.83) |
| | | | 3140(2.16) |
| | | | 3260(2.25) |
| | | | 3240(2.23) |
| | | | Average 2903(2.00) |
| 3 | 15.0 | Rapid | 3140(2.16) |
| | | | 3240(2.23) |
| | | | 3240(2.23) |

TABLE 7-continued

EFFECT OF ADHESIVE FILM[a] FABRICATION CONDITION[b] ON THE LAP SHEAR STRENGTH OF 0.5 IN$^5$ BONDED SAMPLES(c)

| Sample | Adhesive Film Preparation Time, min | Type Quench |  | Sample psi (Pa × 10$^7$) |
|---|---|---|---|---|
|  |  |  |  | 3260(2.25) |
|  |  |  |  | 3180(2.19) |
|  |  |  |  | 3220(2.22) |
|  |  |  | Average | 3213(2.22) |
| 4 | 1.0 | Slow |  | 3080(2.12) |
|  |  |  |  | 3120(2.15) |
|  |  |  |  | 3240(2.23) |
|  |  |  |  | 3320(2.29) |
|  |  |  |  | 3150(2.17) |
|  |  |  |  | 3250(2.24) |
|  |  |  | Average | 3193(2.20) |
|  |  |  | Grand Average | 3001(2.07) |

[a]2-4 mil (0.051-0.102 mm) film (1 g) of MDI based hot melt adhesive (replicate of Composition H of Table 3).
[b]Films prepared by pressing 1.0 g of MDI (Composition H replicate) between Teflon sheets in a preheated compression mold at 365° F. (185° C.) for the indicated time at 12,000 lbs force (5.34 × 10$^4$N). Rapid quench was done by running tap water through the platens (reaches approximately 200° F. (93° C.) in approximately 2 min). Slow quench done by allowing platens to cool simply by turning off electric heater. About 3 hours required to reach 200° F. (93° C.).
[c]Adhesive sample preparation same as Table 8, footnote (c).

The effect of bonding temperature was also studied briefly. The results are given in Table 8. It is concluded that a bonding temperature of between 180° and 200° C. is needed to obtain complete steel substrate wetting and maximum bond strength. However, the application pressure is no doubt also an important variable. The clamping procedure used here provides a moderate, but at present unknown (i.e., unmeasured) pressure. Higher clamping or contact pressure might lower the temperature requirement, or improve bond quality. For present purposes, it was concluded that assembly of the test specimens at 200° C. using the IDL clamps would provide reproducibly well bonded samples and this procedure was used to fabricate all the test specimens.

TABLE 8

EFFECT OF BONDING TEMPERATURE ON LAP SHEAR STRENGTH OF MDI-BASED ADHESIVE COMPOSITION[a]

| Sample | Adhesive[b] Bond Area, in$^2$ (cm$^2$) | Bonding Temp[c], °C. | Strength,[d] psi (Pa × 10$^7$) |
|---|---|---|---|
| 5 | 0.5(3.23) | 160 | 1120(0.772) |
|  |  |  | 1680(1.16) |
|  |  |  | 1600(1.10) |
|  |  |  | Average 1467(1.01) |
| 6 | 0.5(3.23) | 180 | 2520(1.74) |
|  |  |  | 2220(1.53) |
|  |  |  | 3220(2.22) |
|  |  |  | Average 2653(1.83) |
| 7 | 0.5(3.23) | 200 | 3160(2.18) |
|  |  |  | 3200(2.21) |
|  |  |  | 3220(2.22) |
|  |  |  | Average 3193(2.20) |

[a]Hot melt adhesive replicate of composition H of Table 3.
[b]5-12 mil (0.13-0.31 mm) adhesive film (1 g) pressed between Teflon sheets at 365° F. (185° C.) 1 min at 7500 lbs force (3.34 × 10$^4$N).
[c]R-13 steel coupons, 1 × 3 inch (2.54 × 7.62 cm) Q-Panel Inc., Cleveland, Ohio, bonded with 5-12 mil (0.13-0.31 mm; 1.27 × 2.54 cm) adhesive film strips pre-cut to shape (0.5 × 1.0 inch; 1.27 × 2.54 cm) and clamped with ⅜-inch (0.95 cm) capacity IDL binder clips. Clamped samples placed in oven at indicated bonding temperature for 10 min.
[d]Test at 23° C.; 0.2 in/min (0.51 cm/min) Instron jaw separation speed; 0.5 in/min (1.27 cm/min) chart speed; 2.0 inch (5.1 cm) jaw separation.

EXAMPLE 24

Effect of Isocyanate Type on Lap Shear Strength

In the previous Examples, only three isocyanates, Isonate 143L, MDI and NDI, were studied, with most of the work done using MDI. In fact, Isonate 143L had only been studied prior to the synthesis of the five high performance aromatic oligomers. It was the isocyanate used in Examples 1-4 in which only bisphenol A, phenolic resins and polycaprolactone diol were used and the reversibility principle was demonstrated. However, those compositions had relatively poor adhesive properties and actual adhesive strengths were not measured. Hence, it was considered beneficial to re-examine this commercial variation of MDI (a liquid composition which contains 20 percent of a cyclic MDI triisocyanate dissolved in MDI). Also, two other commercial isocyanates, toluene diisocyanate (TDI), and m-tetramethyl xylene diisocyanate (TMXDI, an aralkyl diisocyanate), were considered to be of strong interest and potentially important in commercial use. However, the selection of these isocyanates for study is not meant to imply that other isocyanates are not of interest. These were simply commercial materials that were readily available for study.

The TMXDI is of considerable interest because it is an aliphatic diisocyanate which might be expected to demonstrate a higher temperature for urethane bond dissociation than the other isocyanates. However, it is noted that this is an activated aliphatic. That is, the isocyanate group is on a carbon attached to a benzene ring so that it would be expected to be more active than other aliphatic isocyanates, such as 1,6-hexane diisocyanate and so on.

Adhesive compositions were prepared based on adhesive composition H of Table 3. In each case, an isocyanate molar equivalent of the new diisocyanate was substituted for MDI. In the case of Isonate 143L, the crosslinker triol TMP was eliminated because the trifunctional isocyanate is already included in Isonate 143L. It was observed that the TDI composition reacted somewhat slower (i.e., increased in viscosity slower) than the MDI, Isonate 143L or NDI, and the TMXDI reacted appreciably more slowly, requiring more than 30 minutes to reach an equilibrium viscosity at 180°–200° C. MDI and Isonate 143L both react quickly, reaching an apparent equilibrium at 200° C. in 5–10 minutes after initial mixing. NDI reacts noticeably faster, perhaps twice as fast, while TDI takes at least twice as long, i.e., 10–20 minutes or longer.

Lap shear adhesive tests on steel coupons were carried out. The results are given in Table 9. The NDI-based adhesive samples were bonded at 230° C. while the others were all bonded at 200° C. MDI and Isonate 143L give comparable results. As noted earlier, the NDI-based adhesive gave lower strength 1.27×10⁷ Pa (1848 psi). This compares reasonably well with the value obtained earlier 1.52×10⁷ Pa (2203 psi; composition K in Table 3). It is noted in both cases that individual test specimens showed ~2.14× 10⁷ Pa (~3100 psi) for the NDI adhesive suggesting that it is capable of a similar strength to the MDI adhesive. The NDI adhesives are qualitatively more viscous than the MDI and possibly do not wet the metal substrate as readily as the MDI composition under similar bonding conditions. This could be a reason for the lower strengths.

The TDI and TMXDI compositions gave, respectively, 9.76×10⁶ and 1.07×10⁷ Pa (1415 and 1548 psi) average tensile lap shear values (average of 6 specimens). The variability of the individual sample values is such that these results are considered essentially equivalent and roughly half the MDI and Isonate 143L average values.

TABLE 9

EFFECT OF ISOCYANATE TYPE ON THE LAP SHEAR STRENGTH OF 0.5 IN² (3.23 cm²) ADHESIVE BONDED SAMPLES[a]

| Sample | Adhesive Type | Strength, psi (Pa × 10⁷) |
|---|---|---|
| 8 | PE 6300[b] | 1425(0.983) |
|   |   | 1305(0.900) |
|   |   | 1560(1.08) |
|   |   | 1260(0.869) |
|   |   | 1200(0.827) |
|   | Average | 1350(0.931) |
| 9 | MDI[c] | 3180(2.19) |
|   |   | 2740(1.89) |
|   |   | 3030(2.09) |
|   |   | 3170(2.19) |
|   |   | 3120(2.15) |
|   |   | 3240(2.23) |
|   | Average | 3080(2.12) |
| 10 | Isonate 143L[d] | 3160(2.18) |
|   |   | 3180(2.19) |
|   |   | 3220(2.22) |
|   |   | 3180(2.19) |
|   |   | 3320(2.29) |
|   |   | 3280(2.26) |
|   | Average | 3223(2.22) |
| 11 | NDI[e] | 1050(0.724) |
|   |   | 1600(1.10) |
|   |   | 1800(1.24) |
|   |   | 1840(1.27) |
|   |   | 3160(2.18) |
|   |   | 1640(1.13) |
|   | Average | 1848(1.27) |
| 12 | TDI[f] | 1200(0.827) |
|   |   | 1500(1.03) |
|   |   | 1740(1.20) |
|   |   | 1580(1.09) |
|   |   | 1230(0.848) |
|   |   | 1240(0.855) |
|   | Average | 1415(0.976) |
| 13 | TMXDI[g] | 1520(1.05) |
|   |   | 1700(1.17) |
|   |   | 1660(1.14) |
|   |   | 1520(1.05) |
|   |   | 820(0.565) |
|   |   | 1340(0.924) |
|   | Average | 1548(1.07) |

TABLE 9-continued

EFFECT OF ISOCYANATE TYPE ON THE LAP SHEAR STRENGTH OF 0.5 IN² (3.23 cm²) ADHESIVE BONDED SAMPLES[a]

| Sample | Adhesive Type | Strength, psi (Pa × 10⁷) |
|---|---|---|

[a]2–4 mil (0.05–0.1 mm) adhesive films (1 g) pressed between Teflon sheets at 365° F. (185° C.) 1 min at 12,000 lbs force (5.3 × 10⁴N). Adhesive samples prepared using R-13 cold rolled steel coupons following the procedure of Table 7, footnote (c); Sample 11 (NDI composition) heated 10 min at 230° C., all others 10 min at 200° C.
[b]Henkel commercial hot melt polyester.
[c]MDI = 4,4'-diphenylmethane diisocyanate (Dow Isonate 125M).
[d]Dow Isonate 143L = 80 percent MDI + 20 percent triisocyanate cyclic adduct crosslinker.
[e]NDI = 1,5-naphthalene diisocyanate (Mobay Desmodur 15). Hot melt adhesive replicate of composition K of Table 3.
[f]TDI = 80/20 2,6/2,4 Toluene diisocyanate (ICI Rubinate).
[g]TMXDI = m-tetramethyl xylene diisocyanate (American Cyanamid).

EXAMPLE 25

Thermal Cycling Tests

Two short-term, but intensive, cyclic exposure condition tests were carried out in a test chamber which also provides a vibration component during the thermal cycling (Thermotron Vibration Chamber/Model FCHV). The first was an exposure of tensile lap shear specimens of the NDI and MDI-based compositions to a −30° C. to +100° C. cyclic exposure condition for 3 days. The cycle consists of holding 30 minutes at −30° C., heating to +100° C. over 60 minutes, holding at 100° C. for 30 minutes, cooling to −30° C. over 60 minutes, repeating. Hence, 3 hours are required for one cycle. Thus, 24 cycles were completed during the 3-day test. The results are summarized in Table 10. Two sets of 6 NDI adhesive samples are shown. The first set consisted of controls which were not exposed to the thermal cycling condition. These showed a much wider variability and significantly lower average strength than the NDI set (Sample 11) of Table 9. The difference is due to the fact that this set of NDI adhesive samples were bonded at 200° C. for 10 minutes instead of 230° C. Most likely incomplete substrate wetting occurred at this lower bonding temperature. It is of considerable interest to note the substantial increase in bond strength demonstrated by the samples exposed to the cyclic heating/cooling condition. The average value has slightly more than doubled and is now comparable to the earlier NDI-based test results. Either the elevated temperature or the heating/vibration combination, effected a "healing" or flaws in the adhesive bonds. The result may be due to an effective substrate wetting improvement. This effect was also noted in the MDI-based adhesive test values. The average strength increased from 8.96×10⁶±6.89×10⁵ Pa (1300±100 psi) (of Tables 7 and 8) to 2.49×10⁷±3.79×10⁵ Pa (3615±55 psi). This is a 16 percent increase in the strength, again, presumably the result of a "healing" or improved substrate wetting process. This raises an interesting possibility, namely that the lap shear strength obtainable from an optimized bonding procedure should be ≧2.49×10⁷ Pa (≧3615 psi).

TABLE 10

LAP SHEAR STRENGTH OF ADHESIVE BONDED[a] SAMPLES AFTER THERMAL CYCLING (−30° C. TO +100° C.) FOR 3 DAYS[b]

| Sample | Isocyanate Type | Thermal Cycle | | Strength, psi (Pa × 10$^7$) |
|---|---|---|---|---|
| 14[c] | NDI | No | | 1260 (0.869) |
|  |  |  |  | 260 (0.179) |
|  |  |  |  | 1460 (1.01) |
|  |  |  |  | 600 (0.414) |
|  |  |  |  | 1120 (0.772) |
|  |  |  |  | 660 (0.455) |
|  |  |  | Average | 893 (0.616) |
| 15 | NDI | Yes |  | 1420 (0.979) |
|  |  |  |  | 2920 (2.01) |
|  |  |  |  | 1500 (1.03) |
|  |  |  |  | 2450 (1.69) |
|  |  |  |  | 1920 (1.32) |
|  |  |  |  | 1990 (1.37) |
|  |  |  | Average | 2033 (1.40) |
| 16[d] | MDI | Yes |  | 3600 (2.48) |
|  |  |  |  | 3560 (2.45) |
|  |  |  |  | 3700 (2.55) |
|  |  |  |  | 3670 (2.53) |
|  |  |  |  | 3630 (2.50) |
|  |  |  |  | 3610 (2.49) |
|  |  |  | Average | 3628 (2.50) |

[a] Adhesive sample preparation same as Table 7, footnote (c), all at 200° C. for 10 min. Film 2–4 mil (0.05–0.1 mm) prepared according to Table 9, footnote (b). NDI adhesive (replicate of composition K).
[b] 3 hour cycle time: 30 min −30° C., 60 min to 100° C., 30 min 100° C., 60 min to −30° C.; Thermotron Vibration Chamber Model FCHV, Thermotron Industries, 291 Kollen Park Drive, Holland, MI 49423.
[c] Control set provides the baseline, unaged strength for the NDI-based adhesive.
[d] See Sample 9, Table 9, for MDI control.

A second, more severe thermal cyclic exposure test was then carried out in the same test chamber. In this test, the same cyclic time was used, but the hold temperature levels were −40° C. and 120° C. The test was run for 5 days (120 hours); consequently 40 cycles were completed. Results are shown in Table 11. The NDI-based adhesive control set (Sample 17 of Table 9) was bonded at 230° C. (10 minutes). This provided an average strength value of 1.27×10$^7$ Pa (1848 psi), comparable to the above discussed values. After thermal cycling, the average value found was 1.08×10$^7$ Pa (1562 psi), a 16 percent decrease. Similarly, the MDI-based adhesive set (Sample 19 of Table 11) showed 1.81×10$^7$ Pa (2618 psi) after cycling, also a 16 percent decrease. Hence, these apparently small changes in the holding temperature, 10 degrees lower on the low side and 20 degrees higher on the high end, have significant impact on decreasing the lap shear tensile strength.

TABLE 11

LAP SHEAR STRENGTH OF ADHESIVE BONDED[a] SAMPLES AFTER THERMAL CYCLING (−40° C. TO +120° C.) FOR 5 DAYS[b]

| Sample | Isocyanate Type | Thermal Cycle | | Strength, psi (Pa × 10$^7$) |
|---|---|---|---|---|
| 17 | NDI[c] | No[d] |  | 1050 (0.724) |
|  |  |  |  | 1600 (1.10) |
|  |  |  |  | 1800 (1.24) |
|  |  |  |  | 1840 (1.27) |
|  |  |  |  | 3160 (2.18) |
|  |  |  |  | 1640 (1.13) |
|  |  |  | Average | 1848 (1.27) |
| 18 | NDI[b] | Yes |  | 1650 (1.14) |
|  |  |  |  | 1160 (0.800) |
|  |  |  |  | 1080 (0.745) |
|  |  |  |  | 2140 (1.48) |
|  |  |  |  | 1320 (0.910) |
|  |  |  |  | 2020 (1.39) |
|  |  |  | Average | 1562 (1.08) |
| 19 | MDI[e] | Yes |  | 3590 (2.48) |
|  |  |  |  | 2260 (1.56) |
|  |  |  |  | 2360 (1.63) |
|  |  |  |  | 2300 (1.59) |
|  |  |  |  | 2240 (1.54) |
|  |  |  |  | 2960 (2.04) |
|  |  |  | Average | 2618 (1.81) |

[a] Adhesive sample preparation same as Table 8, footnote (c), at temperatures shown below. Same adhesives as Table 10, footnote (a).
[b] 3 hour cycle time; 30 min −40° C., 60 min to 120° C., 30 min 120° C., 60 min to −40° C.; Thermotron Vibration Chamber Model FCHV, Thermotron Industries, 291 Kollen Park Dr., Holland, MI 49432.
[c] Adhesive bonding condition 230° C. for 10 min.
[d] Control set provides the baseline, unaged strength for the NDI-based adhesive.
[e] Adhesive bonding condition was 200° C. for 10 min.

EXAMPLE 26

Thermal/Humidity/Water Immersion Exposures

Four exposure tests were carried out involving exposure to a variety of quite stressful high humidity or water immersion environments, under varying temperature stress conditions as well. The first of these discussed (ASTM D1183) is considered quite severe in that it mimics the broadest possible range of environmental conditions in 1 week of 4 sequential exposures. The conditions are: 1) 48 hours at 71°±3° C., <10 percent relative humidity (RH); 2) 48 hours at 23 ± 1° C. immersed in distilled water; 3) 8 hours at −57°±3° C.; and 4) 64 hours at 38.5°±2° C., 95 percent RH.

In effect, the samples are exposed to a hot, desert-like condition, followed by underwater immersion, then arctic exposure and finally a tropical hot/wet environment, this latter condition consisting of the longest exposure (2.7 days). In each case, the samples are transferred directly from one exposure condition to the next. This test was carried out for 5 full cycles (5 weeks). The test specimens were then conditioned for 48 hours at 23° C. and 50 percent relative humidity before they were tested. The ASTM procedure states that this re-equilibration should be done over one full week. Hence, the samples as tested may not have been as thoroughly dried as possible. The results are presented in Table 12.

The commercial hot melt polyester control (PE 6300) decreased to 7.31×10$^6$ Pa (1060 psi) (a 27 percent decrease in lap shear strength; see Table 9, strength before exposure 9.31×10$^6$ Pa (1350 psi)). The two experimental adhesives decreased to 1.67×10$^7$ Pa (2428 psi) (MDI adhesive) and 1.85×10$^7$ Pa (2688 psi) (Isonate 143L adhesive). These decreases are 22 and 18 percent respectively, or about 20 percent. It is worth noting that individual samples of both experimental adhesives tested at 2.21×10⁷ Pa (3200 psi). It was shown earlier that this is a very reliable average value for the as prepared adhesive strengths for these adhesives. This seems to indicate that well-bonded, flaw-free adhesive bonds of these adhesives can in fact withstand this severe cycling condition quite well.

TABLE 12

LAP SHEAR STRENGTH OF 0.5 IN² (3.23 cm²) ADHESIVE BONDED[a] SAMPLES AFTER 5 WEEKS OF CYCLIC AGING CONDITIONS[b]

| Sample | Isocyanate Type | | Strength, psi (Pa × 10⁷) |
|---|---|---|---|
| 20 | PE 6300[c] | | 1160 (0.800) |
|  |  |  | 1060 (0.731) |
|  |  |  | 860 (0.593) |
|  |  |  | 1160 (0.800) |
|  |  | Average | 1060 (0.731) |
| 21 | MDI | | 1980 (1.37) |
|  |  |  | 2180 (1.50) |
|  |  |  | 3220 (2.22) |
|  |  |  | 2270 (1.57) |
|  |  |  | 2240 (1.54) |
|  |  |  | 2680 (1.85) |
|  |  | Average | 2428 (1.67) |
| 22 | Isonate 143L | | 1880 (1.30) |
|  |  |  | 3220 (2.22) |
|  |  |  | 2640 (1.82) |
|  |  |  | 2890 (1.99) |
|  |  |  | 2300 (1.59) |
|  |  |  | 3200 (2.21) |
|  |  | Average | 2688 (1.85) |

[a]Adhesive samples prepared using R-13 cold rolled steel coupons following the procedure of Table 8, footnote (c), 10 min at 200° C. and 2–4 mil (0.05–0.1 mm) film prepared following the procedure of Table 9, footnote (a). Hot melt adhesives MDI and Isonate 143L.
[b]ASTM D1183: 1 cycle =
  48 hrs at 71 ± 3° C. (160 ± 5° F.) <10 percent relative humidity (RH).
  48 hrs at 23 ± 1.1° C. (73.4 ± 2° F.) immersed in distilled water.
  8 hrs at −57 ± 3° C. (−70 ± 5° F.) ~100 percent RH.
  64 hrs at 38.5 ± 2° C. (100 ± 3.5° F.) 95 percent RH.
  168 hrs (1 week)
[c]Henkel commercial hot melt polyester.

EXAMPLE 27

Simulated Tropical Exposure Test

The test exposure conditions of 38.5° C. and 95 percent relative humidity constitute a tropical-like environment. This so called "hot/wet exposure condition" is also considered quite severe. This test was also run for-5 weeks and the samples were re-equilibrated 48 hours at 23° C. and 50 percent relative humidity prior to testing. Again, the conditioning might need to be carried out longer to re-establish a true absorbed water equilibrium. The results are presented in Table 13.

In this case, the commercial control showed a sharp decline to 2.24×10⁶ Pa (325 psi; 76 percent decrease). On the other hand, the MDI-based experimental adhesive (Sample 24) has decreased to 1.38×10⁷ Pa (1998 psi; 36 percent decrease). Although this is a moderately large decrease, it is substantially less than the control. It is again interesting to note that one individual sample is still at 2.21×10⁷ Pa (3200 psi; i.e., no decrease from normal average) and two others have only decreased about 20 percent. As above, this suggests that the bond strength of this adhesive can possibly be significantly preserved under these exposure conditions by some modification of adhesive application procedure.

The Isonate 143L-based adhesive samples, however, showed a much bigger decrease to 7.1×10⁶ Pa (1030 psi; 67 percent decrease). This is quite surprising considering the comparable results for the MDI and Isonate 143L adhesives in Table 12. The spread in the individual test results is extremely broad, again suggesting some application factor results in widely varying susceptibilities to water absorption.

TABLE 13

LAP SHEAR STRENGTH OF 0.5 IN² (3.23 cm²) ADHESIVE BONDED[a] SAMPLES AFTER 5 WEEKS AT 100° F. (38.5° C.) AND 95 PERCENT RELATIVE HUMIDITY[b]

| Sample | Isocyanate Type | | Strength, psi (Pa × 10⁷) |
|---|---|---|---|
| 23 | PE 6300[c] | | 380 (0.262) |
|  |  |  | 480 (0.331) |
|  |  |  | 50 (0.0345) |
|  |  |  | 400 (0.276) |
|  |  |  | 320 (0.221) |
|  |  |  | 320 (0.221) |
|  |  | Average | 325 (0.224) |
| 24 | MDI | | 1240 (0.855) |
|  |  |  | 2380 (1.64) |
|  |  |  | 1400 (0.965) |
|  |  |  | 3230 (2.23) |
|  |  |  | 2500 (1.72) |
|  |  |  | 1240 (0.855) |
|  |  | Average | 1998 (1.38) |
| 25 | Isonate 143L | | 1010 (0.696) |
|  |  |  | 1000 (0.689) |
|  |  |  | 880 (0.607) |
|  |  |  | 760 (0.524) |
|  |  |  | 1110 (0.765) |
|  |  |  | 1420 (0.979) |
|  |  | Average | 1030 (0.710) |

[a]Adhesive samples prepared using R-13 cold rolled steel coupons following the procedure of Table 8, footnote (c), 10 min at 200° C. and 2–4 mil (0.5–0.1 mm) film prepared following the procedure of Table 9, footnote (a). Hot melt adhesives MDI and Isonate 143L.
[b]Samples conditioned 48 hours at 73° F. (23° C.) and 50 percent relative humidity, then tested at 23° C., 0.2 in/min (0.5 cm/min) Instron jaw separation rate; 0.5 in/min (1.27 cm/min) chart speed; 2.0 inch (5.08 cm) jaw separation.
[c]Henkel commercial hot melt polyester.

EXAMPLE 28

Ambient Temperature water Immersion Test

Underwater immersion of bonded steel samples constitutes a very severe test. This type of test was also carried out for five weeks. The use of distilled water makes this an especially aggressive test, even at room temperature. This is demonstrated by the fact that all the control samples except one had actually fallen apart by the end of the period. However, the MDI-based adhesive still retained 1.04×10⁷ Pa (1513 psi). This equates to a 49 percent strength decrease. Again, the Isonate 143L-based adhesive samples average strength decreased more sharply to 9.38×10⁶ Pa (1360 psi; 56 percent decrease). Yet two of these individual samples were comparable in strength 1.45×10⁷, 1.30×10⁷ Pa (2100, 1880 psi) to the highest MDI strength 1.36×10⁷ Pa (1970 psi). AS before, this extremely wide variability suggests that integrity of the adhesive bonds is being breached by application factors.

TABLE 14

LAP SHEAR STRENGTH OF 0.5 IN² (3.23 cm) ADHESIVE BONDED[a] SAMPLES AFTER 5 WEEKS IMMERSION IN 23° C. DISTILLED WATER[b]

| Sample | Isocyanate Type | | Strength, psi (Pa × 10⁷) |
|---|---|---|---|
| 26 | PE 6300[c] | | 120 (0.0827) |
| | | | 0 |
| | | | 0 |
| | | | 0 |
| | | | 0 |
| | | | 0 |
| | | Average | 20 (0.0138) |
| 27 | MDI | | 1530 (1.05) |
| | | | 1300 (0.896) |
| | | | 1080 (0.745) |
| | | | 1970 (1.36) |
| | | | 1680 (1.16) |
| | | | 1520 (1.05) |
| | | Average | 1513 (1.04) |
| 28 | Isonate 143L | | 1880 (1.30) |
| | | | 610 (0.421) |
| | | | 1690 (1.17) |
| | | | 2100 (1.45) |
| | | | 920 (0.634) |
| | | | 960 (0.662) |
| | | Average | 1360 (0.938) |

[a]Adhesive samples prepared using R-13 cold rolled steel coupons following the procedure of Table 8, footnote (c), 10 min at 200° C. and 2–4 mil (0.05–0.1 mm) film prepared following the procedure of Table 9, footnote (a). Hot melt adhesives MDI and Isonate 143L.
[b]Samples conditioned 48 hours at 73° F. (23° C.) and 50 percent relative humidity, then tested at 23° C., 0.2 in/min (–/5 cm/min) Instron jaw separation rate; 0.5 in/min (1.27 cm/min) chart speed; 2.0 inch (5.1 cm) jaw separation.
[c]Henkel commercial hot melt polyester.

TABLE 15

LAP SHEAR STRENGTH OF 0.5 IN² (3.23 cm²) ADHESIVEBONDED[a] SAMPLES AFTER 5 WEEKS IMMERSION IN 80° C. DISTILLED WATER[b]

| Sample | Isocyanate Type | | Strength, psi (Pa × 10⁷) |
|---|---|---|---|
| 29 | PE 6300[c] | | 0 |
| | | | 0 |
| | | | 0 |
| | | | 0 |
| | | | 0 |
| | | Average | 0 |
| 30 | MDI | | 60 (0.0414) |
| | | | 280 (0.193) |
| | | | 250 (0.172) |
| | | | 120 (0.0827) |
| | | | 70 (0.0483) |
| | | | 125 (0.0862) |
| | | Average | 151 (0.104) |
| 31 | Isonate 143L | | 120 (0.0827) |
| | | | 225 (0.155) |
| | | | 200 (0.138) |
| | | | 130 (0.0896) |
| | | | 110 (0.0758) |
| | | | 100 (0.0689) |
| | | Average | 148 (0.102) |

[a]Adhesive samples prepared using R-13 cold rolled steel coupons following the procedure of Table 8, footnote (c), 10 min at 200° C. and 2–4 mil (0.05–0.1 mm) film prepared following the procedure of Table 9, footnote (a). Hot melt adhesives MDI and Isonate 143L.
[b]Samples conditioned 48 hours at 73° F. (23° C.) and 50 percent relative humidity, then tested at 23° C., 0.2 in/min (0.5 cm/min) Instron jaw separation rate; 0.5 in/min (1.27 cm/min) chart speed; 2.0 inch (5.1 cm) jaw separation.
[c]Henkel commercial hot melt polyester; all samples fell apart in less than 16 hours.

EXAMPLE 29

80° C. Water Immersion Test

The exposure test in water was also run with the distilled water chambers heated to 80° C. for five weeks (Table 15). The commercial polyester control fell apart in less than 16 hours (overnight during the first day of exposure). The experimental adhesive samples remained intact through the five week period. The steel corroded badly during this period. The samples were encrusted with rust and the edges of the adhesive bond lines turned white. Nevertheless, when the samples were removed from the chambers and hand cleaned, they were all intact and qualitatively too strong to pull apart with the bare hands. They were equilibrated at 23° C. and 50 percent relative humidity for 48 hours before tensile testing at 23° C. The average strengths of both the MDI and the Isonate 143L samples were $1.03 \times 10^6$ Pa (150 psi).

Samples had also been prepared by bonding glass cover slides (microscope slides) together with film adhesive under the same bonding conditions. The same results were obtained. The commercial polyester PE 6300 samples fell apart overnight during the first day of exposure, while the experimental samples remained intact for five weeks. They also were qualitatively too strong to pull apart manually.

EXAMPLE 29

INFRARED ANALYSIS OF MDI AND NDI POLYURETHANE COMPOSITIONS

Small pieces of the film adhesive were mounted between NaCl plates and IR scans were made from 23° C. to 240° C. at varying heating/cooling rates. Both MDI and NDI-based adhesives were scanned. The MDI composition was a replicate of Composition H of Table 3 and the NDI composition was a replicate of Composition K of Table 3. Bond reversibility starts at 110°–120° C. Isocyanate and phenolic hydroxyl groups appear and increase in concentration with temperature. Upon cooling the urethane bonds reform over the same isocyanate concentration/ temperature curve. Even upon rapid cooling (1 min to 23° C.) the bond reformation is complete by ~110° C.

The spectra of the NDI polyurethane composition obtained in FIG. 8 demonstrate the effect of holding the sample at a given temperature. The sample was held for approximately 30 minutes at 100° C. and at 120° C. to determine stability of the polymer at those temperatures. During these times it can be seen that the isocyanate band (N=C=O; 2275 cm⁻¹) appeared not to change after the initial rise due to temperature increase. After holding at 120° C., the temperature was increased at approximately 20° C./minute up to 220° C. At this point the temperature was dropped to below 100° C. in about 1 minute.

The series of spectra in FIGS. 9 and 10 were obtained from the same film of NDI polyurethane as FIG. 8 and represent the second heating cycle for this sample. Note that there is some residual isocyanate left after the first heating/cooling cycle. Along with the increase in isocyanate, there is also a decrease in the amount of N-H and an increase in the amount of O—H present in the sample with increasing temperature. A very sharp band also appears to increase at 2337 cm$^{-1}$. The origin of this band is not clear.

The FIG. 11 spectra represent the first heating cycle of the MDI polyurethane film. The sample was also held for approximately 30 minutes at 100° C. and at 120° C. to determine stability. It can be seen that the isocyanate band does not appear to change after the initial temperature adjustment. The rate of heating was approximately 20° C./min.

FIGS. 12–14 represent the second cycle of the same film of the MDI polyurethane composition as for FIG. 11. Similar effects in the increase of O—H and decrease of N—H are also observed though not to the same degree as in the NDI polyurethane sample. A band at 2337 cm$^{-1}$ is similar to that seen in the NDI polyurethane sample of FIGS. 9–10. FIG. 15 shows the 2500–1400 cm$^{-1}$ spectral region of the same data as are represented in FIGS. 12–14. A rapid rise of the carbonyl (1732 cm$^{-1}$) and amide (~1500 cm$^{-1}$) with decrease in temperature. Also correlating inversely with temperature is the intensity of the band at 1531 cm$^{-1}$ (amide) relative to the band at 1508 cm$^{-1}$.

While there has been described what are at present considered to be the preferred embodiments of this invention, it will be obvious to those skilled in the art that various changes and modifications may be made therein without departing from the invention, and it is, therefore, intended to cover all such changes and modifications as fall within the true spirit and scope of the invention.

We claim:

1. A process for preparing a polyarylsulfide oligomer with phenolic hydroxyl endgroups comprising:
   a. combining an aryldihalide, a monohalo phenolic hydroxyl aryl group, sodium sulfide nonahydrate, sodium carbonate and a non-aqueous solvent to form a mixture; and
   b. heating said mixture so as to drive off water of hydration from said sodium sulfide and to react said aryldihalide with said sodium sulfide to form said polyarylsulfide oligomer.

2. The process for preparing a polyarylsulfide oligomer according to claim 1 further comprising the step of precipitating said polyarylsulfide oligomer from said solvent by mixing with an aqueous solvent.

3. The process for preparing a polyarylsulfide oligomer according to claim 1 wherein said aryldihalide is a biphenyl dihalide.

4. The process for preparing a polyarylsulfide oligomer according to claim 3 wherein said biphenyldihalide is 4,4'-dibromobiphenyl.

5. The process for preparing a polyarylsulfide oligomer according to claim 3 wherein said nonaqueous solvent is 1-methyl- 2-pyrrolidinone.

6. A process for forming a finish surface on a composite material comprising:
   a. placing a composite material in contact with a polymer with a thermally-reversible isocyanate-phenolic hydroxyl labile hydrogen linkage heated so as to dissociate said polymer into a compound with isocyanate functionality and a compound with phenolic hydroxyl labile hydrogen functionality; and
   b. cooling said dissociated phenolic hydroxyl labile hydrogen and isocyanate compounds so as
      1) to reform said polymer with a surface suitable for exterior finish applications and
      2) to bond said polymer to said composite material.

7. The process according to claim 6 wherein said thermally-reversable polymer contains at least one segment selected from the group of segments consisting of polycarbonate, polysulfide, polyimidazolidine, polyimide, and polyester.

8. The process according to claim 6 wherein said phenolic hydroxyl labile hydrogen segment contains polycarbonate.

9. The process according to claim 8 wherein said polycarbonate has a degree of polymerization of about 9.

10. The process according to claim 6 wherein said composite material is selected from the group of composite materials consisting of polypropylene and polyethylene terephthalate.

\* \* \* \* \*

UNITED STATES PATENT AND TRADEMARK OFFICE
CERTIFICATE OF CORRECTION

PATENT NO. : 5,470,945
DATED : November 28, 1995
INVENTOR(S) : Markle et al.

It is certified that error appears in the above-indentified patent and that said Letters Patent is hereby corrected as shown below:

On the Title page, item [75] Inventors, lines 2 & 3 "George E. Cremeans, Groveport;" should be deleted.

Column 1, line 6, "Feb. 4, 1992," should be -- Feb. 4, 1991, --.

Column 3, line 48, "unblock" should be -- to unblock --.

Column 4, line 13, "the-polymer" should be -- the polymer --.

Column 4, line 47, "dynamic . viscosity" should be -- dynamic viscosity --.

Column 5, line 37, "cm$^1$)" should be -- cm$^{-1}$) --.

Column 7, line 33, "hisphenol" should be -- bisphenol --.

Column 7, line 38, "hisphenol" should be -- bisphenol --.

Column 11, line 61, "10$^e$" should be -- 10$^6$ --.

TABLE 3-continued, footnote (e) "hydroxyl and groups" should be -- hydroxyl end groups --.

Column 19, line 61, "tee];ed" should be -- tested --.

Column 21, line 3, "6" should be -- δ --.

Column 21, line 37, "hisphenol" should be -- bisphenol --.

Column 23, line 23, "H$_{2,005}$-9," should be -- H2,005-9, --.

Column 23, line 62, "0,214" should be -- 0.214 --.

UNITED STATES PATENT AND TRADEMARK OFFICE
CERTIFICATE OF CORRECTION

PATENT NO. : 5,470,945
DATED : November 28, 1995
INVENTOR(S) : Markle et al.

It is certified that error appears in the above-indentified patent and that said Letters Patent is hereby corrected as shown below:

Column 24, line 62, "endtapper" should be -- endcapper --.

Column 25, line 24, "4,298" should be -- 4.298 --.

Column 25, line 28, "was'stirred" should be -- was stirred --.

Column 25, line 65, "3652" should be -- 3650 --.

Column 28, line 10, "(hisphenol" should be -- (bisphenol --.

Column 28, line 48, "3,280" should be -- 3.280 --.

Column 31, line 30, "hydroxylend-group" should be -- hydroxyl end-group --.

Column 31, line 57, "the . flask" should be -- the flask --.

Column 33, line 5, "$\infty$m" should be -- $\mu$m --.

Column 33, line 63, "51 6 cm$^2$ $-$ 1500 psi;" should be -- 51.6 cm$^2$, $\sim$1500 psi; --.

Column 41, line 4, "as prepared" should be -- as-prepared --.

UNITED STATES PATENT AND TRADEMARK OFFICE
CERTIFICATE OF CORRECTION

PATENT NO. : 5,470,945
DATED : November 28, 1995
INVENTOR(S) : Markle et al.

It is certified that error appears in the above-indentified patent and that said Letters Patent is hereby corrected as shown below:

Column 41, line 52, "for-5" should be -- for 5 --.

Column 42, line 65, "AS" should be -- As --.
Claims
Column 46, line 30, "mally-reversable" should be -- mally-reversible --.

Signed and Sealed this

Twenty-first Day of May, 1996

Attest:

BRUCE LEHMAN

*Attesting Officer*  *Commissioner of Patents and Trademarks*